(12) United States Patent
Wang et al.

(10) Patent No.: US 11,483,892 B2
(45) Date of Patent: Oct. 25, 2022

(54) COMMUNICATION METHOD AND APPARATUS

(71) Applicant: HUAWEI TECHNOLOGIES CO., LTD., Guangdong (CN)

(72) Inventors: Rui Wang, Shanghai (CN); Wenjie Peng, Shanghai (CN); Xiaoying Xu, Shanghai (CN); Mingzeng Dai, Shenzhen (CN); Haiyan Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/992,950

(22) Filed: Aug. 13, 2020

(65) Prior Publication Data

US 2020/0374964 A1  Nov. 26, 2020

Related U.S. Application Data

(63) Continuation of application No. PCT/CN2019/074882, filed on Feb. 12, 2019.

(30) Foreign Application Priority Data

Feb. 13, 2018  (CN) .......................... 201810151003.3

(51) Int. Cl.
*H04W 76/25* (2018.01)
*H04W 80/02* (2009.01)
(Continued)

(52) U.S. Cl.
CPC .......... *H04W 76/25* (2018.02); *H04L 5/0098* (2013.01); *H04W 28/06* (2013.01);
(Continued)

(58) Field of Classification Search
CPC ...... H04W 28/06; H04W 80/02; H04L 5/0098
See application file for complete search history.

(56) References Cited

U.S. PATENT DOCUMENTS

2013/0170339 A1  7/2013 Kamath et al.
2016/0128054 A1  5/2016 Noh et al.
(Continued)

FOREIGN PATENT DOCUMENTS

CN  105409137 A  3/2016
CN  107241164 A  10/2017
(Continued)

OTHER PUBLICATIONS

3GPP TS 38.473 V15.4.1 (Jan. 2019), 3rd Generation Partnership Project;Technical Specification Group Radio Access Network; NG-RAN; F1 application protocol (F1 AP) (Release 15), Jan. 2019, 192 pages.
(Continued)

*Primary Examiner* — San Htun
(74) *Attorney, Agent, or Firm* — Fish & Richardson P.C.

(57) ABSTRACT

Embodiments of this application relate to the field of communications technologies, and disclose communications methods and apparatuses. In an implementation, a method comprising receiving, by a first communications device, information about a radio bearer (RB) of a heterogeneous communications system, wherein a duplication operation for the RB is configured by a second communications device, and the first communications device and the second communications are comprised in a master node or a secondary node; generating, by the first communications device, an activation indication indicating whether to activate or deactivate the duplication operation of the RB, wherein whether to activate or deactivate the duplication operation is deter-
(Continued)

mined by the first communications device; and sending the activation indication to a terminal device.

6 Claims, 44 Drawing Sheets

(51) Int. Cl.
```
H04W 76/34      (2018.01)
H04W 76/16      (2018.01)
H04L 5/00       (2006.01)
H04W 28/06      (2009.01)
H04W 36/00      (2009.01)
H04W 36/18      (2009.01)
H04W 88/06      (2009.01)
```
(52) U.S. Cl.
CPC ....... *H04W 36/0027* (2013.01); *H04W 36/18* (2013.01); *H04W 76/16* (2018.02); *H04W 76/34* (2018.02); *H04W 80/02* (2013.01); *H04W 88/06* (2013.01)

(56) References Cited

U.S. PATENT DOCUMENTS

| | | | |
|---|---|---|---|
| 2018/0324641 A1* | 11/2018 | Tsai | H04W 36/0069 |
| 2018/0332501 A1* | 11/2018 | Tseng | H04L 1/189 |
| 2018/0368132 A1* | 12/2018 | Babaei | H04L 1/1819 |
| 2018/0376457 A1* | 12/2018 | Tseng | H04W 72/1284 |
| 2019/0104562 A1* | 4/2019 | Tsai | H04W 28/065 |

FOREIGN PATENT DOCUMENTS

| | | |
|---|---|---|
| CN | 107342851 A | 11/2017 |
| EP | 3641188 A1 | 4/2020 |
| RU | 2623460 C2 | 6/2017 |

OTHER PUBLICATIONS

NTT DOCOMO, Inc.,"Status Report to TSG",3GPP TSG FIAN meeting #77 RP-171783, Sapporo, Japan, Sep. 11-14, 2017, 284 pages.
Huawei, "pCR to 38.473 on PDCP duplication," 3GPP TSG-RAN WG3 NR Ad-Hoc#1801, R3-180342, Sophia Antipolis, France, Jan. 22-26, 2018, 10 pages.
Samsung, KT, "PDCP duplication activation and deactivation over F1," 3GPP TSG-RAN WG3 NR AdHoc 1801 R3-180238, Sophia Antipolis, France, Jan. 22-26, 2018,t 4 pages.
CATT, "Discussion on CA based PDCP Duplication," 3GPP TSG-RAN WG3#98, R3-174533, Reno, NV, USA, Nov. 27-Dec. 1, 2017, 12 pages.
ZTE,"Consideration on the activation or deactivation of duplication", 3GPP TSG-RAN WG3 #98 R3-174408, Reno, NV, USA, Nov. 27-Dec. 1, 2017, 4 pages.
Extended European Search Report in European Application No. 19754390.3, dated Feb. 1, 2021, 15 pages.
3GPP TS 36.300 V15.0.0 (Dec. 2017), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Dec. 2017, 338 pages.
3GPP TS 36.423 V15.0.0 (Dec. 2017), "3rd Generation Partnership Project; Technical Specification Group Radio Access Network; Evolved Universal Terrestrial Radio Access Network (E-UTRAN); X2 application protocol (X2AP) (Release 15)," Dec. 2017, 350 pages.
3GPP TS 38.321 V15.0.0 (Dec. 2017),"3rd Generation Partnership Project; Technical Specification Group Radio Access Network; NR;Medium Access Control (MAC) protocol specification (Release 15)," Dec. 2017, 55 pages.
3GPP TS 38.331 V15.0.0 (Dec. 2017), "3rd Generation Partnership Project; Technical Specification Group Radio Access Network NR Radio Resource Control (RRC) protocol specification (Release 15)," Dec. 2017, 188 pages.
3GPP TS 38.401 V15.0.0 (Dec. 2017), "3rd Generation Partnership Project;Technical Specification Group Radio Access Network; NG-RAN; Architecture description (Release 15)," Dec. 2017, 23 pages.
3GPP TS 38.470 V15.0.0 (Jan. 2018), 3rd Generation Partnership Project; Technical Specification Group Radio Access Network; NG-RAN; F1 general aspects and principles (Release 15), Jan. 2017, 11 pages, Best Available Date: Jan. 2018.
3GPP TS 38.473 V15.0.0 (Dec. 2017), "3rd Generation Partnership Project; Technical Specification Group Radio Access Network; NG-RAN; F1 application protocol (F1AP) (Release 15)," Dec. 2017, 90 pages.
CATT, "Configuration and activation/deactivation of duplication," 3GPP TSG-RAN WG2 Meeting #98, R2-1704247, Hangzhou, China, May 15-19, 2017, 2 pages.
Ericsson, "Packet duplication in LTE," 3GPP TSG RAN WG2 #100, R2-1712457, Reno, US, 27 Nov. 1-Dec. 1, 2017, 4 pages.
Office Action issued in Chinese Application No. 201810151003.3 dated Jun. 1, 2020, 10 pages (with English translation).
PCT International Search Report and Written Opinion issued in International Application No. PCT/CN2019/074882 dated May 10, 2019, 15 pages (with English translation).
Samsung, "Review issue list for TS 36.331 EN-DC ASN.1 freeze," 3GPP TSG-RAN2 NR AH meeting, R2-1801593, Vancouver, Canada, Jan. 22-26, 2018, 47 pages.
Huawei, "PDCP duplication for CU-DU," 3GPP TSG RAN WG3 meeting #97, R3-173128, Berlin, Germany, Aug. 21-25, 2017, 3 pages.
Huawei, HiSilicon, "Remaining stage 2 issues for CA duplication and for DC duplication," 3GPP TSG-RAN WG2 Meeting #99, R2-1708691, Berlin, Germany, Aug. 21-25, 2017, 5 pages.
Office Action issued in Japanese Application No. 2020-565012 dated Oct. 19, 2021, 10 pages (with English translation).
OPPO, "Control on UL packet duplication for split bearer," 3GPP TSG-RAN2 Meeting #99, R2-1707705, Berlin, Germany, Aug. 21-25, 2017, 3 pages.
ZTE, "Consideration on fast duplication activation and deactivation over F1," 3GPP TSG RAN WG3 NR Adhoc, R3-180135, Sophia Antipolis, France, Jan. 22-26, 2018, 6 pages.
Office Action issued in Russian Application No. 2020129977/ 07(054066) dated Jun. 20, 2022, 16 pages (with English translation).

* cited by examiner

COMMUNICATION METHOD AND APPARATUS

CROSS-REFERENCE TO RELATED APPLICATIONS

This application is a continuation of International Patent Application No. PCT/CN2019/074882, filed on Feb. 12, 2019, which claims priority to Chinese Patent Application No. 201810151003.3, filed on Feb. 13, 2018. The disclosures of the aforementioned applications are hereby incorporated by reference in their entireties.

TECHNICAL FIELD

Embodiments of this application relate to the field of communications technologies, and in particular, to a communication method and an apparatus.

BACKGROUND

A duplication operation (duplication) is introduced on a radio access network (Radio Access Network, RAN) side in a 5th generation (the 5 Generation Mobile Communication Technology, 5G) system. Specifically, a packet data convergence protocol (Packet Data Convergence Protocol, PDCP) layer of a transmit end makes one copy (or a plurality of copies) of an original (original) data packet, such as a PDCP protocol data unit (Protocol Data Unit, PDU), to generate a plurality of same data packets, namely, the original data packet and a duplicated data packet. The transmit end may use a dual connectivity (Dual Connectivity, DC) manner to send the same data packets to a peer end twice (or multiple times) along two independent transmission paths (transmission path). For example, the same data packets are sent twice. For the first time, the sending is performed over a link to a master node; for the other time, the sending is performed over a link to a secondary node. After a receive end receives the foregoing data packets, a PDCP layer performs duplicate data packet detection, deletes a duplicate data packet, and transmits, to an upper layer, only one data packet that is not duplicate. A gNB (a base station, using new radio (New Radio, NR), in a 5G system) uses radio resource control (Radio Resource Control, RRC) signaling to configure duplication of each radio bearer (Radio Bearer, RB), and uses media access control (Media Access Control, MAC) layer signaling to activate/deactivate duplication of each data radio bearer (Data Radio Bearer, DRB), that is, per DRB. The foregoing duplication operation can improve data transmission reliability and reduce a data transmission latency, and is particularly applicable to an ultra-reliable and low-latency service.

In the 5G system, there is a scenario in which a gNB and a long term evolution (Long Term Evolution, LTE) base station (for example, an eNB connected to an evolved packet core (Evolved Packet Core, EPC) or an ng-eNB connected to a next generation core (Next Generation Core, NGC)) cooperate on a network. In this scenario, a base station in which a PDCP entity of an RB is located is referred to as a PDCP anchor (anchor), a transmission path between the master node (Master Node, MN) and a terminal is referred to as an MN link (MN link), an MN leg (MN leg), or a master leg (master leg), and a transmission path between the secondary node (Secondary Node, SN) and the terminal is referred to as an SN link (SN link), an SN leg (SN leg), or a secondary leg (secondary leg). Once duplication is configured and activated for an RB, a same data packet may be transmitted for the RB by using an MN link and an SN link separately. The PDCP anchor may be an LTE base station or a gNB. A MAC layer of the gNB can activate/deactivate the duplication, but a MAC layer of the LTE base station cannot perform an activation/deactivation operation. In this way, when the PDCP anchor is the LTE base station, the LTE base station cannot send a duplication activation/deactivation indication to the terminal through an LTE air interface.

SUMMARY

Embodiments of this application provide a communication method and an apparatus, to resolve a problem that an LTE base station cannot send an activation/deactivation indication to a terminal when a PDCP anchor is the LTE base station.

To achieve the foregoing objective, the following technical solutions are used in the embodiments of this application.

According to a first aspect, a communication method is provided. After obtaining status information of a duplication operation of an RB, a first communications device sends the status information of the duplication operation of the RB to a second communications device, so that the second communications device generates an activation indication based on the status information of the duplication operation of the RB, and sends the activation indication to a terminal. Herein, the activation indication is used to indicate the terminal to activate/deactivate the duplication operation of the RB, the status information of the duplication operation of the RB is used to represent activation/deactivation of the duplication operation of the RB, and the RB is an RB of a heterogeneous communications system.

When the first communications device is an LTE base station and the second communications device is a gNB, the LTE base station may send status information of an RB to the gNB after obtaining the status information of the RB, so that a MAC layer of the gNB generates an activation indication. This resolves the problem that the LTE base station cannot send the activation/deactivation indication to the terminal when the anchor is the LTE base station. When the first communications device is a CU in the gNB and the second communications device is a DU in the gNB, an activation indication may be generated by using a MAC layer of the DU, and then the activation indication is sent to the terminal. In this way, configuration and activation of a duplication operation are implemented in a scenario in which the gNB includes the CU and the DU.

Herein, the first communications device and a PDCP anchor may be a same device, or may be different devices.

Optionally, in a possible implementation of this application, a method of the "obtaining status information of a duplication operation of a radio bearer RB" may be: The first communications device determines the status information of the duplication operation of the RB. That the first communications device determines the status information of the duplication operation of the RB is: The first communications device determines whether to activate/deactivate the duplication operation of the RB.

Optionally, in another possible implementation of this application, before the first communications device determines the status information of the duplication operation of the RB, the first communications device determines to configure the duplication operation for the RB, or the first communications device receives information about the RB sent by a third communications device.

When the first communications device is the LTE base station, the first communications device determines to configure the duplication operation for the RB, and determines the status information of the duplication operation of the RB. When the first communications device is the DU in the gNB, the first communications device receives the information about the RB sent by the third communications device (the LTE base station), and determines the status information of the duplication operation of the RB based on the received information about the RB.

Optionally, in another possible implementation of this application, when the first communications device determines to configure the duplication operation for the RB, when the heterogeneous communications system is an ENDC or an NG-ENDC, the first communications device may be a master node of the heterogeneous communications system, correspondingly the second communications device may be a secondary node of the heterogeneous communications system, and the RB is an RB of a master cell group MCG; or when the heterogeneous communications system is an NEDC, the first communications device may be a secondary node of the heterogeneous communications system, correspondingly the second communications device may be a master node of the heterogeneous communications system, and the RB is an RB of a secondary cell group SCG; or when the heterogeneous communications system is an ENDC or an NG-ENDC, the first communications device may be a centralized unit CU in a secondary node of the heterogeneous communications system, correspondingly the second communications device is a distributed unit DU in the secondary node of the heterogeneous communications system, and the RB is an RB of a secondary cell group SCG; or when the heterogeneous communications system is an NEDC, the first communications device may be a CU in a master node of the heterogeneous communications system, correspondingly the second communications device is a DU in the master node of the heterogeneous communications system, and the RB is an RB of a master cell group MCG.

Optionally, in another possible implementation of this application, when the first communications device receives the information about the RB sent by the third communications device, when the heterogeneous communications system is an ENDC or an NG-ENDC, the first communications device may be a CU in a secondary node of the heterogeneous communications system, correspondingly the second communications device is a DU in the secondary node of the heterogeneous communications system, the third communications device is a master node of the heterogeneous communications system, and the RB is an RB of an MCG; or When the heterogeneous communications system is an NEDC, the first communications device may be a CU in a master node of the heterogeneous communications system, correspondingly the second communications device is a DU in the master node of the heterogeneous communications system, the third communications device is a secondary node of the heterogeneous communications system, and the RB is an RB of an SCG.

Optionally, in another possible implementation of this application, a method of the "obtaining status information of a duplication operation of a radio bearer RB" may be: The first communications device receives the status information of the duplication operation of the RB from a third communications device. In this case, when the heterogeneous communications system is an ENDC or an NG-ENDC, the first communications device may be a CU in a secondary node of the heterogeneous communications system, correspondingly the second communications device is a DU in the secondary node of the heterogeneous communications system, the third communications device is a master node of the heterogeneous communications system, and the RB is an RB of an MCG. When the heterogeneous communications system is an NEDC, the first communications device may be a CU in a master node of the heterogeneous communications system, correspondingly the second communications device is a DU in the master node of the heterogeneous communications system, the third communications device is a secondary node of the heterogeneous communications system, and the RB is an RB of an SCG.

It can be learned that in this embodiment of this application, the first communications device may determine the status information of the duplication operation of the RB, or may receive the status information of the duplication operation of the RB sent by the third communications device.

According to a second aspect, a communications device is provided. The communications device is a first communications device. Specifically, the communications device includes an obtaining unit and a sending unit.

Functions implemented by units and modules provided in this application are specifically as follows:

The obtaining unit is configured to obtain status information of a duplication operation duplication of a radio bearer RB, where the status information of the duplication operation of the RB is used to represent activation/deactivation of the duplication operation of the RB, and the RB is an RB of a heterogeneous communications system. The sending unit is configured to send, to a second communications device, the status information, of the duplication operation of the RB, obtained by the obtaining unit, so that the second communications device generates an activation indication based on the status information of the duplication operation of the RB, and sends the activation indication to a terminal, where the activation indication is used to indicate the terminal to activate/deactivate the duplication operation of the RB.

Optionally, in a possible implementation of this application, the communications device provided in this embodiment of this application further includes a determining unit. The determining unit is configured to determine the status information, of the duplication operation of the RB, obtained by the obtaining unit.

Optionally, in another possible implementation of this application, the determining unit is further configured to determine, before determining the status information of the duplication operation of the RB, to configure the duplication operation for the RB. Alternatively, the communications device provided in this embodiment of this application further includes a receiving unit. The receiving unit is configured to: before the determining unit determines the status information of the duplication operation of the RB, receive information about the RB sent by a third communications device.

Optionally, in another possible implementation of this application, when the determining unit determines to configure the duplication operation for the RB, the heterogeneous communications system is an ENDC or an NG-ENDC, the first communications device is a master node of the heterogeneous communications system, the second communications device is a secondary node of the heterogeneous communications system, and the RB is an RB of a master cell group MCG; or the heterogeneous communications system is an NEDC, the first communications device is a secondary node of the heterogeneous communications system, the second communications device is a master node of the heterogeneous communications system, and the RB is an RB of a secondary cell group SCG; or the heterogeneous communications system is an ENDC or an NG-ENDC, the first communications device is a centralized unit CU in a secondary node of the heterogeneous communications system, the second communications device is a distributed unit DU in the secondary node of the heterogeneous communications system, and the RB is an RB of a secondary cell group SCG; or the heterogeneous communications system is an NEDC, the first communications device is a CU in a master node of the heterogeneous communications system, the second communications device is a DU in the master node of the heterogeneous communications system, and the RB is an RB of a master cell group MCG.

Optionally, in another possible implementation of this application, when the receiving unit receives the information about the RB sent by the third communications device, the heterogeneous communications system is an ENDC or an NG-ENDC, the first communications device is a CU in a secondary node of the heterogeneous communications system, the second communications device is a DU in the secondary node of the heterogeneous communications system, the third communications device is a master node of the heterogeneous communications system, and the RB is an RB of an MCG; or the heterogeneous communications system is an NEDC, the first communications device is a CU in a master node of the heterogeneous communications system, the second communications device is a DU in the master node of the heterogeneous communications system, the third communications device is a secondary node of the heterogeneous communications system, and the RB is an RB of an SCG.

Optionally, in another possible implementation of this application, the obtaining unit is specifically configured to receive the status information of the duplication operation of the RB from the third communications device. Correspondingly, the heterogeneous communications system is an ENDC or an NG-ENDC, the first communications device is a CU in a secondary node of the heterogeneous communications system, the second communications device is a DU in the secondary node of the heterogeneous communications system, the third communications device is a master node of the heterogeneous communications system, and the RB is an RB of an MCG; or the heterogeneous communications system is an NEDC, the first communications device is a CU in a master node of the heterogeneous communications system, the second communications device is a DU in the master node of the heterogeneous communications system, the third communications device is a secondary node of the heterogeneous communications system, and the RB is an RB of an SCG.

According to a third aspect, a communications device is provided. The communications device includes: one or more processors, a memory, and a communications interface. The memory and the communications interface are coupled to the one or more processors. The communications device communicates with another device through the communications interface. The memory is configured to store computer program code. The computer program code includes an instruction. When the one or more processors execute the instruction, the communications device performs the communication method according to the first aspect and the possible implementations of the first aspect.

According to a fourth aspect, a computer-readable storage medium is further provided. The computer-readable storage medium stores an instruction. When the instruction is run on a communications device, the communications device is enabled to perform the communication method according to the first aspect and the possible implementations of the first aspect.

According to a fifth aspect, a computer program product including an instruction is further provided. When the computer program product is run on a communications device, the communications device is enabled to perform the communication method according to the first aspect and the possible implementations of the first aspect.

In this application, for detailed descriptions of the second aspect, the third aspect, the fourth aspect, the fifth aspect, and various implementations of the second aspect, the third aspect, the fourth aspect, and the fifth aspect, refer to the detailed descriptions of the first aspect and the various implementations of the first aspect; for beneficial effects of the second aspect, the third aspect, the fourth aspect, the fifth aspect, and the various implementations of the second aspect, the third aspect, the fourth aspect, and the fifth aspect, refer to the analyses of the beneficial effects of the first aspect and the various implementations of the first aspect. Details are not described herein again.

According to a sixth aspect, a communication method is provided, and includes: obtaining, by a first communications device, information about a radio bearer RB for which a duplication operation duplication has been configured, where the RB is an RB of a heterogeneous communications system; determining, by the first communications device, whether to activate the duplication operation of the RB; and generating, by the first communications device, an activation indication, and sending the activation indication to a terminal, where the activation indication is used to indicate the terminal to activate/deactivate the duplication operation of the RB.

The first communications device may be a gNB or a DU in a gNB, so that configuration and activation of a duplication operation in a scenario in which the gNB includes a CU and the DU are implemented.

Herein, the first communications device and a PDCP anchor may be a same device, or may be different devices.

Optionally, in a possible implementation of this application, a method for the "obtaining, by a first communications device, information about a radio bearer RB for which a duplication operation duplication has been configured" is: receiving, by the first communications device, the information about the RB from a second communications device, where the information about the RB is determined by the second communications device, or is sent by a third communications device and received by the second communications device.

Optionally, in another possible implementation of this application, when the information about the RB is determined by the second communications device, the heterogeneous communications system is an ENDC or an NG-ENDC, the first communications device is a secondary node of the heterogeneous communications system, the second communications device is a master node of the heterogeneous communications system, and the RB is an RB of a master cell group MCG; or the heterogeneous communications system is an NEDC, the first communications device is a master node of the heterogeneous communications system, the second communications device is a secondary node of the heterogeneous communications system, and the RB is an RB of a secondary cell group SCG; or the heterogeneous communications system is an ENDC or an NG-ENDC, the first communications device is a distributed unit DU in a secondary node of the heterogeneous communications system, the second communications device is a centralized unit CU in the secondary node of the heterogeneous communications system, and the RB is an RB of a secondary cell group SCG; or the heterogeneous communications system is an NEDC, the first communications device is a DU in a master node of the heterogeneous communications system, the second communications device is a CU in the master node of the heterogeneous communications system, and the RB is an RB of a master cell group MCG.

Optionally, in another possible implementation of this application, when the information about the RB is sent by the third communications device and received by the second communications device, the heterogeneous communications system is an ENDC or an NG-ENDC, the first communications device is a distributed unit DU in a secondary node of the heterogeneous communications system, the second communications device is a centralized unit CU in the secondary node of the heterogeneous communications system, the third communications device is a master node of the heterogeneous communications system, and the RB is an RB of an MCG; or the heterogeneous communications system is an NEDC, the first communications device is a DU in a master node of the heterogeneous communications system, the second communications device is a CU in the master node of the heterogeneous communications system, the third communications device is a secondary node of the heterogeneous communications system, and the RB is an RB of an SCG.

Optionally, in another possible implementation of this application, a method for the "obtaining, by a first communications device, information about a radio bearer RB for which a duplication operation duplication has been configured" is: The first communications device determines to configure the duplication operation for the RB. In this case, the heterogeneous communications system is an ENDC or an NG-ENDC, the first communications device is a secondary node of the heterogeneous communications system or a DU in the secondary node of the heterogeneous communications system, and the RB is an RB of an SCG; or the heterogeneous communications system is an NEDC, the first communications device is a master node of the heterogeneous communications system or a DU in the master node of the heterogeneous communications system, and the RB is an RB of an MCG.

It can be learned that in this embodiment of this application, the first communications device may determine to configure the duplication operation for the RB, or may receive the information about the RB sent by the second communications device.

Optionally, in another possible implementation of this application, after the first communications device determines whether to activate the duplication operation of the RB, the first communications device further sends status information of the duplication operation of the RB to the second communications device, so that the second communications device determines, based on the status information of the duplication operation of the RB, whether to enable duplicate data packet detection. The status information of the duplication operation of the RB is used to represent activation/deactivation of the duplication operation of the RB. The first communications device is the DU in the secondary node of the heterogeneous communications system, and the second communications device is the CU in the secondary node of the heterogeneous communications system; or the first communications device is the DU in the master node of the heterogeneous communications system, and the second communications device is the CU in the master node of the heterogeneous communications system. Alternatively, the first communications device is the secondary node of the heterogeneous communications system, and the second communications device is the master node of the heterogeneous communications system; or the first communications device is the master node of the heterogeneous communications system, and the second communications device is the secondary node of the heterogeneous communications system.

Optionally, in another possible implementation of this application, after the first communications device determines to configure the duplication operation for the RB, the first communications device sends the information about the RB to a second communications device, so that the second communications device generates configuration information based on the information about the RB, and sends the configuration information to the terminal, where the configuration information is used to indicate to configure the duplication operation for the RB; and the heterogeneous communications system is an ENDC or an NG-ENDC, the first communications device is the DU in the secondary node of the heterogeneous communications system, and the second communications device is a CU in the secondary node of the heterogeneous communications system; or the heterogeneous communications system is an NEDC, the first communications device is the DU in the master node of the heterogeneous communications system, and the second communications device is a CU in the master node of the heterogeneous communications system. Alternatively, after the first communications device determines to configure the duplication operation for the RB, the first communications device further generates configuration information, and sends the configuration information to a second communications device, so that the second communications device sends the configuration information to the terminal, where the configuration information is used to indicate to configure the duplication operation for the RB; and the heterogeneous communications system is an ENDC or an NG-ENDC, the first communications device is the secondary node of the heterogeneous communications system, and the second communications device is the master node of the heterogeneous communications system; or the heterogeneous communications system is an NEDC, the first communications device is the master node of the heterogeneous communications system, and the second communications device is the secondary node of the heterogeneous communications system.

According to a seventh aspect, a communications device is provided. The communications device is a first communications device. Specifically, the communications device includes an obtaining unit, a determining unit, a generating unit, and a sending unit.

Functions implemented by units and modules provided in this application are specifically as follows:

The obtaining unit is configured to obtain information about a radio bearer RB for which a duplication operation duplication has been configured, where the RB is an RB of a heterogeneous communications system. The determining unit is configured to determine whether to activate the duplication operation of the RB obtained by the obtaining unit. The generating unit is configured to generate an activation indication based on a determining result of the determining unit, where the activation indication is used to indicate a terminal to activate/deactivate the duplication operation of the RB. The sending unit is configured to send, to the terminal, the activation indication generated by the generating unit.

Optionally, in a possible implementation of this application, the obtaining unit is specifically configured to receive the information about the RB from a second communications device, where the information about the RB is determined by the second communications device, or is sent by a third communications device and received by the second communications device.

Optionally, in another possible implementation of this application, when the information about the RB is determined by the second communications device, the heterogeneous communications system is an ENDC or an NG-ENDC, the first communications device is a secondary node of the heterogeneous communications system, the second communications device is a master node of the heterogeneous communications system, and the RB is an RB of a master cell group MCG; or the heterogeneous communications system is an NEDC, the first communications device is a master node of the heterogeneous communications system, the second communications device is a secondary node of the heterogeneous communications system, and the RB is an RB of a secondary cell group SCG; or the heterogeneous communications system is an ENDC or an NG-ENDC, the first communications device is a distributed unit DU in a secondary node of the heterogeneous communications system, the second communications device is a centralized unit CU in the secondary node of the heterogeneous communications system, and the RB is an RB of a secondary cell group SCG; or the heterogeneous communications system is an NEDC, the first communications device is a DU in a master node of the heterogeneous communications system, the second communications device is a CU in the master node of the heterogeneous communications system, and the RB is an RB of a master cell group MCG.

Optionally, in another possible implementation of this application, when the information about the RB is sent by the third communications device and received by the second communications device, the heterogeneous communications system is an ENDC or an NG-ENDC, the first communications device is a distributed unit DU in a secondary node of the heterogeneous communications system, the second communications device is a centralized unit CU in the secondary node of the heterogeneous communications system, the third communications device is a master node of the heterogeneous communications system, and the RB is an RB of an MCG; or the heterogeneous communications system is an NEDC, the first communications device is a DU in a master node of the heterogeneous communications system, the second communications device is a CU in the master node of the heterogeneous communications system the third communications device is a secondary node of the heterogeneous communications system, and the RB is an RB of an SCG.

Optionally, in another possible implementation of this application, the obtaining unit is specifically configured to determine to configure the duplication operation for the RB. In this case, the heterogeneous communications system is an ENDC or an NG-ENDC, the first communications device is a secondary node of the heterogeneous communications system or a DU in the secondary node of the heterogeneous communications system, and the RB is an RB of an SCG; or the heterogeneous communications system is an NEDC, the first communications device is a master node of the heterogeneous communications system or a DU in the master node of the heterogeneous communications system, and the RB is an RB of an MCG.

Optionally, in another possible implementation of this application, the sending unit is further configured to send status information of the duplication operation of the RB to a second communications device, so that the second communications device determines, based on the status information of the duplication operation of the RB, whether to enable duplicate data packet detection, where the status information of the duplication operation of the RB is used to represent activation/deactivation of the duplication operation of the RB; and the first communications device is the DU in the secondary node of the heterogeneous communications system, and the second communications device is the CU in the secondary node of the heterogeneous communications system; or the first communications device is the DU in the master node of the heterogeneous communications system, and the second communications device is the CU in the master node of the heterogeneous communications system.

Optionally, in another possible implementation of this application, the sending unit is further configured to: after it is determined to configure the duplication operation for the RB, send the information about the RB to a second communications device, so that the second communications device generates configuration information based on the information about the RB, and sends the configuration information to the terminal, where the configuration information is used to indicate to configure the duplication operation for the RB; and the heterogeneous communications system is an ENDC or an NG-ENDC, the first communications device is the DU in the secondary node of the heterogeneous communications system, and the second communications device is a CU in the secondary node of the heterogeneous communications system; or the heterogeneous communications system is an NEDC, the first communications device is the DU in the master node of the heterogeneous communications system, and the second communications device is a CU in the master node of the heterogeneous communications system. Alternatively, the generating unit is further configured to generate configuration information, where the configuration information is used to indicate to configure the duplication operation for the RB; and the sending unit is further configured to send the configuration information to a second communications device, so that the second communications device sends the configuration information to the terminal; and the heterogeneous communications system is an ENDC or an NG-ENDC, the first communications device is the secondary node of the heterogeneous communications system, and the second communications device is the master node of the heterogeneous communications system; or the heterogeneous communications system is an NEDC, the first communications device is the master node of the heterogeneous communications system, and the second communications device is the secondary node of the heterogeneous communications system.

According to an eighth aspect, a communications device is provided. The communications device includes: one or more processors, a memory, and a communications interface. The memory and the communications interface are coupled to the one or more processors. The communications device communicates with another device through the communications interface. The memory is configured to store computer program code. The computer program code includes an instruction. When the one or more processors execute the instruction, the communications device performs the communication method according to the sixth aspect and the possible implementations of the sixth aspect.

According to a ninth aspect, a computer-readable storage medium is further provided. The computer-readable storage medium stores an instruction. When the instruction is run on a communications device, the communications device is enabled to perform the communication method according to the sixth aspect and the possible implementations of the sixth aspect.

According to a tenth aspect, a computer program product including an instruction is further provided. When the computer program product is run on a communications device, the communications device is enabled to perform the communication method according to the sixth aspect and the possible implementations of the sixth aspect.

For detailed descriptions of the seventh aspect, the eighth aspect, the ninth aspect, and the tenth aspect, and the implementations thereof in this application, refer to detailed descriptions of the sixth aspect and the implementations of the sixth aspect. In addition, for beneficial effects of the seventh aspect, the eighth aspect, the ninth aspect, and the tenth aspect, and the implementations thereof, refer to analyses of beneficial effects in the sixth aspect and the implementations of the sixth aspect. Details are not described herein again.

In this application, a name of the foregoing communications device does not constitute any limitation to devices or function modules. During actual implementation, these devices or function modules may have other names. Each device or function module falls within the scope defined by the claims and their equivalent technologies in this application, provided that a function of the device or function module is similar to that described in this application.

These aspects or another aspect in this application is more concise and comprehensible in the following description.

DESCRIPTION OF EMBODIMENTS

Figure 1:
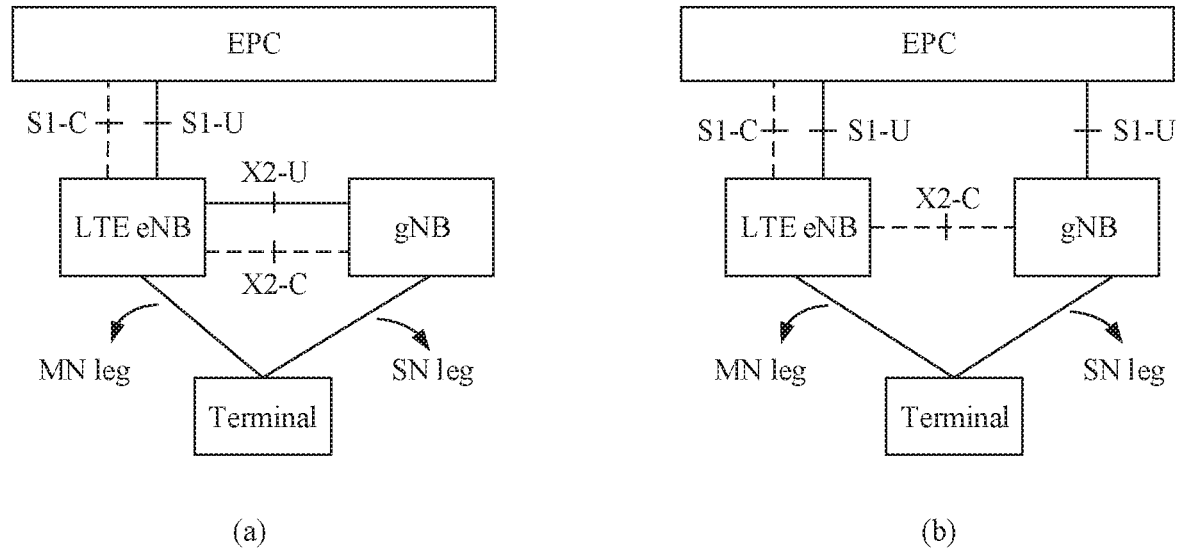
FIG. 1 is a schematic structural diagram of a communications system in an ENDC scenario.

In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "exemplary" or "example" or the like is intended to present a relative concept in a specific manner.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this application, unless otherwise stated, "multiple" means two or more than two.

A duplication operation (duplication) is introduced on a RAN side in a 5G system. Specifically, a PDCP layer of a transmit end makes one copy (or a plurality of copies) of an original (original) data packet, generating a plurality of same data packets, namely, the original data packet and a duplicated data packet. The transmit end may use a DC manner to send the same data packets to a peer end twice (or a plurality of times) along two independent transmission paths (transmission path). After a receive end receives the foregoing data packets, a PDCP layer performs duplicate data packet detection, deletes a duplicate data packet, and transmits, to an upper layer, only one data packet that is not duplicate.

According to a communication method provided in the embodiments of this application, the transmit end may generate two same data packets, or may be configured to generate a plurality of same data packets. For ease of description, all subsequent content in the embodiments of this application is described by using an example in which the transmit end generates two same data packets.

Currently, the third generation partnership project (3rd Generation Partnership Project, 3GPP) is discussing duplication inside a next-generation access network (New Radio, NR) and draws the following conclusions:

1. The transmit end may perform duplication in a carrier aggregation (Carrier Aggregation, CA) manner, to be specific, the two same data packets are respectively sent to the peer end by using different carrier components (Carrier Component, CC)/cells; or perform duplication in a DC manner, to be specific, the two same data packets are respectively sent to the peer end by using different transmission links/legs (leg)/base stations/cell groups (cell group).

2. The PDCP layer of the transmit end is responsible for generating a duplicated data packet, and the PDCP layer of the receive end is responsible for performing duplicate data packet detection, to ensure that there is no duplicate data packet in data packets delivered to an upper layer.

3. A gNB (also referred to as an NR base station) uses RRC signaling to indicate, to a terminal, whether duplication has been configured for the PDCP layer. For example, the base station notifies, by using a 1-bit (bit) indication, the terminal whether uplink duplication has been configured for a PDCP entity/an RB corresponding to a PDCP entity. The radio bearer RB may be a signaling radio bearer SRB or a data radio bearer DRB.

It should be noted that, for downlink, the gNB is a transmit end, and the gNB may determine whether to perform duplication. The terminal is a receive end, provided that duplicate data packet detection is enabled for a PDCP layer of the terminal. However, for uplink, the terminal is a transmit end, and whether the terminal needs to generate a duplicated data packet needs to be determined according to an indication of the base station.

4. The gNB activates/deactivates duplication by using MAC layer signaling.

It can be learned from the foregoing description that the RRC signaling is only used to configure duplication. For whether to activate/deactivate duplication of an RB currently, the gNB may send the indication to the terminal by using a MAC control element (Control Element, CE).

For example, a bitmap (BitMap) is defined at a MAC layer, to indicate an active/inactive state of PDCP duplication corresponding to the DRB. "1" indicates active, and "0" indicates inactive.

It should be noted that, in a wireless communications system, a bearer (bearer) may include a radio bearer RB, an EPS bearer, an evolved radio access bearer E-RAB, and the like. Because the EPS bearer and the E-RAB each include a radio bearer part and are in a one-to-one correspondence with the radio bearer, the RB in this application may refer to the radio bearer, or may refer to the E-RAB or the EPS bearer.

In the 5G system, there is a heterogeneous communications system for multi-radio-access-technology dual connectivity (Multiple-RAT Dual Connectivity, MR-DC). The heterogeneous communications system includes an ENDC (E-UTRANR DC), an NEDC (NR E-UTRA DC), and an NG-ENDC (Next Generation E-UTRA NR DC). In the three heterogeneous communications systems, the LTE base station (LTE eNB/eLTE eNB) is connected to the NR base station (referred to as the gNB) through dual connectivity. The eLTE eNB is an LTE eNB that can be connected to an NGC. The NGC is also referred to as a 5th generation core (5th Generation Core, 5GC), and the eLTE eNB is also referred to as an ng-eNB.

The ENDC is also referred to as Option 3/3A/3X. In an ENDC communications system, an LTE eNB is an MN, a gNB is an SN, the MN is connected to an evolved packet core (Evolved Packet Core, EPC), and the MN and the SN provide an air interface transmission resource for data between the terminal and the EPC.

As shown in FIG. 1, (a) in FIG. 1 is a schematic structural diagram of an Option 3 communications system, and (b) in FIG. 1 is a schematic structural diagram of an Option 3A communications system. In the Option 3 communications system, an LTE eNB is connected to an EPC through an S1 interface (including an S1-C interface and an S1-U interface), the LTE eNB is connected to a gNB through an X2 interface, the LTE eNB is connected to a terminal by using an MN leg, and the gNB is connected to the terminal by using an SN leg. The Option 3A communications system is different from the Option 3 communications system in that, a gNB is further connected to an EPC through an S1-U interface. For ease of distinguishing, in FIG. 1, control plane connections are represented by using dashed lines.

The NEDC is also referred to as Option 4/4A. In an NEDC communications system, a gNB is an MN, an eLTE eNB is an SN, an MN is connected to an NGC, and the MN and the SN provide an air interface transmission resource for data between a terminal and the NGC.

Figure 2:
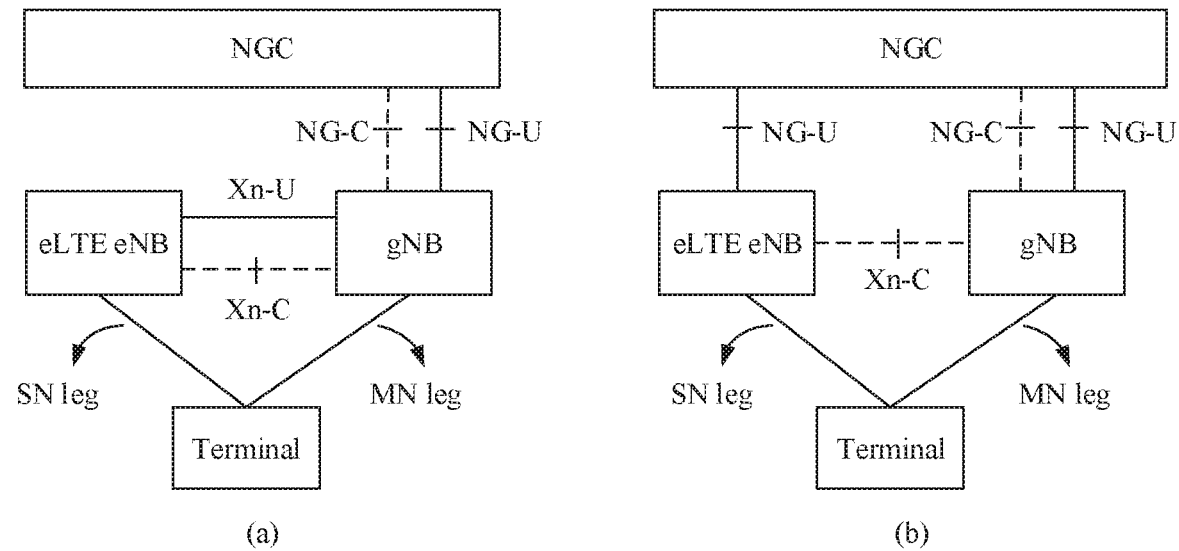
FIG. 2 is a schematic structural diagram of a communications system in an NEDC scenario.

As shown in FIG. 2, (a) in FIG. 2 is a schematic structural diagram of an Option 4 communications system, and (b) in FIG. 2 is a schematic structural diagram of an Option 4A communications system. In the Option 4 communications system, a gNB is connected to an NGC through an NG interface (including an NG-C interface and an NG-U interface), an eLTE eNB is connected to a gNB through an Xn interface, the gNB is connected to a terminal by using an MN leg, and the eLTE eNB is connected to the terminal by using an SN leg. The Option 4A communications system is different from the Option 4 communications system in that, an eLTE eNB is further connected to an NGC through an NG-U interface. For ease of distinguishing, in FIG. 2, control plane connections are represented by using dashed lines.

The NG-ENDC is also referred to as Option 7/7A/7X. In an NG-ENDC communications system, an eLTE eNB is an MN, a gNB is an SN, and the MN is connected to an NGC. The NG-ENDC communications system is different from the foregoing ENDC communications system in that, the MN and the SN provide an air interface transmission resource for data between a terminal and the NGC.

Figure 3:
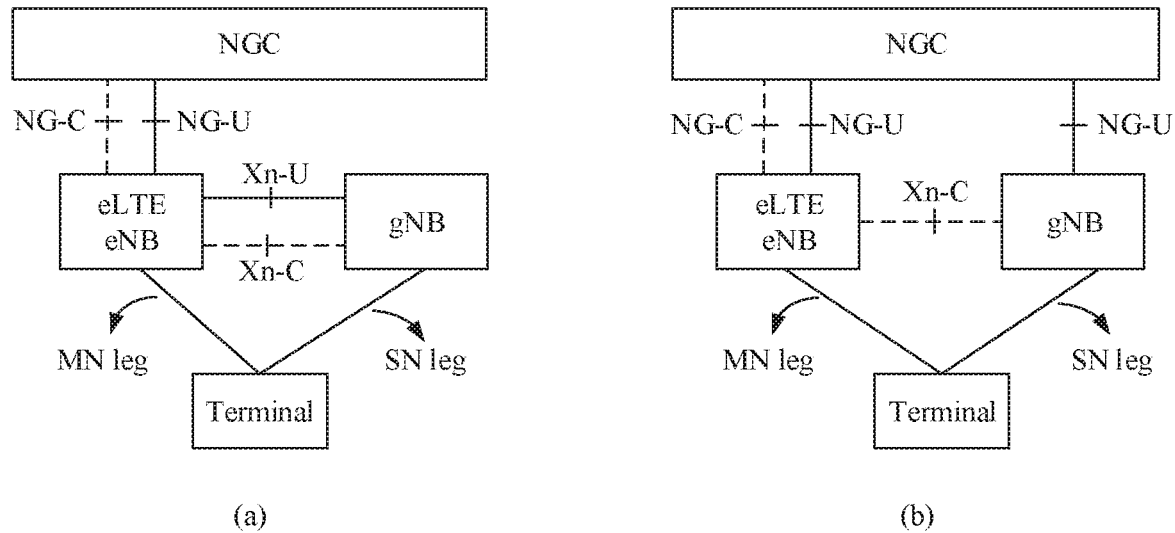
FIG. 3 is a schematic structural diagram of a communications system in an NG-ENDC scenario.

As shown in FIG. 3, (a) in FIG. 3 is a schematic structural diagram of an Option 7 communications system, and (b) in FIG. 3 is a schematic structural diagram of an Option 7A communications system. In the Option 7 communications system, an eLTE eNB is connected to an NGC through an NG interface (including an NG-C interface and an NG-U interface), the eLTE eNB is connected to a gNB through an Xn interface, the eLTE eNB is connected to a terminal by using an MN leg, and the gNB is connected to the terminal by using an SN leg. The Option 7A communications system is different from the Option 7 communications system in that, a gNB is further connected to an NGC through an NG-U interface. For ease of distinguishing, in FIG. 3, control plane connections are represented by using dashed lines.

In the 5G system, the gNB may include a centralized unit (Centralized Unit, CU) and a distributed unit (Distributed Unit, DU).

The CU is mainly configured to be responsible for centralized management and control of a radio resource and a connection, and has a wireless higher layer protocol stack function, for example, an RRC layer or a PDCP layer. The CU can also support movement of some core network functions to an access network, where the access network is referred to as an edge computing network, so that a higher requirement, on a network delay, of an emerging service (such as a video, online shopping, or virtual/augmented reality) in a future communications network can be satisfied. The DU has a distributed user plane processing function, and mainly has a physical layer function and a layer 2 function that has a relatively high real-time requirement. Correspondingly, the CU has the RRC layer and the PDCP layer, and the DU has an RLC layer, a MAC layer, and a PHY layer.

The CU may be deployed in a centralized manner, and deployment of the DU depends on an actual network environment. For example, for a core urban area, or an area with relatively high traffic density, a relatively small inter-site distance, or a limited equipment room resource, for example, a college or a large-scale performance venue, a DU may be deployed in the centralized manner. For an area with relatively sparse traffic, a relatively large inter-site distance, or the like, for example, an area such as a suburban county or a mountain area, a DU may be deployed in a distributed manner.

Figure 4:
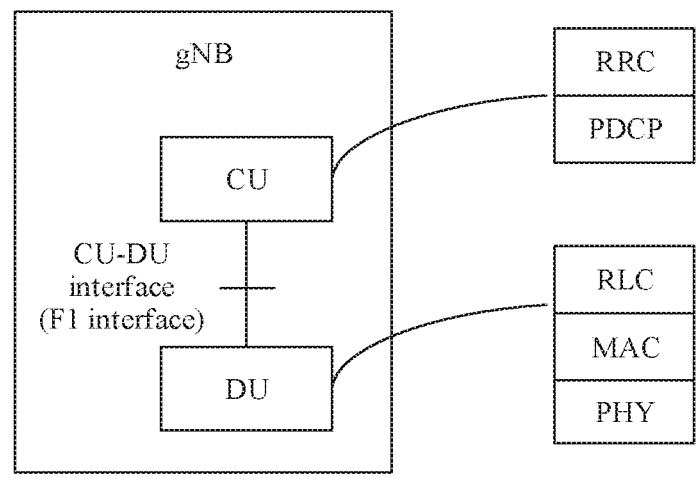
FIG. 4 is a schematic structural diagram of a gNB including a CU and a DU.

FIG. 4 is a schematic structural diagram of a gNB including a CU and a DU. As shown in FIG. 4, the CU communicates with the DU through a CU-DU interface. The interface may be configured to transmit a control plane message between the CU and the DU, an RRC message of a terminal of the gNB, data of a terminal served by the gNB, or the like. For ease of description, the CU-DU interface is referred to as an F1 interface, a control plane of the CU-DU interface is referred to as F1-C, and a user plane of the CU-DU interface is referred to as F1-U. A control plane message, between a CU and a DU, carried by the F1-C is referred to as an F1 application protocol (F1 Application Protocol, F1AP) message. The F1AP message may be divided into two parts: a common message (Common Message, or Non-UE-Associated) and a message related to user equipment (User Equipment, UE) (UE-Associated). The common message may be used for F1 interface management, a CU/DU configuration update, cell management, and the like. The message related to UE may be used to establish/manage/update/delete a UE context, and exchange a quality of service (Quality of Service, QoS) parameter of the UE, a protocol stack configuration of the UE, and the like. In addition, the message related to UE may be further used to transmit an RRC message of the UE, to be specific, transmission is performed by adding a PDCP protocol data unit (Protocol Data Unit, PDU) of an RRC message transmitted by using a signaling radio bearer (Signaling Radio Bearer, SRB) 1/an SRB 2'/an SRB 1S/an SRB 2S/an SRB 3 of the UE and an RRC PDU of an RRC message transmitted by using an SRB 0, to an F1AP message as RRC containers (Container). F1-U transmits data of the UE. Specifically, transmission is performed by encapsulating a PDCP PDU of the UE in a general packet radio service tunneling protocol-user plane (General Packet Radio Service Tunneling Protocol-User Plane, GTP-U) data packet. Herein, a DRB of the UE may be identified by using a GTP tunnel endpoint identifier (Tunnel Endpoint Identifier, TEID).

In the various communications systems of the MR-DC, provided that a PDCP layer of a PDCP anchor has a duplication function, a duplicated data packet may be generated after a duplication operation is configured and activated for an RB, and a same data packet may be transmitted for the RB by using an MN link and an SN link separately, improving data sending reliability. The NR PDCP has the duplication function. Therefore, in all the three communications systems of the MR-DC, an NR side has the duplication function; an LTE side may also have the duplication function because the NR PDCP may also be configured on the LTE side for a terminal. For example, if the PDCP anchor is an SN, the PDCP anchor may generate configuration information, and configure a duplication operation for an RB (for example, an SCG bearer or an SCG split bearer) of a secondary cell group (Secondary Cell Group, SCG)/an RB (SN terminated bearer) for which the PDCP is terminated on the SN. If the PDCP anchor is an MN, the PDCP anchor may generate configuration information, and configure a duplication operation for an RB (for example, an MCG bearer or an MCG split bearer) of a master cell group (Master Cell Group, MCG)/an RB (MN terminated bearer) for which the PDCP is terminated on the MN.

For ease of description, the RB (for example, an SCG bearer or an SCG split bearer) of the secondary cell group (Secondary Cell Group, SCG)/RB (SN terminated bearer) for which the PDCP is terminated on the SN is collectively referred to as an RB of the SCG; the RB (for example, an MCG bearer or an MCG split bearer) of the master cell group (Master Cell Group, MCG)/RB (MN terminated bearer) for which the PDCP is terminated on the MN is collectively referred to as an RB of the MCG.

Specifically, in a manner, the MN determines whether to configure a duplication operation for the RB of the MCG, and the SN determines whether to configure a duplication operation for the RB of the SCG. Alternatively, in another possible manner, the MN determines whether to configure a duplication operation for the RB of the MCG and the RB of the SCG. For the RB of the SCG, after the MN determines to configure the duplication operation for the RB of the SCG, the MN sends information about the RB (for example, an RB identifier (ID) and an RB index (RB index)) to the SN (for example, by using an interface message between the MN and the SN, where the interface message may be a control plane message of an X2/Xn interface; and optionally, the message is a secondary node addition request (SN addition request) message/a secondary node modification request (SN modification request) message), to enable the SN to generate configuration information (for example, a PDCP configuration) corresponding to the RB, and then the SN sends the configuration information to the MN (for example, by using an interface message between the MN and the SN, where the interface message may be a control plane message of the X2/Xn interface; and optionally, the message is a secondary node addition request acknowledge (SN addition request acknowledge) message/a secondary node modification request acknowledge (SN modification request acknowledge) message), so that the MN sends the configuration information to the terminal (for example, by using an RRC message, where the RRC message may be an RRC reconfiguration message), enabling the terminal to determine that the duplication operation has been configured for the RB.

A MAC layer of an NR gNB can activate/deactivate duplication, but a MAC layer of an E-UTRA/LTE base station (for example, an LTE eNB or an eLTE eNB) cannot perform an activation/deactivation operation. In this way, when the PDCP anchor is an LTE base station, the LTE base station cannot send an activation/deactivation indication to the terminal through an LTE air interface.

In addition, in a scenario in which the gNB includes the CU and the DU, currently there is no method for determining, by the gNB, whether to configure a duplication operation and determining whether to activate/deactivate the duplication operation after the configuration.

For the foregoing problem, an embodiment of this application provides a communication method. After obtaining status information of a duplication operation of an RB, a first communications device sends the status information of the duplication operation of the RB to a second communications device, so that the second communications device generates, based on the status information of the duplication operation of the RB, an activation indication used to indicate a terminal to activate/deactivate the duplication operation of the RB, and sends the activation indication to the terminal. When the first communications device is an LTE base station and the second communications device is a gNB, the LTE base station may send status information of an RB to the gNB after obtaining the status information of the RB, so that a MAC layer of the gNB generates an activation indication. This resolves the problem that the LTE base station cannot send the activation/deactivation indication to the terminal when the anchor is the LTE base station. When the first communications device is the CU in the gNB and the second communications device is the DU in the gNB, an activation indication may be generated by using a MAC layer of the DU, and then the activation indication is sent to the terminal. In this way, configuration and activation of a duplication operation are implemented in a scenario in which the gNB includes the CU and the DU. Herein, the first communications device and a PDCP anchor may be a same device, or may be different devices. When the first communications device is an MN, the second communications device may be a PDCP anchor. The MN and the PDCP anchor may be a same device, or may be different devices. When the first communications device is an MN, the second communications device may be a gNB. The MN and the gNB may be a same device, or may be different devices.

In addition, an embodiment of this application further provides a communication method. A first communications device obtains information about an RB for which a duplication operation has been configured, and determines whether to activate the duplication operation of the RB. Correspondingly, the first communications device generates an activation indication used to indicate a terminal to activate/deactivate the duplication operation of the RB, and sends the activation indication to the terminal. The first communications device may be a gNB or a DU in the gNB, so that configuration and activation of a duplication operation in a scenario in which the gNB includes a CU and the DU may also be implemented. Certainly, herein, the first communications device and a PDCP anchor may be a same device, or may be different devices.

In the communication method provided in this embodiment of this application, the PDCP anchor determines whether to configure the duplication operation for the RB, and the PDCP anchor determines whether to activate/deactivate the duplication operation of the RB. Alternatively, the PDCP anchor determines whether to configure the duplication operation for the RB, and the gNB determines whether to activate/deactivate the duplication operation of the RB. Alternatively, a master node determines whether to configure the duplication operation for the RB, and the PDCP anchor determines whether to activate/deactivate the duplication operation of the RB. Alternatively, a master node determines whether to configure the duplication operation for the RB, and the gNB determines whether to activate/deactivate the duplication operation of the RB. Alternatively, a master node determines whether to configure the duplication operation for the RB, and the master node determines whether to activate/deactivate the duplication operation of the RB.

Because a MAC layer of the gNB generates a MAC CE and sends, to the terminal, the MAC CE generated by the gNB, in subsequent content in this embodiment of this application, the gNB is also represented as a "MAC CE sending device".

The PDCP anchor in this embodiment of this application may be the LTE base station, or may be the gNB. With reference to FIG. 1 and FIG. 3, for the duplication operation of the RB of the MCG, the PDCP anchor is an LTE base station. For the duplication operation of the RB of the SCG, the PDCP anchor is a gNB. Similarly, with reference to FIG. 2, for the duplication operation of the RB of the SCG, the PDCP anchor is an LTE base station. For the duplication operation of the RB of the MCG, the PDCP anchor is a gNB.

The communication method provided in this embodiment of this application is applicable to the heterogeneous communications system shown in any one of FIG. 1 to FIG. 3.

Figure 5:
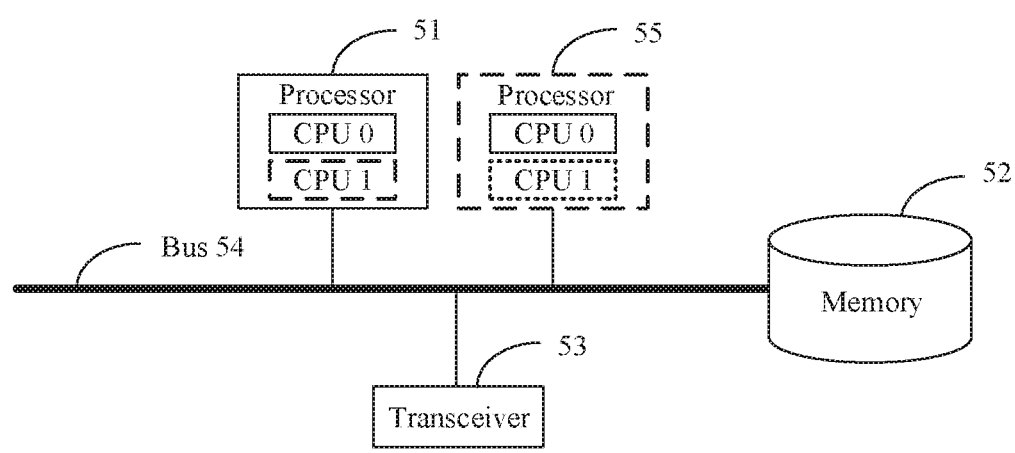
FIG. 5 is a schematic structural diagram of hardware of a base station according to an embodiment of this application.

With reference to FIG. 1 to FIG. 3, both the LTE base station and the gNB are base stations. FIG. 5 shows a composition structure of a base station (eLTE eNB/eLTE eNB/gNB) according to an embodiment of this application.

As shown in FIG. 5, the base station may include at least one processor 51, a memory 52, a transceiver 53, and a bus 54.

Constituent components of the base station are described in detail with reference to FIG. 5 below.

The processor 51 is a control center of the base station, and may be one processor, or may be a collective name of a plurality of processing elements. For example, the processor 51 is a CPU, or may be an application-specific integrated circuit (Application Specific Integrated Circuit, ASIC), or is configured as one or more integrated circuits that implement this embodiment of this application, for example, one or more microprocessors (Digital Signal Processor. DSP), or one or more field programmable gate arrays (Field Programmable Gate Array, FPGA).

The processor 51 may perform various functions of the base station by running or executing a software program stored in the memory 52, and invoking data stored in the memory 52.

During specific implementation, in an embodiment, the processor 51 may include one or more CPUs, for example, a CPU 0 and a CPU 1 shown in the figure.

During specific implementation, in an embodiment, the base station may include a plurality of processors, for example, the processor 51 and a processor 55 shown in FIG. 5. Each of the processors may be a single-core (single-CPU) processor, or may be a multi-core (multi-CPU) processor. The processor herein may be one or more devices, circuits, and/or processing cores configured to process data (for example, a computer program instruction).

The memory 52 may be a read-only memory (Read-Only Memory, ROM), or another type of static storage device that can store static information and an instruction, a random access memory (Random Access Memory, RAM), or another type of dynamic storage device that can store information and an instruction, or may be an electrically erasable programmable read-only memory (Electrically Erasable Programmable Read-Only Memory, EEPROM), a compact disc read-only memory (Compact Disc Read-Only Memory, CD-ROM) or another optical disc storage, an optical disc storage (including a compact optical disc, a laser disc, an optical disc, a digital versatile optical disc, a Blu-ray optical disc, or the like), a magnetic disk storage medium, or another magnetic storage device, or any other medium that can carry or store expected program code in a form of an instruction or a data structure and can be accessed by a computer. However, the memory 52 is not limited thereto. The memory 52 may exist independently, and is connected to the processor 51 by using the bus 54. Alternatively, the memory 52 may be integrated with the processor 51.

The memory 52 is configured to store a software program used to execute a solution in this application, and the execution is controlled by the processor 51.

The transceiver 53 is configured to communicate with another device or a communications network. For example, the transceiver 53 is configured to communicate with a communications network such as the Ethernet, a radio access network (radio access network, RAN), or a wireless local area network (Wireless Local Area Network. WLAN). The transceiver 53 may include all or a part of a baseband processor, and may further selectively include an RF processor. The RF processor is configured to receive and send an RF signal. The baseband processor is configured to process a baseband signal converted from an RF signal or a baseband signal that is to be converted into an RF signal.

The bus 54 may be an industry standard architecture (Industry Standard Architecture. ISA) bus, a peripheral component interconnect (Peripheral Component, PCI) bus, an extended industry standard architecture (Extended Industry Standard Architecture. EISA) bus, or the like. The bus may be classified into an address bus, a data bus, a control bus, and the like. For ease of representation, only one thick line is used to represent the bus in FIG. 5, but this does not mean that there is only one bus or only one type of bus.

A device structure shown in FIG. 5 does not constitute a limitation to the base station. The base station may include more or fewer components than those shown in the figure, or combine some components, or have a different component arrangement.

The terminal in this embodiment of this application may be a mobile phone (a mobile phone 600 shown in FIG. 6), a tablet, a personal computer (Personal Computer, PC), a personal digital assistant (Personal Digital Assistant. PDA), a smartwatch, a netbook, a wearable electronic device, or the like that can implement, on a control plane and a user plane, data transmission with the eLTE eNB/eLTE eNB/gNB. A specific form of the device is not especially limited in this embodiment of this application.

Figure 6:
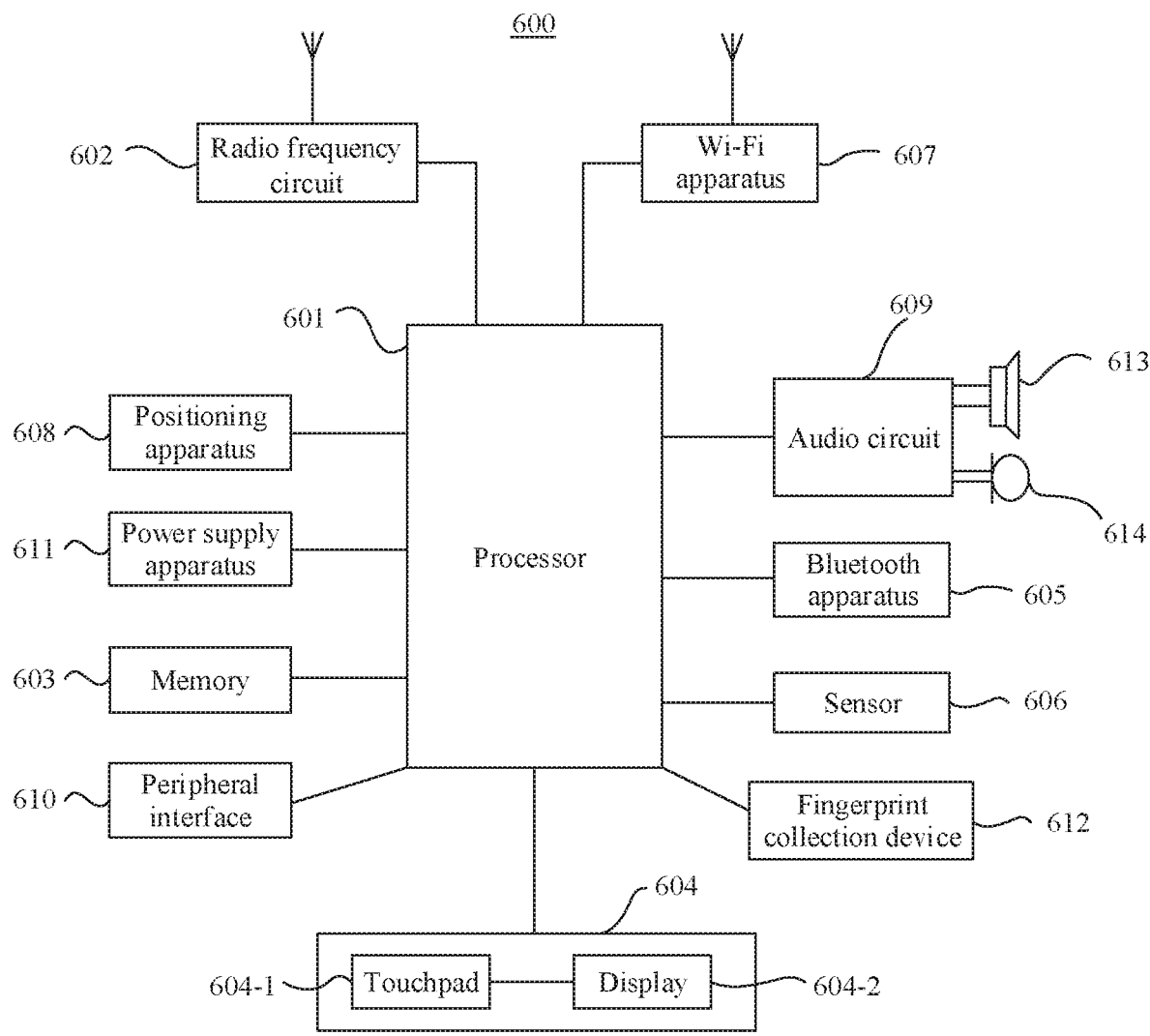
FIG. 6 is a schematic structural diagram of hardware of a mobile phone according to an embodiment of this application.

As shown in FIG. 6, using an example in which the mobile phone 600 is used as the foregoing terminal the mobile phone 600 may specifically include components such as a processor 601, a radio frequency (Radio Frequency, RF) circuit 602, a memory 603, a touchscreen 604, a Bluetooth apparatus 605, one or more sensors 606, a wireless fidelity (Wireless Fidelity, Wi-Fi) apparatus 607, a positioning apparatus 608, an audio circuit 609, a peripheral interface 610, and a power supply apparatus 611. These components may perform communication by using one or more communications buses or signal cables (not shown in FIG. 6). A person skilled in the art may understand that a hardware structure shown in FIG. 6 does not constitute a limitation to the mobile phone, and the mobile phone 600 may include more or fewer components than those shown in the figure, or combine some components, or have a different component arrangement.

The components of the mobile phone 600 are described in detail with reference to FIG. 6 below.

The processor 601 is a control center of the mobile phone 600, and is connected to various parts of the mobile phone 600 by using various interfaces and lines. By running or executing an application program stored in the memory 603, and invoking data stored in the memory 603, the processor 601 performs various functions of the mobile phone 600 and processes data. In some embodiments, the processor 601 may include one or more processing units. In some embodiments of the embodiments of this application, the processor 601 may further include a fingerprint verification chip, configured to verify a collected fingerprint.

The radio frequency circuit 602 may be configured to receive and send a radio signal in an information receiving and sending process or in a call process. Particularly, after receiving downlink data from a base station, the radio frequency circuit 602 may send the downlink data to the processor 601 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 602 may further communicate with another device through wireless communication. The wireless communication may use any communications standard or protocol, including but not limited to global system for mobile communications, general packet radio service, code division multiple access, wideband code division multiple access, long term evolution, email, short message service, and the like.

The memory 603 is configured to store an application program and data. By running the application program and the data that are stored in the memory 603, the processor 601 performs various functions of the mobile phone 600 and data processing. The memory 603 mainly includes a program storage area and a data storage area. The program storage area may store an operating system, and an application program required by at least one function (for example, a sound playing function or an image processing function). The data storage area may store data (for example, audio data or a phone book) created when the mobile phone 600 is used. In addition, the memory 603 may include a high-speed random access memory (RAM), and may further include a nonvolatile memory such as a magnetic disk storage device or a flash memory component, another volatile solid-state storage device, or the like. The memory 603 may store various operating systems such as an iOS operating system and an Android operating system. The memory 603 may be independent, and is connected to the processor 601 by using the communications bus. Alternatively, the memory 603 may be integrated with the processor 601.

The touchscreen 604 may specifically include a touchpad 604-1 and a display 604-2.

The touchpad 604-1 may collect a touch event performed on or near the touchpad 604-1 by a user of the mobile phone 600 (for example, an operation performed on or near the touchpad 604-1 by the user by using any proper object such as a finger or a stylus), and send collected touch information to another device (for example, the processor 601). The touch event performed near the touchpad 604-1 by the user may be referred to as a floating touch. The floating touch may mean that the user does not need to directly touch the touchpad to select, move, or drag a target (for example, an icon), and the user only needs to be near the device to perform a desired function. In addition, the touchpad 604-1 may be implemented in a plurality of types such as a resistive type, a capacitive type, an infrared type, and a surface acoustic wave type.

The display (also referred to as a display screen) 604-2 may be configured to display information entered by the user or information provided for the user, and various menus of the mobile phone 600. The display 604-2 may be a liquid crystal display, an organic light emitting diode, or the like. The touchpad 604-1 may cover the display 604-2. When detecting the touch event on or near the touchpad 604-1, the touchpad 604-1 transfers the touch event to the processor 601 to determine a type of the touch event. Then, the processor 601 can provide a corresponding visual output on the display 604-2 based on the type of the touch event. In FIG. 6, the touchpad 604-1 and the display screen 604-2 are used as two independent components to implement input and output functions of the mobile phone 600. However, in some embodiments, the touchpad 604-1 and the display screen 604-2 may be integrated to implement the input and output functions of the mobile phone 600. It may be understood that the touchscreen 604 is formed by stacking a plurality of layers of materials. In this embodiment of this application, only the touchpad (layer) and the display screen (layer) are displayed, and another layer is not set forth in this embodiment of this application. In addition, the touchpad 604-1 may be disposed on a front facet of the mobile phone 600 in a form of a full panel, and the display screen 604-2 may also be disposed on the front facet of the mobile phone 600 in the form of a full panel. In this way, a bezel-less structure can be implemented on the front facet of the mobile phone.

In addition, the mobile phone 600 may further have a fingerprint recognition function. For example, a fingerprint sensor 612 may be disposed on a back facet of the mobile phone 600 (for example, below a rear-facing camera), or the fingerprint sensor 612 may be disposed on the front facet of the mobile phone 600 (for example, below the touchscreen 604). For another example, a fingerprint collection device 612 may be disposed in the touchscreen 604 to implement the fingerprint recognition function. In other words, the fingerprint collection device 612 may be integrated with the touchscreen 604 to implement the fingerprint recognition function of the mobile phone 600. In this case, the fingerprint collection device 612 is disposed in the touchscreen 604, and may be a part of the touchscreen 604, or may be disposed in the touchscreen 604 in another manner. In this embodiment of this application, a main component of the fingerprint collection device 612 is a fingerprint sensor. The fingerprint sensor may use any type of sensing technology, including but not limited to an optical, a capacitive, a piezoelectric, or an ultrasonic sensing technology.

The mobile phone 600 may further include the Bluetooth apparatus 605, configured to implement data exchange between the mobile phone 600 and another short-distance device (for example, a mobile phone or a smartwatch). In this embodiment of this application, the Bluetooth apparatus may be an integrated circuit, a Bluetooth chip, or the like.

The mobile phone 600 may further include at least one sensor 606, such as an optic sensor, a motion sensor, or another sensor. Specifically, the optic sensor may include an ambient optical sensor and a proximity sensor. The ambient optical sensor may adjust luminance of the display in the touchscreen 604 based on brightness of ambience light. The proximity sensor may power off the display when the mobile phone 600 moves to an ear. As one type of the motion sensor, an accelerometer sensor may detect values of accelerations in all directions (usually, three axes), may detect a value and a direction of gravity when the mobile phone is stationary, and may be used in an application for identifying a mobile phone posture (such as screen switching between a landscape mode and a portrait mode, a related game, or magnetometer posture calibration), a function related to vibration identification (such as a pedometer or a knock), and the like. Another sensor such as a gyroscope, a barometer, a hygrometer, a thermometer, or an infrared sensor may be further configured in the mobile phone 600. Details are not described herein.

The Wi-Fi apparatus 607 is configured to provide the mobile phone 600 with network access that complies with a standard protocol related to Wi-Fi, and the mobile phone 600 may access a Wi-Fi access point by using the Wi-Fi apparatus 607, to help the user receive and send an email, browse a web page, access streaming media, and so on. The Wi-Fi apparatus 607 provides wireless broadband Internet access for the user. In some other embodiments, the Wi-Fi apparatus 607 may alternatively be used as a Wi-Fi wireless access point, and may provide Wi-Fi network access for another device.

The positioning apparatus 608 is configured to provide a geographical location for the mobile phone 600. It may be understood that the positioning apparatus 608 may be specifically a receiver of a positioning system such as the global positioning system (Global Positioning System, GPS), the BeiDou navigation satellite system, or the Russia GLONASS. After receiving a geographical location sent by the positioning system, the positioning apparatus 608 sends the information to the processor 601 for processing, or sends the information to the memory 603 for storage. In some other embodiments, the positioning apparatus 608 may alternatively be a receiver of the assisted global positioning system (Assisted Global Positioning System, AGPS). The AGPS system serves as an assisted server to assist the positioning apparatus 608 in completing ranging and positioning services. In this case, the auxiliary positioning server provides positioning assistance by communicating with a positioning apparatus 608 (namely, a GPS receiver) of a device such as the mobile phone 600 by using a wireless communications network. In some other embodiments, the positioning apparatus 608 may alternatively be a positioning technology that is based on a Wi-Fi access point. Because each Wi-Fi access point has a globally unique MAC address, and a device may scan and collect a broadcast signal of a surrounding Wi-Fi access point when Wi-Fi is enabled for the device, the device can obtain a MAC address broadcast by the Wi-Fi access point. The device sends, to a location server by using a wireless communications network, the data (for example, the MAC address) that can indicate the Wi-Fi access point. The location server retrieves a geographical location of each Wi-Fi access point, calculates a geographic location of the device with reference with strength of a Wi-Fi broadcast signal, and sends the geographic location of the device to the positioning apparatus 608 of the device.

The audio circuit 609, a speaker 613, and a microphone 614 may provide an audio interface between the user and the mobile phone 600. The audio circuit 609 may transmit, to the speaker 613, an electrical signal converted from received audio data, and the speaker 613 converts the electrical signal into a sound signal for output. On the other hand, the microphone 614 converts a collected sound signal into an electrical signal. The audio circuit 609 receives the electrical signal, converts the electrical signal into audio data, and then outputs the audio data to the RF circuit 602, to send the audio data to, for example, another mobile phone, or outputs the audio data to the memory 603 for further processing.

The peripheral interface 610 is configured to provide various interfaces for an external input/output device (for example, a keyboard, a mouse, an external display, an external memory, or a subscriber identification module card). For example, the peripheral interface 610 is connected to a mouse through a universal serial bus (Universal Serial Bus, USB) interface, and is connected, by using a metal contact on a card slot of a subscriber identification module card, to a subscriber identification module (Subscriber Identification Module, SIM) card provided by a telecom operator. The peripheral interface 610 may be configured to couple the foregoing external input/output peripheral device to the processor 601 and the memory 603.

In this embodiment of this application, the mobile phone 600 may communicate with another device in a device group by using the peripheral interface 610. For example, the mobile phone 600 may receive, through the peripheral interface 610, display data sent by the another device, for displaying. This is not limited in this embodiment of this application.

The mobile phone 600 may further include the power supply apparatus 611 (for example, a battery or a power supply management chip) that supplies power to the components. The battery may be logically connected to the processor 601 by using the power supply management chip, so that functions such as charging, discharging, and power consumption management are implemented by using the power supply apparatus 611.

Although not shown in FIG. 6, the mobile phone 600 may further include a camera (a front-facing camera and/or a rear-facing camera), a flash, a micro projection apparatus, a near field communication (Near Field Communication, NFC) apparatus, and the like. Details are not described herein.

In the heterogeneous communications systems shown in FIG. 1 to FIG. 3, there are five communication modes for communication methods provided in the embodiments of this application.

Communication mode 1: The PDCP anchor determines whether to configure a duplication operation of an RB, and determines status information of the duplication operation of the RB, that is, determines whether to activate/deactivate the duplication operation of the RB.

Communication mode 2: The PDCP anchor determines whether to configure a duplication operation of an RB, and the MAC CE sending device determines status information of the duplication operation of the RB, that is, determines whether to activate/deactivate the duplication operation of the RB.

Communication mode 3: The MN determines whether to configure a duplication operation of an RB, and determines status information of the duplication operation of the RB, that is, determines whether to activate/deactivate the duplication operation of the RB.

Communication mode 4: The MN determines whether to configure a duplication operation of an RB, and the PDCP anchor determines status information of the duplication operation of the RB, that is, determines whether to activate/deactivate the duplication operation of the RB.

Communication mode 5: The MN determines whether to configure a duplication operation of an RB, and the MAC CE sending device determines status information of the duplication operation of the RB, that is, determines whether to activate/deactivate the duplication operation of the RB.

For ease of understanding, a description of "determining to activate/deactivate a duplication operation of an RB" is used in all subsequent content in this embodiment of this application.

The PDCP anchor and the MAC CE sending device may be a same device, or may be different devices. For example, the PDCP anchor is an LTE base station, and the MAC CE sending device is a gNB. Alternatively, both the PDCP anchor and the MAC CE device are gNBs. The MN and the PDCP anchor may be a same device, or may be different devices. The MN and the MAC CE device may be a same device, or may be different devices. For example, the MN is an LTE base station, and the MAC CE device is a gNB. Alternatively, both the MN and the MAC CE device are gNBs.

It can be learned that, regardless of whether the PDCP anchor and the MAC CE sending device are a same device, in both the communication mode 1 and the communication mode 2, the PDCP anchor determines whether to configure the duplication operation of the RB. That the PDCP anchor determines whether to configure the duplication operation of the RB is described below.

Specifically, in this embodiment of this application, that the PDCP anchor determines whether to configure the duplication operation of the RB specifically includes:

Step 1: The PDCP anchor determines to configure a duplication operation for an RB of a terminal.

Specifically, the PDCP anchor determines whether to configure the duplication operation for the RB of the terminal.

Optionally, the PDCP anchor may determine, based on link quality of an MN leg and/or an SN leg, whether to configure the duplication operation of the RB. For example, if the link quality of the MN leg is less than a first threshold and/or the link quality of the SN leg is less than a second threshold, the PDCP anchor determines to configure the duplication operation for the RB. In this way, the PDCP anchor may send a same data packet by using the MN leg and the SN leg, improving data sending reliability. If the link quality of the MN leg is greater than a third threshold and/or the link quality of the SN leg is greater than a fourth threshold, the PDCP anchor configures the RB as a split (split) bearer. In this case, the PDCP anchor uses the MN leg and the SN leg to send different data packets, increasing a data rate of the terminal. The first threshold, the second threshold, the third threshold, and the fourth threshold may be a same value, or may be different values.

Optionally, in this embodiment of this application, the PDCP anchor may determine link quality of a leg based on a measurement result reported by the terminal, or may measure an uplink signal of the terminal and estimate link quality of a leg based on a result of the measurement. This is not specifically limited in this embodiment of this application.

Step 2: The PDCP anchor sends configuration information to the terminal by using the MN in the heterogeneous communications system.

It can be learned from the foregoing description that the PDCP anchor may be an LTE base station, or may be a gNB.

In the communications system shown in FIG. 1 or FIG. 3, the LTE base station is an MN, and the gNB is an SN. In the communications system shown in FIG. 2, the gNB is an MN, and the LTE base station is an SN. Therefore, in this embodiment of this application, the PDCP anchor and the MN may be a same device, or may be different devices.

If the PDCP anchor is an SN, after determining to configure the duplication operation for the RB of the terminal, the PDCP anchor further generates the configuration information, and sends the configuration information to the MN, so that the MN forwards the configuration information to the terminal. If the PDCP anchor is an MN, after determining to configure the duplication operation for the RB of the terminal, the PDCP anchor generates the configuration information, and sends the configuration information to the terminal. Optionally, the configuration information is included in a PDCP configuration.

Optionally, the MN may send the configuration information to the terminal by using an RRC reconfiguration (RRC Reconfiguration) message, or may send the configuration information to the terminal by using an RRC connection reconfiguration (RRC Connection Reconfiguration) message. This is not specifically limited in this embodiment of this application.

In all of the communication mode 3, the communication mode 4, and the communication mode 5, the MN determines whether to configure the duplication operation of the RB. That the MN determines whether to configure a duplication operation of an RB is described below.

Specifically, in this embodiment of this application, that the MN determines whether to configure a duplication operation of an RB specifically includes:

Step 1: The MN determines to configure a duplication operation for an RB of a terminal.

Specifically, the MN determines whether to configure the duplication operation for the RB of the terminal.

Optionally, the MN may determine, based on link quality of an MN leg and/or an SN leg, whether to configure the duplication operation of the RB. For example, if the link quality of the MN leg is less than a first threshold and/or the link quality of the SN leg is less than a second threshold, the MN determines to configure the duplication operation for the RB. In this way, the MN may send a same data packet by using the MN leg and the SN leg, improving data sending reliability. If the link quality of the MN leg is greater than a third threshold and/or the link quality of the SN leg is greater than a fourth threshold, the MN configures the RB as a split (split) bearer. In this case, the MN uses the MN leg and the SN leg to send different data packets, to increase a data rate of the terminal. The first threshold, the second threshold, the third threshold, and the fourth threshold may be a same value, or may be different values.

Optionally, in this embodiment of this application, the MN may determine link quality of a leg based on a measurement result reported by the terminal, or may measure an uplink signal of the terminal and estimate link quality of a leg based on a result of the measurement. This is not specifically limited in this embodiment of this application.

Step 2. The MN sends configuration information to the terminal.

It can be learned from the foregoing description that the MN may be an LTE base station, or may be a gNB.

In the communications system shown in FIG. 1 or FIG. 3, the LTE base station is an MN, and the gNB is an SN. In the communications system shown in FIG. 2, the gNB is an MN, and the LTE base station is an SN.

If the MN and the PDCP anchor are different devices, in other words, the PDCP anchor is an SN, after determining to configure the duplication operation for the RB of the terminal, the MN further notifies the SN of information about the RB for which the duplication operation has been configured. In this way, the SN generates the configuration information, and sends the configuration information to the MN, so that the MN forwards the configuration information to the terminal.

If the MN and the PDCP anchor are a same device, in other words, the PDCP anchor is an MN, after determining to configure the duplication operation for the RB of the terminal, the PDCP anchor generates the configuration information, and sends the configuration information to the terminal. Optionally, the configuration information is included in a PDCP configuration.

Optionally, the MN may send the configuration information to the terminal by using an RRC reconfiguration (RRC Reconfiguration) message, or may send the configuration information to the terminal by using an RRC connection reconfiguration (RRC Connection Reconfiguration) message. This is not specifically limited in this embodiment of this application.

Optionally, after determining a configuration of the duplication operation, the base station (the PDCP anchor or the MN) may further specify an initial active/inactive state of the duplication operation. For example, after determining the configuration of the duplication operation, the base station may specify the initial active/inactive state of the RB as an active state. Optionally, the MN adds the initial active/inactive state of the RB to an RRC message and sends the RRC message to the terminal. For example, the initial active/inactive state of the RB and the configuration information may be included in a same message and then the message is sent to the terminal, or the initial active/inactive state of the RB and the configuration information may be included in different messages and then the messages are sent to the terminal. For example, the initial active/inactive state of the RB is carried in the PDCP configuration. In this case, when the MN determines the configuration of the duplication operation, and the PDCP anchor is not an MN, the MN needs to notify the PDCP anchor of the initial active/inactive state of the RB. Therefore, when generating the PDCP configuration, the PDCP anchor sets the corresponding initial active/inactive state. Optionally, when the MAC CE sending device determines an active/inactive state of a subsequent duplication operation of the RB, and the base station is not a MAC CE sending device, after specifying the initial active/inactive state of the duplication operation of the RB, the base station sends the status information to the MAC CE sending device, so that the MAC CE sending device learns of a current status information of the duplication operation of the RB.

Further, after the PDCP anchor/MN determines the configuration of the duplication operation, the PDCP anchor determines whether to activate/deactivate the duplication operation, or the MAC CE sending device determines whether to activate/deactivate the duplication operation, or the MN determines whether to activate/deactivate the duplication operation. It can be learned from the foregoing description that, the MAC CE sending device is a gNB. Therefore, regardless of whether the PDCP anchor, the MCE CE sending device, or the MN determines whether to activate/deactivate the duplication operation, the base station determines whether to activate/deactivate the duplication operation. After the base station determines whether to activate/deactivate the duplication operation, a MAC layer of the MCE CE sending device generates a MAC CE used to indicate the activation/deactivation to be performed, and sends the MAC CE to the terminal.

The base station that determines whether to perform the activation/deactivation may be a gNB (that is, a device that determines whether to perform the activation/deactivation is the same as the MAC CE sending device), or may be an LTE base station (that is, a device that determines whether to perform the activation/deactivation is different from the MAC CE sending device).

That the base station determines whether to activate a duplication operation of an RB is described below. Specifically, in this embodiment of this application, that the base station determines whether to activate a duplication operation of an RB specifically includes:

Step I: The base station determines to activate/deactivate a duplication operation of an RB.

Step II: The MAC CE sending device generates a MAC CE used to indicate to activate/deactivate the duplication operation of the RB, and sends the MAC CE to the terminal.

It can be learned from the foregoing description that, the base station in step I may be a PDCP anchor, or may be a MAC CE sending device, or may be an MN.

A case in which the base station in step I is a PDCP anchor is described below.

The PDCP anchor determines whether to activate/deactivate a duplication operation of an RB. Specifically, the PDCP anchor may determine, specially for an uplink direction, whether to activate/deactivate the duplication operation of the RB.

Optionally, the PDCP anchor may determine, based on link quality of an MN leg and/or an SN leg, whether to activate the duplication operation. For example, if link quality of the MN leg is less than a first threshold and/or link quality of the SN leg is less than a second threshold, the PDCP anchor determines to activate the duplication operation of the RB. In this way, same data may be sent by using the MN leg and the SN leg, improving data sending reliability. If the link quality of the MN leg is greater than a third threshold and/or the link quality of the SN leg is greater than a fourth threshold, the PDCP anchor may determine to deactivate the duplication operation of the RB. The first threshold, the second threshold, the third threshold, and the fourth threshold may be a same value, or may be different values.

After the PDCP anchor determines a status (active/inactive) of a duplication operation of an RB, the MAC CE sending device (namely, the gNB) sends a corresponding MAC CE to the terminal, so that the terminal learns of RBs whose duplication operations are activated/deactivated, that is, step I is performed. Optionally, the PDCP anchor enables a PDCP duplicate packet detection function of the RB.

Specifically, when the PDCP anchor is the same as the MAC CE sending device, the PDCP anchor is a gNB. After the PDCP anchor determines to activate/deactivate a duplication operation of an RB, a MAC layer of the PDCP anchor generates a MAC CE used to indicate to activate/deactivate the duplication operation, and sends the MAC CE to the terminal.

This case is applicable to an RB of an SCG in an ENDC/NG-ENDC communications system and an RB of an MCG in an NEDC scenario.

When the PDCP anchor is different from the MAC CE sending device, the PDCP anchor is an LTE base station. After determining to activate/deactivate a duplication operation of an RB, the PDCP anchor sends status information of the duplication operation of the RB determined by the PDCP anchor to the MAC CE sending device, so that the MAC CE sending device generates a corresponding MAC CE.

Optionally, the PDCP anchor sends the status information of the duplication operation of the RB to the MAC CE sending device through an X2/Xn interface. For example, the status information of the duplication operation of the RB is carried in a secondary node addition request (SN addition request) message/secondary node modification request (SN modification request)/secondary node modification required (SN modification required) message.

Optionally, the MAC CE sending device sends a response message to the PDCP anchor through the X2/Xn interface, to determine to send the status information to the terminal. Optionally, after receiving the response message, the PDCP anchor enables a PDCP duplicate packet detection function of the RB. For example, the response message is a secondary node addition request acknowledge (SN addition request acknowledge) message/secondary node modification request acknowledge (SN modification request acknowledge) message/secondary node modification confirm (SN modification confirm) message. Alternatively, the MAC CE sending device sends reject information to the PDCP anchor through the X2/Xn interface, to indicate that the status information determined by the PDCP anchor is rejected. Optionally, the reject information carries a cause value to describe a cause of the rejection. For example, the reject information may be carried in a secondary node addition request acknowledge (SN addition request acknowledge) message/secondary node modification request acknowledge (SN modification request acknowledge) message/secondary node modification confirm (SN modification confirm) message/secondary node addition request reject (SN addition request reject) message/secondary node modification request reject (SN modification request reject) message/secondary node modification refuse (SN modification refuse) message.

This case is applicable to an RB of an MCG in an ENDC/NG-ENDC communications system and an RB of an SCG in an NEDC communications system.

It should be noted that, when the PDCP anchor determines whether to configure the duplication operation of the RB, and determines whether to activate the duplication operation of the RB, and the PDCP anchor is different from the MAC CE sending device, the information about the RB for which the duplication operation has been configured and the status information of the duplication operation of the RB may be carried in a same message and then the message is sent to the MAC CE sending device, or the information about the RB for which the duplication operation has been configured and the status information of the duplication operation of the RB may be carried in different messages and then the messages are sent to the MAC CE sending device.

A case in which the base station is a MAC CE sending device in step I is described below.

The MAC CE sending device determines whether to activate/deactivate a duplication operation of an RB. Specifically, the MAC CE sending device may determine, specially for uplink, whether to activate/deactivate a duplication operation of the RB of the terminal.

Optionally, the MAC CE sending device may determine, based on link quality of an MN leg and/or an SN leg, whether to activate the duplication operation. For example, if link quality of the MN leg is less than a first threshold and/or link quality of the SN leg is less than a second threshold, the MAC CE sending device determines to activate the duplication operation of the RB. In this way, same data may be sent by using the MN leg and the SN leg, improving data sending reliability. If the link quality of the MN leg is greater than a third threshold and/or the link quality of the SN leg is greater than a fourth threshold, the MAC CE sending device may determine to deactivate the duplication operation of the RB. The first threshold, the second threshold, the third threshold, and the fourth threshold may be a same value, or may be different values.

It may be understood that, because whether to configure a duplication operation of an RB is determined by the PDCP anchor, when the PDCP anchor is different from the MAC CE sending device, after determining to configure a duplication operation for an RB, the PDCP anchor sends information about the RB to the MAC CE sending device, so that the MAC CE sending device determines whether to activate/deactivate the duplication operation of the RB, and generates a corresponding MAC CE.

Optionally, the PDCP anchor sends, to the MAC CE sending device through the X2/Xn interface, information about the RB for which the duplication operation has been configured.

In an example, the information about the RB for which the duplication operation has been configured is carried in a secondary node addition request (SN addition request) message/secondary node modification request (SN modification request)/secondary node modification required (SN modification required) message. The information about the RB is an ID of the RB or a value of an index (index) of the RB. There is a one-to-one correspondence between the index of the RB and the ID of the RB. For example, when the value of the index is x, it indicates that the RB is an $x^{th}$ RB in a plurality of RBs, of the terminal, that are sorted in ascending or descending order of IDs of the RBs.

In another example, the information about the RB for which the duplication operation has been configured may be carried in an RB list. Duplication operation configuration indication information is carried to represent that the duplication operation has been configured for the corresponding RB.

Optionally, the MAC CE sending device sends the response message to the PDCP anchor through the X2/Xn interface, to determine to accept the configuration of the duplication operation of the RB. Optionally, after receiving the response message, the PDCP anchor enables a PDCP duplicate packet detection function of the RB. For example, the response message is a secondary node addition request acknowledge (SN addition request acknowledge) message/secondary node modification request acknowledge (SN modification request acknowledge) message/secondary node modification confirm (SN modification confirm) message. Alternatively, the MAC CE sending device sends reject information to the PDCP anchor through the X2/Xn interface, to indicate that configuration information of the duplication operation of the RB determined by the PDCP anchor is rejected. Optionally, the reject information carries a cause value to describe a cause of the rejection. For example, the reject information may be carried in a secondary node addition request acknowledge (SN addition request acknowledge) message/secondary node modification request acknowledge (SN modification request acknowledge) message/secondary node modification confirm (SN modification confirm) message/secondary node addition request reject (SN addition request reject) message/secondary node modification request reject (SN modification request reject) message/secondary node modification refuse (SN modification refuse) message.

This case is applicable to an RB of an SCG in the ENDC/NG-ENDC communications system and an RB of an MCG in the NEDC communications system.

Optionally, when the PDCP anchor determines to configure a duplication operation for an RB, the MAC CE sending device determines whether to activate/deactivate the duplication operation of the RB, and the PDCP anchor is different from the MAC CE sending device, the MAC CE sending device further sends status information of the duplication operation of the RB to the PDCP anchor, so that the PDCP anchor determines, based on the status information of the duplication operation of the RB, whether to enable duplicate data packet detection.

When the PDCP anchor is the same as the MAC CE sending device, there is no interaction between devices. This case is applicable to an RB of an SCG in the ENDC/NG-ENDC communications system and an RB of an MCG in the NEDC communications system.

A case in which the base station in step I is an MN is described below.

The MN determines whether to activate/deactivate a duplication operation of an RB. Specifically, the MN may determine, specially for an uplink direction, whether to activate/deactivate the duplication operation of the RB.

Optionally, the MN may determine, based on link quality of an MN leg and/or an SN leg, whether to activate the duplication operation. For example, if link quality of the MN leg is less than a first threshold and/or link quality of the SN leg is less than a second threshold, the MN determines to activate the duplication operation of the RB. In this way, same data may be sent by using the MN leg and the SN leg, improving data sending reliability. If the link quality of the MN leg is greater than a third threshold and/or the link quality of the SN leg is greater than a fourth threshold, the MN may determine to deactivate the duplication operation of the RB. The first threshold, the second threshold, the third threshold, and the fourth threshold may be a same value, or may be different values.

After the MN determines a status (active/inactive) of a duplication operation of an RB, the MAC CE sending device (namely, the gNB) sends a corresponding MAC CE to the terminal, so that the terminal learns of RBs whose duplication operations are activated/deactivated, that is, step II is performed. Optionally, the PDCP anchor enables a PDCP duplicate packet detection function of the RB.

Specifically, when the MN is the same as the MAC CE sending device, the MN is a gNB. After the MN determines to activate/deactivate a duplication operation of an RB, a MAC layer of the MN generates a MAC CE used to indicate to activate/deactivate the duplication operation, and sends the MAC CE to the terminal.

This case is applicable to an RB of an MCG/SCG in the NEDC scenario.

When the MN is different from the MAC CE sending device, the MN is an LTE base station. After determining to activate/deactivate a duplication operation of an RB, the MN sends a status information of the duplication operation of the RB determined by the PDCP anchor to the MAC CE sending device, so that the MAC CE sending device generates a corresponding MAC CE.

Optionally, the MN sends status information of the duplication operation of the RB to the MAC CE sending device through an X2/Xn interface. For example, the status information of the duplication operation of the RB is carried in a secondary node addition request (SN addition request) message/secondary node modification request (SN modification request) message/secondary node modification required (SN modification required) message.

Optionally, after the MAC CE sending device receives the status information, of the duplication operation of the RB, sent by the MN, the MAC CE sending device further sends a response message to the MN through the X2/Xn interface, to indicate that the status information has been sent to the terminal. Optionally, after receiving the response message, the MN enables a PDCP duplicate packet detection function of an RB of an MCG. For example, the response message is a secondary node addition request acknowledge (SN addition request acknowledge) message/secondary node modification request acknowledge (SN modification request acknowledge) message/secondary node modification confirm (SN modification confirm) message. Alternatively, the MAC CE sending device sends reject information to the MN through the X2/Xn interface, to indicate that the status information determined by the MN is rejected. Optionally, the reject information carries a cause value to describe a cause of the rejection. For example, the reject information may be carried in a secondary node addition request acknowledge (SN addition request acknowledge) message/secondary node modification request acknowledge (SN modification request acknowledge) message/secondary node modification confirm (SN modification confirm) message/secondary node addition request reject (SN addition request reject) message/secondary node modification request reject (SN modification request reject) message/secondary node modification refuse (SN modification refuse) message.

This case is applicable to an RB of an MCG/SCG in the ENDC/NG-ENDC communications system.

It should be noted that, when the MN determines whether to configure the duplication operation of the RB and determines whether to activate the duplication operation of the RB, information about the RB for which the duplication operation has been configured and information about an active state of the RB may be carried in a same message and then the message is sent to the MAC CE sending device, or the information about the RB for which the duplication operation has been configured and the information about an active state of the RB may be carried in different messages and then the messages are sent to the MAC CE sending device.

Optionally, after the PDCP anchor or the MN determines the configuration of the duplication operation, the base station (which may be a PDCP anchor, a MAC CE sending device, or a master node MN) may determine an initial active/inactive state of the duplication operation of the RB. A specific determining manner is similar to that of the active/inactive state indicated in the foregoing MAC CE. Optionally, after the base station determines the initial active/inactive state of the duplication operation of the RB, if the base station is not a PDCP anchor, the base station needs to notify the PDCP anchor of the initial active/inactive state, so that configuration information, of the RB, generated by the PDCP anchor includes the initial active/inactive state, and the configuration information is sent to the terminal by using the MN. Optionally, the MN adds the initial active/inactive state of the RB to an RRC message and sends the RRC message to the terminal. For example, the initial active/inactive state of the RB and the configuration information may be included in a same message and then the message is sent to the terminal, or the initial active/inactive state of the RB and the configuration information may be included in different messages and then the messages are sent to the terminal. For example, the initial active/inactive state of the RB is carried in the PDCP configuration. In this case, when the MN determines the configuration of the duplication operation, and the PDCP anchor is not an MN, the MN needs to notify the PDCP anchor of the initial active/inactive state of the RB. Therefore, when generating the PDCP configuration, the PDCP anchor sets the corresponding initial active/inactive state.

The communication methods provided in the embodiments of this application are described in detail with reference to FIG. 1 to FIG. 3 below.

Figure 7:
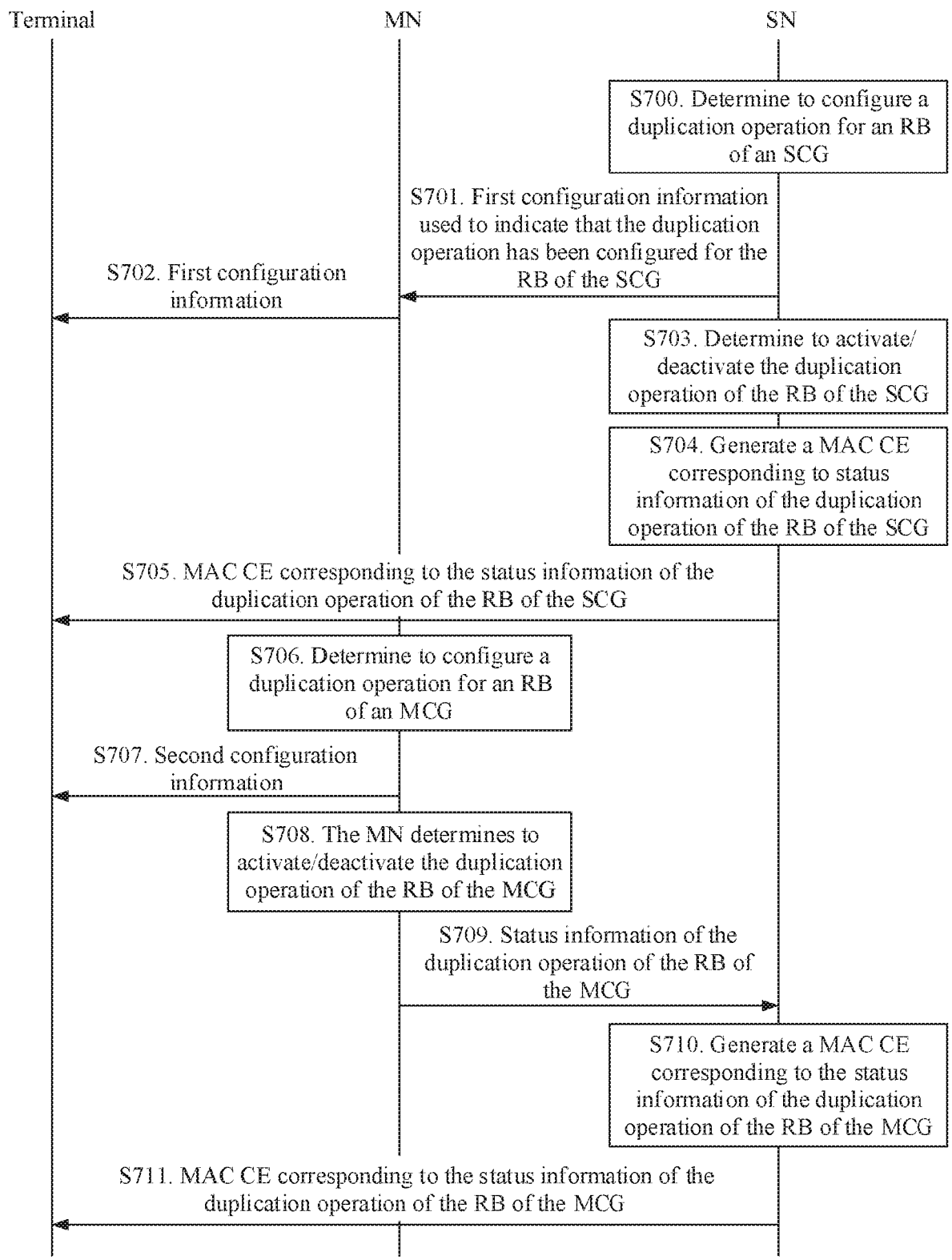
FIG. 7 is a first schematic flowchart of a communication method according to an embodiment of this application.

In the communications systems shown in FIG. 1 and FIG. 3, the MN is an LTE base station, and the SN is a gNB. As shown in FIG. 7, in the communications systems shown in FIG. 1 and FIG. 3, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S700 to S705. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S706 to S711.

Specifically, as shown in FIG. 7, the communication method provided in this embodiment of this application includes the following steps.

S700. The SN determines to configure a duplication operation for an RB of an SCG.

S701. The SN generates first configuration information used to indicate that the duplication operation has been configured for the RB of the SCG, and sends the first configuration information to the MN.

The first configuration information is a PDCP configuration of the RB of the SCG.

Optionally, the first configuration information may be included in an X2/Xn interface message, for example, an SgNB Modification Required message.

S702. The MN forwards the first configuration information to a terminal.

The first configuration information is included in an RRC connection reconfiguration (RRC Connection Reconfiguration) message.

S703. The SN determines to activate/deactivate the duplication operation of the RB of the SCG.

S704. The SN generates a MAC CE corresponding to status information of the duplication operation of the RB of the SCG.

For example, the SN sets a value of a bit location that is in the MAC CE and that corresponds to the RB of the SCG to a value corresponding to a status information of the duplication operation of the RB of the SCG.

S705. The SN sends, to the terminal, the MAC CE corresponding to the status information of the duplication operation of the RB of the SCG.

S706. The MN determines to configure a duplication operation for an RB of an MCG.

S707. The MN generates second configuration information used to indicate that the duplication operation has been configured for the RB of the MCG, and sends the second configuration information to the terminal.

The second configuration information is a PDCP configuration of the RB of the MCG. For example, the second configuration information is included in an RRC connection reconfiguration (RRC Connection Reconfiguration) message.

S708. The MN determines to activate/deactivate the duplication operation of the RB of the MCG.

S709. The MN sends status information of the duplication operation of the RB of the MCG to the SN.

The status information of the duplication operation of the RB of the MCG is included in an X2/Xn interface message, for example, an SgNB Modification Request message.

Optionally, the interface message includes either of or a combination of the following: an RB list, and a correspondence between a DRB identifier and an EPS bearer identifier. The RB list includes an RB identifier and a status information of the duplication operation of the RB.

Optionally, when the RB is an E-RAB, because the EPS bearer identifier is the same as an E-RAB identifier, the SN may learn of an identifier of a DRB corresponding to the E-RAB identifier. The correspondence between a DRB identifier and an EPS bearer identifier is included in an inter-node message (inter-node message), such as SCG ConfigInfo, sent by the MN to the SN.

Optionally, the SN may send a response message to the MN. The response message carries information used to indicate that the RB configuration is acknowledged or rejected. Optionally, when the response message carries information indicating the rejection, the response message carries a cause for the rejection.

In the communications systems shown in FIG. 1 and FIG. 3, the MN is an LTE base station, and the SN is a gNB. Therefore, after determining to activate/deactivate the duplication operation of the RB of the MCG, the MN further needs to send a status information of the duplication operation of the RB of the MCG to the SN, so that a MAC layer of the SN generates a MAC CE corresponding to the status information of the duplication operation of the RB of the MCG, and sends the MAC CE to the terminal.

S710. The SN generates the MAC CE corresponding to the status information of the duplication operation of the RB of the MCG.

For example, the SN sets a value of a bit location that is in the MAC CE and that corresponds to the RB of the MCG to a value corresponding to the status information of the duplication operation of the RB of the MCG.

S711. The SN sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S705 and S711 may alternatively be both performed.

It should be noted that, steps S700 to S705 are used to activate/deactivate the duplication operation of the RB of the SCG, and steps S706 to S711 are used to activate/deactivate the duplication operation of the RB of the MCG. The two parts are not subject to a sequence and may be used separately or together.

Figure 8A:
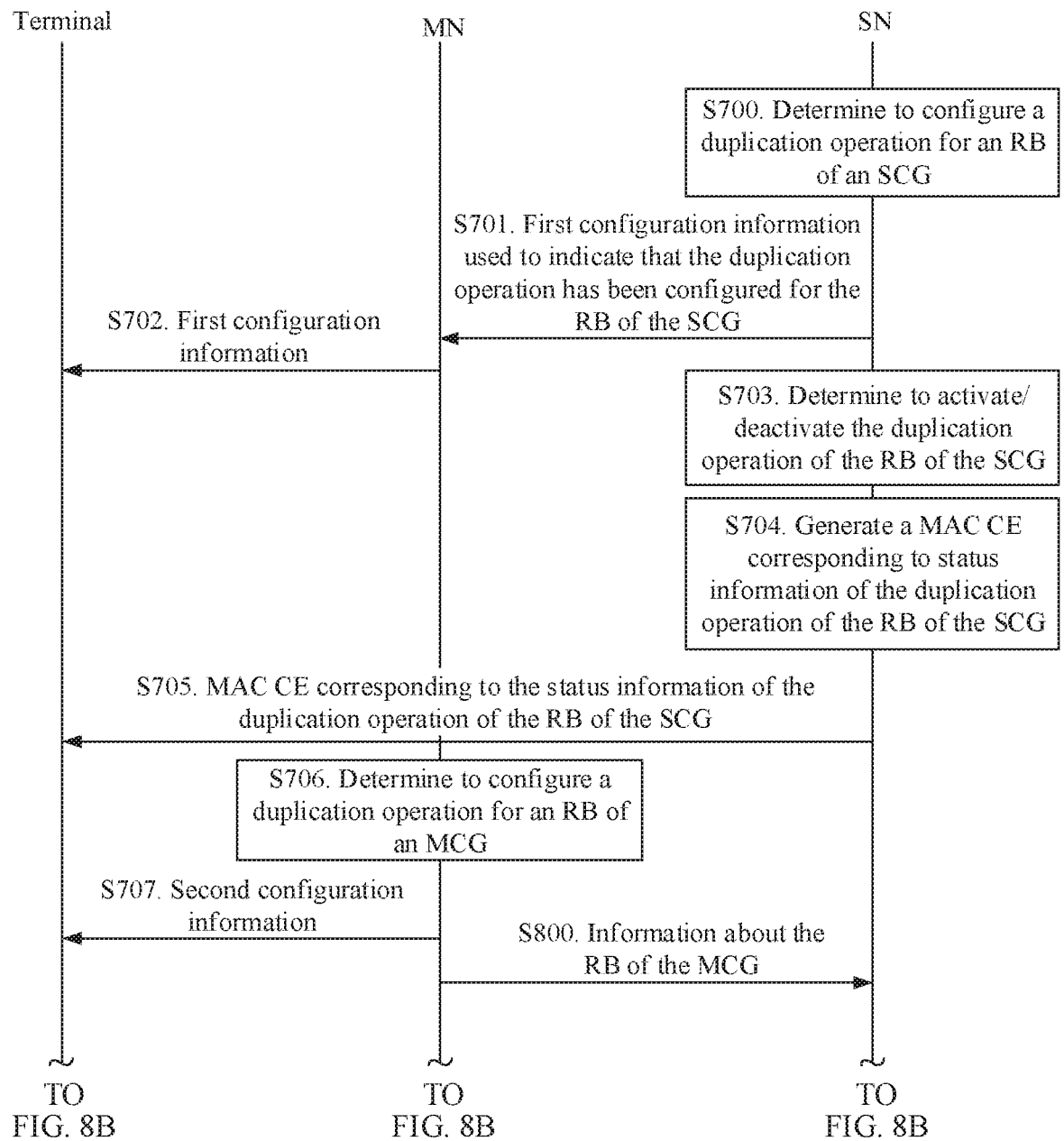
FIG. 8A and FIG. 8B are a second schematic flowchart of a communication method according to an embodiment of this application.
Figure 8B:
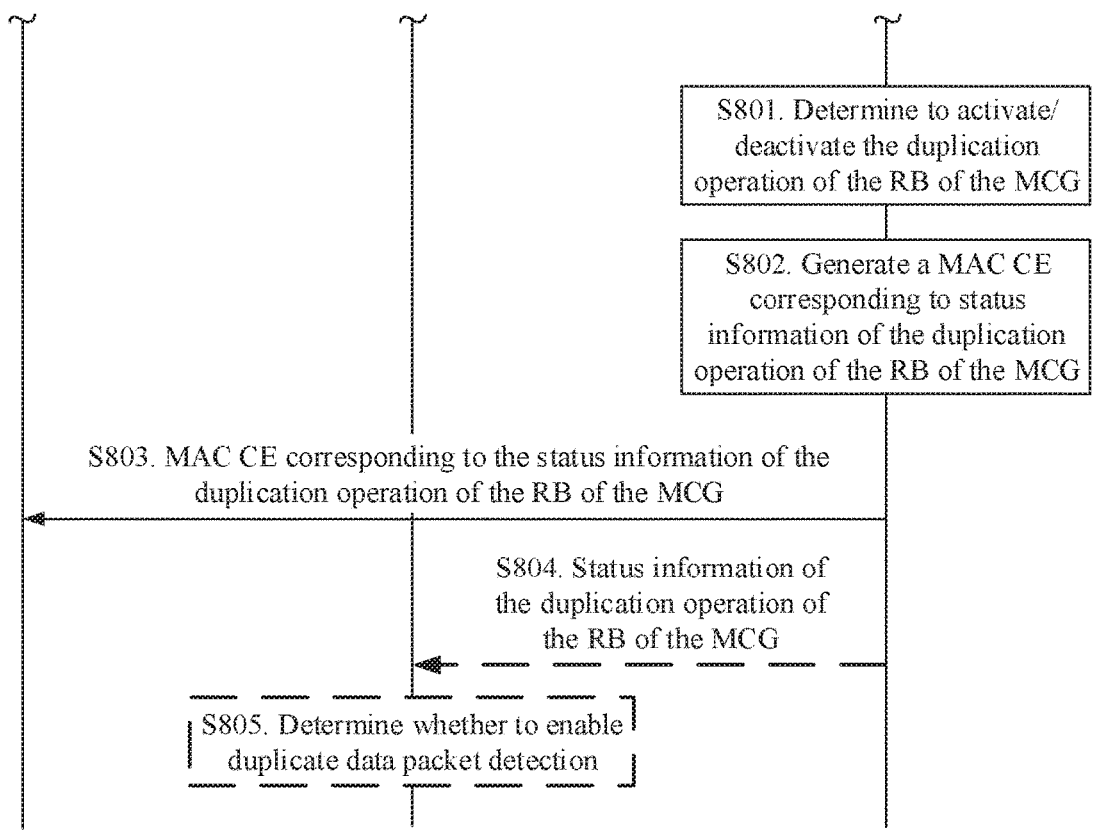

In the communications systems shown in FIG. 1 and FIG. 3, the MN is an LTE base station, and the SN is a gNB. With reference to FIG. 7, as shown in FIG. 8A and FIG. 8B, in the communications systems shown in FIG. 1 and FIG. 3, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S700 to S705. When the PDCP anchor is an MN, the MN determines to configure a duplication operation for an RB of an MCG, and the SN determines whether to activate/deactivate the duplication operation of the RB of the MCG. In this case, the communication method provided in this embodiment of this application includes steps S706 and S707, and S800 to S803 are performed after S707.

Specifically, with reference to FIG. 7, as shown in FIG. 8A and FIG. 8B, the communication method provided in this embodiment of this application includes S700 to S707 and the following steps.

S800. The MN sends, to the SN, information about the RB, of the MCG, for which the duplication operation has been configured.

The information about the RB of the MCG is included in an X2/Xn interface message, for example, an SgNB Modification Request message.

Optionally, the interface message includes either of or a combination of the following: an RB list, and a correspondence between a DRB identifier and an EPS bearer identifier. The RB list includes an RB identifier, and indication information indicating that the duplication operation has been configured for the RB.

Optionally, when the RB is an E-RAB, because the EPS bearer identifier is the same as an E-RAB identifier, the SN may learn of an identifier of a DRB corresponding to the E-RAB identifier.

Optionally, the SN may send a response message to the MN. The response message carries information used to indicate that the RB configuration is acknowledged or rejected. Optionally, when the response message carries information indicating the rejection, the response message carries a cause for the rejection.

S801. The SN determines to activate/deactivate the duplication operation of the RB of the MCG.

For example, the SN sets a value of a bit location that is in the MAC CE and that corresponds to the RB of the SCG to a value corresponding to a status information of the duplication operation of the RB of the SCG.

S802. The SN generates a MAC CE corresponding to status information of the duplication operation of the RB of the MCG.

S803. The SN sends, to the terminal, the MAC CE corresponding to the status information of the duplication operation of the RB of the MCG.

It should be noted that, based on an actual requirement, the S803 and the S705 may be both performed. Optionally, the MN sends, to the terminal, a message including the MAC CE corresponding to the status information of the duplication operation of the RB of the MCG and the MAC CE corresponding to the status information of the duplication operation of the RB of the SCG, or may separately send, to the terminal, a message including the MAC CE corresponding to the status information of the duplication operation of the RB of the MCG and a message including the MAC CE corresponding to the status information of the duplication operation of the RB of the SCG.

Optionally, as shown in FIG. 8A and FIG. 8B, a procedure of the communication method shown in FIG. 8A and FIG. 8B may further include S804 and S805.

S804. The SN sends the status information of the duplication operation of the RB of the MCG to the MN.

S805. The MN determines, based on the status information of the duplication operation of the RB of the MCG, whether to enable duplicate data packet detection.

S804 and S805 are optional, and therefore are represented by using dashed lines in FIG. 8A and FIG. 8B.

Figure 9A:
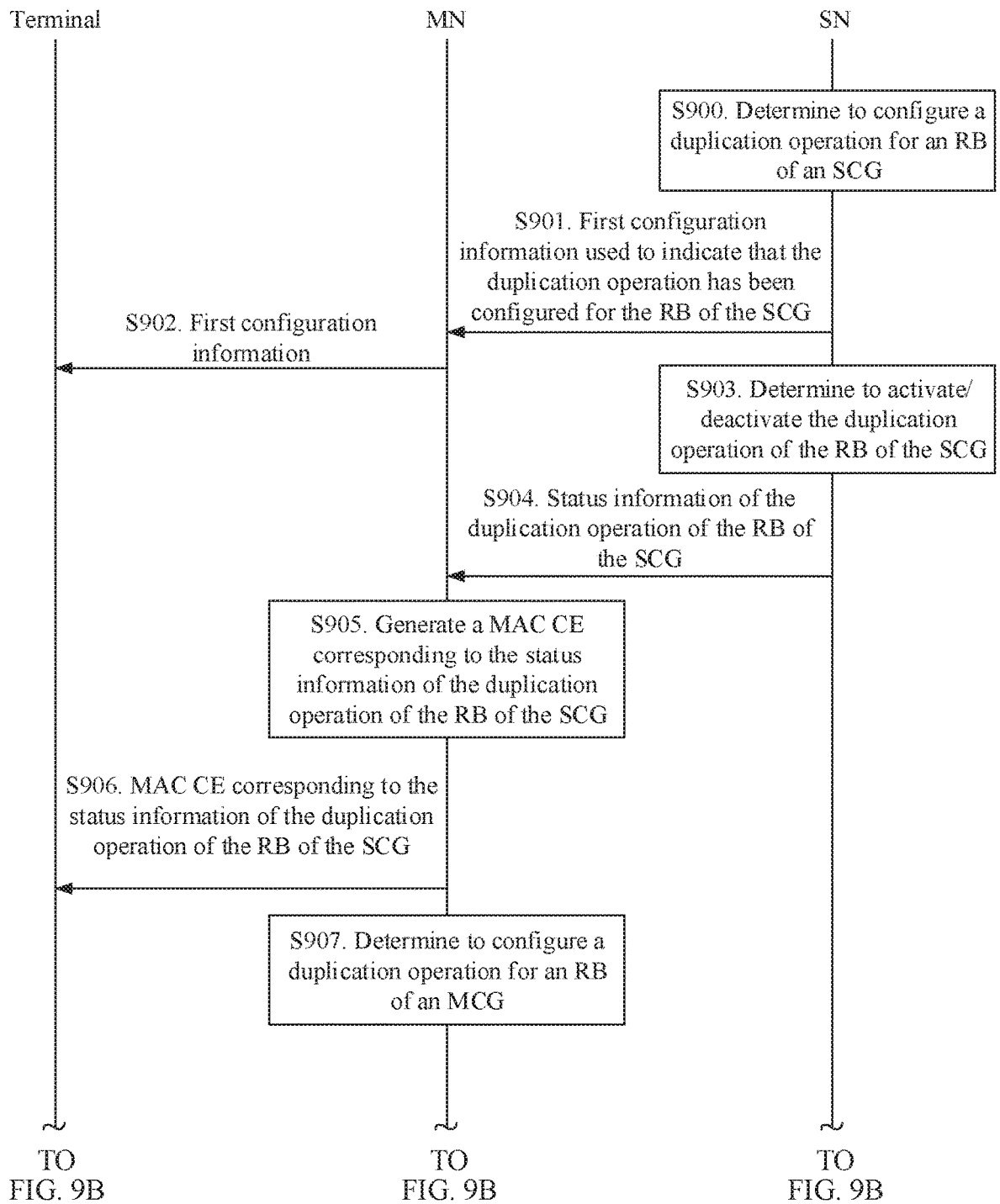
FIG. 9A and FIG. 9B are a third schematic flowchart of a communication method according to an embodiment of this application.
Figure 9B:
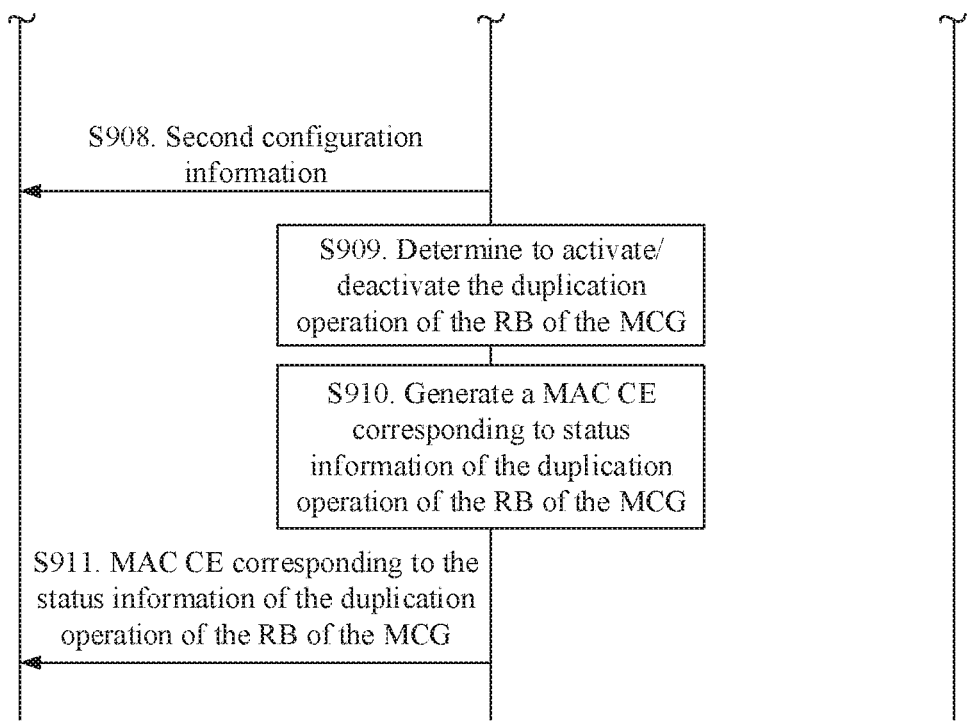

In the communications system shown in FIG. 2, the MN is a gNB, and the SN is an LTE base station. As shown in FIG. 9A and FIG. 9B, in the communications system shown in FIG. 2, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S900 to S906. When the PDCP anchor is an MN, the MN determines to configure a duplication operation for an RB of an MCG, and the MN determines whether to activate/deactivate the duplication operation of the RB of the MCG. In this case, the communication method provided in this embodiment of this application includes steps S907 to S911. The steps S900 to S906 and S907 to S911 may be used separately or together. This is not limited in this embodiment of this application.

Specifically, as shown in FIG. 9A and FIG. 9B, the communication method provided in this embodiment of this application includes the following steps.

S900. The SN determines to configure a duplication operation for an RB of an SCG.

S901. The SN generates first configuration information used to indicate that the duplication operation has been configured for the RB of the SCG, and sends the first configuration information to the MN.

The first configuration information is a PDCP configuration of the RB of the SCG. Optionally, the first configuration information is included in an Xn interface message, for example, an SeNB Modification Required message.

S902. The MN forwards the first configuration information to a terminal.

For example, the first configuration information is included in an RRC reconfiguration (RRC Reconfiguration) message.

S903. The SN determines to activate/deactivate the duplication operation of the RB of the SCG.

S904. The SN sends a status information of the duplication operation of the RB of the SCG to the MN.

The status information of the duplication operation of the RB of the SCG is included in the Xn interface message, for example, the SeNB Modification Required message.

Optionally, the interface message includes an RB list. The RB list includes an RB identifier and the status information of the duplication operation of the RB.

Optionally, the MN may send a response message to the SN. The response message carries information used to indicate that the RB configuration is acknowledged or rejected. Optionally, when the response message carries information indicating the rejection, the response message carries a cause for the rejection.

S905. The MN generates a MAC CE corresponding to status information of the duplication operation of the RB of the SCG.

For example, the MN sets a value of a bit location that is in the MAC CE and that corresponds to the RB of the SCG to a value corresponding to the status information of the duplication operation of the RB of the SCG.

S906. The MN sends, to the terminal, the MAC CE corresponding to the status information of the duplication operation of the RB of the SCG.

S907. The MN determines to configure a duplication operation for an RB of an MCG.

S908. The MN generates second configuration information used to indicate that the duplication operation has been configured for the RB of the MCG, and sends the second configuration information to the terminal.

The second configuration information is a PDCP configuration of the RB of the MCG. Optionally, the second configuration information is included in an RRC reconfiguration (RRC Reconfiguration) message.

S909. The MN determines to activate/deactivate the duplication operation of the RB of the MCG.

S910. The MN generates a MAC CE corresponding to status information of the duplication operation of the RB of the MCG.

For example, the MN sets a value of a bit location that is in the MAC CE and that corresponds to the RB of the MCG to a value corresponding to a status information of the duplication operation of the RB of the MCG.

S911. The MN sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S901 and S904 may alternatively be both performed, and S906 and S911 may alternatively be both performed.

Figure 10A:
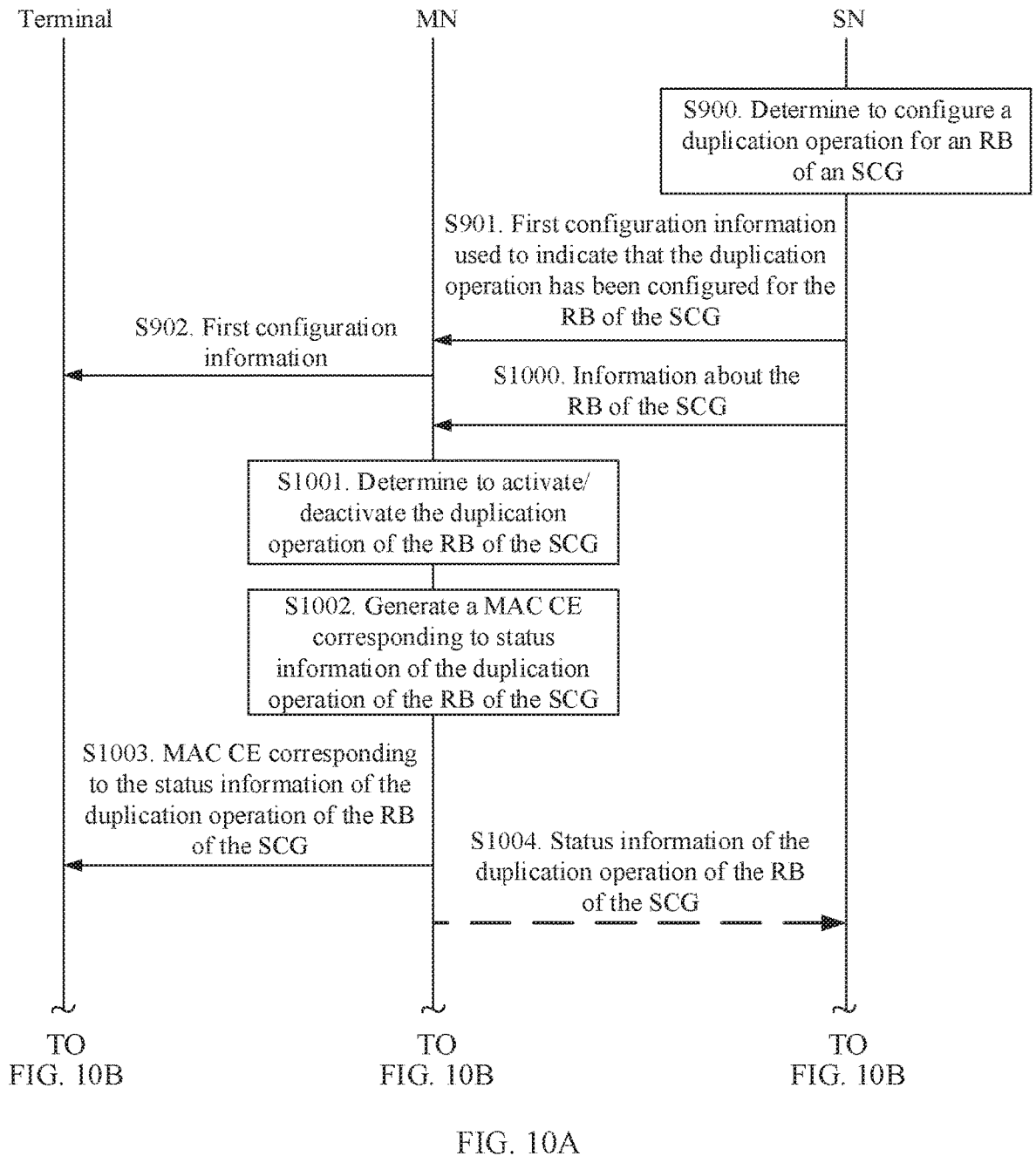
FIG. 10A and FIG. 10B are a fourth schematic flowchart of a communication method according to an embodiment of this application.
Figure 10B:
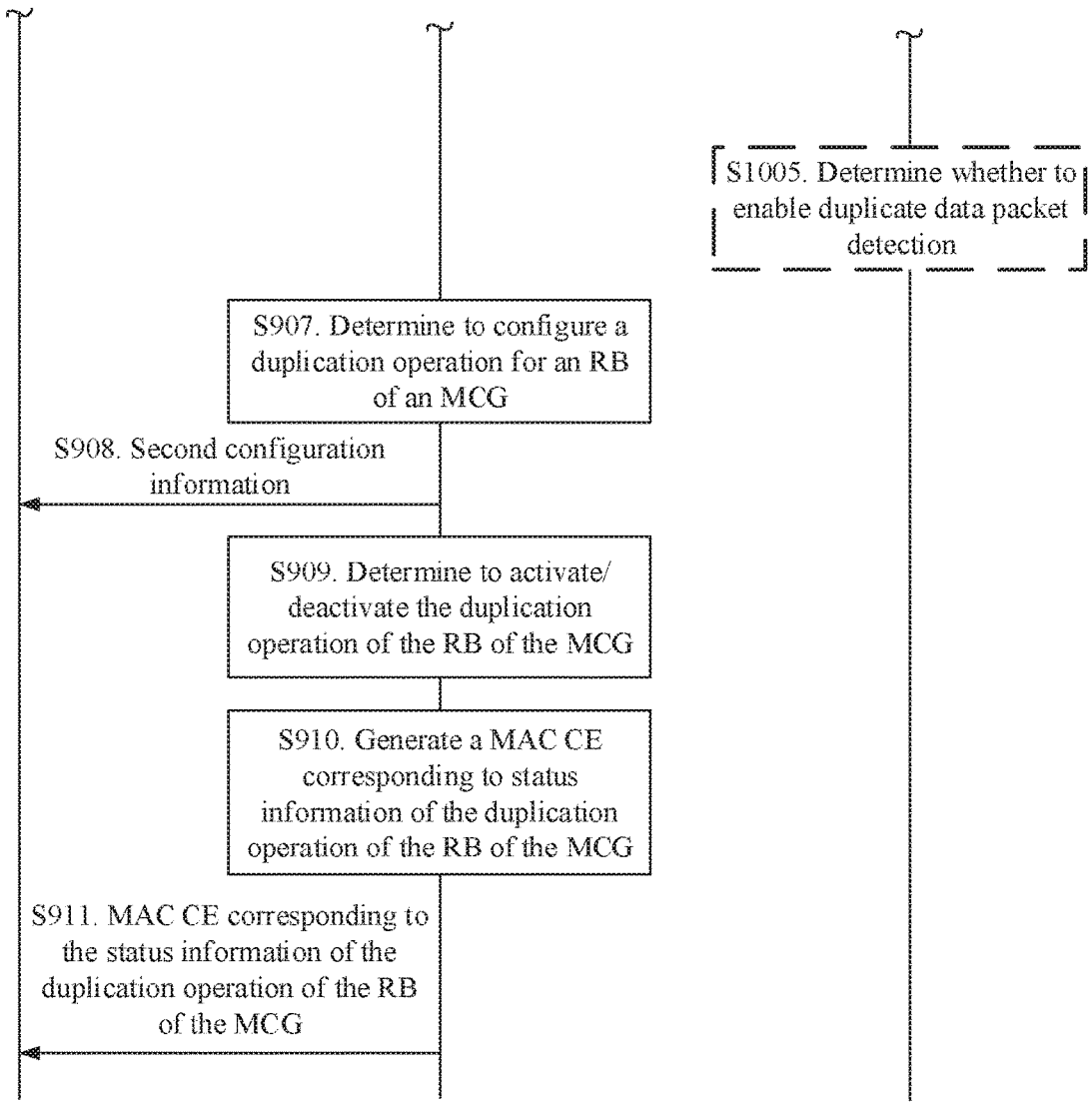

In the communications system shown in FIG. 2, the MN is a gNB, and the SN is an LTE base station. With reference to FIG. 9A and FIG. 9B, as shown in FIG. 10A and FIG. 10B, in the communications system shown in FIG. 2 when the PDCP anchor is an SN, the SN determines to configure a duplication operation for an RB of an SCG, and the MN determines whether to activate/deactivate the duplication operation of the RB of the SCG. In this case, a communication method provided in an embodiment of this application includes steps S900 to S902, and S1000 to S1003 are performed after S902. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S907 to S911.

Specifically, with reference to FIG. 9A and FIG. 9B, as shown in FIG. 10A and FIG. 10B, the communication method provided in this embodiment of this application includes S900 to S902, S1000 to S1003, and S907 to S911. S1000 to S1003 are specifically:

S1000. The SN sends information about the RB of the SCG to the MN.

The information about the RB of the SCG is included in an Xn interface message, for example, an SeNB Modification Required message.

Optionally, the interface message includes an RB list. The RB list includes an RB identifier, and indication information indicating that the duplication operation has been configured for the RB.

Optionally, the MN may send a response message to the SN. The response message carries information used to indicate that the RB configuration is acknowledged or rejected. Optionally, when the response message carries information indicating the rejection, the response message carries a cause for the rejection.

S1001. The MN determines to activate/deactivate the duplication operation of the RB of the SCG.

S1002. The MN generates a MAC CE corresponding to status information of the duplication operation of the RB of the SCG.

For example, the MN sets a value of a bit location that is in the MAC CE and that corresponds to the RB of the SCG to a value corresponding to a status information of the duplication operation of the RB of the MCG.

S1003. The MN sends, to the terminal, the MAC CE corresponding to the status information of the duplication operation of the RB of the SCG.

Optionally, after determining to activate/deactivate the duplication operation of the RB of the SCG, the MN further sends the status information of the duplication operation of the RB of the SCG to the SN, so that the SN determines, based on the status information of the duplication operation of the RB of the SCG, whether to enable duplicate data packet detection. As shown in FIG. 10A and FIG. 10B, a procedure of the communication method shown in FIG. 10A and FIG. 10B may further include S1004 and S1005 after S1001.

S1004. The MN sends status information of the duplication operation of the RB of the SCG to the SN.

S1005. The SN determines, based on the status information of the duplication operation of the RB of the SCG, whether to enable duplicate data packet detection.

S1004 and S1005 are optional, and therefore are represented by using dashed lines in FIG. 10A and FIG. 10B.

Further, if the gNB in this embodiment of this application includes a CU and a DU, this embodiment of this application further includes the following four solutions:

1. The CU determines whether to configure a duplication operation of an RB, and determines whether to activate the duplication operation of the RB.

2. The CU determines whether to configure a duplication operation of an RB, and the DU determines whether to activate the duplication operation of the RB.

3. The DU determines whether to configure a duplication operation of an RB, and determines whether to activate the duplication operation of the RB.

4. the DU determines whether to configure a duplication operation of an RB, and the CU determines whether to activate the duplication operation of the RB.

Specifically, in the ENDC communications system and the NG-ENDC communications system, the MN is an LTE/eLTE eNB, and the SN is an NR gNB. In an NEDC scenario, the MN is an NR gNB, and the SN is an eLTE eNB.

That a first base station includes a CU and a DU, and the first base station determines whether to configure a duplication operation of an RB is described below. The first base station may be a PDCP anchor or a master node in a heterogeneous communications system.

Step 1: The first base station determines to configure a duplication operation for an RB.

When the first base station is a PDCP anchor, it can be learned from the foregoing description that, if the PDCP anchor is an MN, the PDCP anchor determines to configure a duplication operation for an RB of an MCG. If the PDCP anchor is an SN, the PDCP anchor determines to configure a duplication operation for an RB of an SCG, generates configuration information used to indicate that the duplication operation has been configured for the RB, and sends the configuration information to the MN.

Specifically, if the PDCP anchor is an MN, and the MN includes an MN-CU and an MN-DU, an implementable manner is: determining, by the MN-CU, to configure a duplication operation for an RB of an MCG; another implementable manner is: determining, by the MN-DU, to configure a duplication operation for an RB of an MCG. In this case, the MN-DU needs to notify the MN-CU of information about the RB through an F1 interface, so that the MN-CU generates configuration information used to indicate that the duplication operation has been configured for the RB.

If the PDCP anchor is an SN, and the SN includes an SN-CU and an SN-DU, an implementable manner is: determining, by the SN-CU, to configure a duplication operation for an RB of an SCG; another implementable manner is: determining, by the SN-DU, to configure a duplication operation for an RB of an SCG. In this case, the SN-DU needs to notify the SN-CU of information about the RB through an F1 interface, so that the SN-CU generates configuration information used to indicate that the duplication operation has been configured for the RB.

When the first base station is a master node MN, it can be learned from the foregoing description that, the MN determines to configure a duplication operation for an RB of an MCG; the MN determines to configure a duplication operation for an RB of an SCG, and notifies, through an interface (for example, an X2 or Xn interface) between the MN and the SN, the SN of information about the RB, of the SCG, for which the duplication operation has been configured, so that the SN generates configuration information used to indicate that the duplication operation has been configured for the RB, and the SN sends the configuration information to the MN through the interface between the MN and the SN.

Specifically, when the MN includes an MN-CU and an MN-DU, an implementable manner is: determining, by the MN-CU, to configure a duplication operation for an RB of an MCG/SCG; another implementable manner is: determining, by the MN-DU, to configure a duplication operation for an RB of an MCG/SCG. In this case, the MN-DU needs to notify the MN-CU of information about the RB through an F1 interface, so that the MN-CU generates configuration information used to indicate that the duplication operation has been configured for the RB of the MCG, or the MN-CU sends, to the SN, information about the RB, of the SCG, for which the duplication operation has been configured, and the SN generates configuration information used to indicate that the duplication operation has been configured for the RB of the SCG.

In addition, if the SN includes an SN-CU and an SN-DU, an implementable manner is: determining, by the MN, to configure a duplication operation for an RB of an SCG, and notifying, through an interface (for example, an X2 or Xn interface) between the MN and the SN, the SN (which is specifically the SN-CU in this case) of information about the RB, of the SCG, for which the duplication operation has been configured, so that the SN-CU generates configuration information used to indicate that the duplication operation has been configured for the RB, and the SN-CU sends the configuration information to the MN through the interface between the MN and the SN.

Step 2: The PDCP anchor sends configuration information to the terminal by using the MN in the heterogeneous communications system.

If the PDCP anchor is an MN, and the MN includes an MN-CU and an MN-DU, regardless of whether the MN-CU determines to configure a duplication operation for an RB of an MCG or the MN-DU determines to configure a duplication operation for an RB of an MCG, the MN-CU generates configuration information used to indicate that the duplication operation has been configured for the RB of the MCG. After generating the configuration information, the MN-CU sends the configuration information to the terminal.

If the PDCP anchor is an SN, and the SN includes an SN-CU and an SN-DU, after the SN-DU determines to configure a duplication operation for an RB of an SCG, the SN-DU notifies the SN-CU of information about the RB through an F1 interface, so that the SN-CU generates configuration information used to indicate that the duplication operation has been configured for the RB, the SN-CU sends the configuration information to the MN, and the MN forwards the configuration information to the terminal. After the SN-CU determines to configure a duplication operation for an RB of an SCG, the SN-CU generates configuration information used to indicate that the duplication operation has been configured for the RB, and sends the configuration information to the MN, so that the MN forwards the configuration information to the terminal.

Optionally, the configuration information is an RRC message, for example, an RRC reconfiguration (RRC Reconfiguration) message in an NR system or an RRC connection reconfiguration (RRC Connection Reconfiguration) message in an LTE/eLTE system.

After the first base station determines to configure a duplication operation for an RB, a second base station determines whether to activate/deactivate the duplication operation of the RB. The second base station may be a PDCP anchor, a MAC CE sending device, or a master node MN. That a device (a PDCP anchor/a MAC CE sending device/an MN) that determines whether to activate a duplication operation of an RB includes a CU and a DU, and the CU/DU determines whether to activate the duplication operation of the RB is described below.

Step A: The second base station determines to activate/deactivate a duplication operation of an RB.

Step B: The MAC CE sending device generates a MAC CE used to indicate to activate/deactivate the duplication operation of the RB, and sends the MAC CE to the terminal.

It can be learned from the foregoing description that, the second base station in step A may be a PDCP anchor, or may be a MAC CE sending device, or may be an MN.

A case in which the second base station in step A is a PDCP anchor is described below.

The PDCP anchor determines whether to activate/deactivate a duplication operation of an RB. Specifically, the PDCP anchor may determine, specially for an uplink direction, whether to activate/deactivate the duplication operation of the RB. After the PDCP anchor determines a status (active/inactive) of a duplication operation of an RB, the MAC CE sending device (namely, the gNB) sends a corresponding MAC CE to the terminal, so that the terminal learns of RBs whose duplication operations are activated/deactivated, that is, step B is performed.

According to the communication method provided in this embodiment of this application, there are the following two cases in a scenario in which the RDCP anchor determines to activate/deactivate a duplication operation of an RB:

Case a: The PDCP anchor is the same as the MAC CE sending device.

Case b: The PDCP anchor is different from the MAC CE sending device.

The case a is described below.

The PDCP anchor is the same as the MAC CE sending device. In this case, after the PDCP anchor determines to activate/deactivate the duplication operation of the RB, that is, after the PDCP anchor determines status information of the duplication operation of the RB, the PDCP anchor generates an activation indication (for example, a MAC CE) corresponding to the status information of the duplication operation of the RB, and sends the activation indication to the terminal.

For the ENDC communications system/NG-ENDC communications system, the MAC CE sending device is an SN, and the PDCP anchor is the same as the MAC CE sending device. In this case, the PDCP anchor is also an SN. Therefore, the PDCP anchor determines to activate/deactivate a duplication operation of an RB of an SCG. Herein, the SN is a gNB.

In a scenario in which the SN includes a CU and a DU, there are two implementable manners: determining, by an SN-CU, to activate/deactivate a duplication operation of an RB of an SCG, and determining, by an SN-DU, to activate/deactivate a duplication operation of an RB of an SCG.

After the SN-CU determines to activate/deactivate a duplication operation of an RB of an SCG, the SN-CU sends status information of the duplication operation of the RB of the SCG to the SN-DU, so that the SN-DU generates an activation indication (for example, a MAC CE) corresponding to the status information of the duplication operation of the RB of the SCG, and then the SN-DU sends the activation indication to the terminal.

After the SN-DU determines to activate/deactivate a duplication operation of an RB of an SCG, the SN-DU generates an activation indication corresponding to the duplication operation of the RB of the SCG, and sends the activation indication to the terminal.

Optionally, after the SN-DU determines to activate/deactivate the duplication operation of the RB of the SCG, the SN-DU may further send status information of the duplication operation of the RB of the SCG to the SN-CU through an F1 interface, so that the SN-CU determines, based on the status information of the duplication operation of the RB of the SCG, whether to enable a duplicate data packet detection function.

It should be noted that, if the SN-CU determines to configure a duplication operation for an RB of an SCG, and the SN-DU determines to activate/deactivate the duplication operation of the RB of the SCG, after determining to configure the duplication operation for the RB of the SCG, the SN-CU needs to send information about the RB of the SCG to the SN-DU through an F1 interface, so that the SN-DU determines whether to activate the duplication operation of the RB of the SCG.

For the NEDC communications system, the MAC CE sending device is an MN, and the PDCP anchor is the same as the MAC CE sending device. In this case, the PDCP anchor is also an MN. Therefore, the PDCP anchor determines to activate/deactivate a duplication operation of an RB of an MCG. Herein, the MN is a gNB.

In a scenario in which the MN includes a CU and a DU, there are two implementable manners: determining, by an MN-CU, to activate/deactivate a duplication operation of an RB of an MCG, and determining, by an MN-DU, to activate/deactivate a duplication operation of an RB of an MCG.

After the MN-CU determines to activate/deactivate a duplication operation of an RB of an MCG, the MN-CU sends status information of the duplication operation of the RB of the MCG to the MN-DU, so that the MN-DU generates an activation indication (for example, a MAC CE) corresponding to the status information of the duplication operation of the RB of the MCG, and then the MN-DU sends the activation indication to the terminal.

After the MN-DU determines to activate/deactivate a duplication operation of an RB of an MCG, the MN-DU generates an activation indication corresponding to the duplication operation of the RB of the MCG, and sends the activation indication to the terminal.

Optionally, after the MN-DU determines to activate/deactivate the duplication operation of the RB of the MCG, the MN-DU may further send status information of the duplication operation of the RB of the MCG to the MN-CU through an F1 interface, so that the MN-CU determines, based on the status information of the duplication operation of the RB of the MCG, whether to enable a duplicate data packet detection function.

It should be noted that, if the MN-CU determines to configure a duplication operation for an RB of an MCG, and the MN-DU determines to activate/deactivate the duplication operation of the RB of the MCG, after determining to configure the duplication operation for the RB of the MCG, the MN-CU needs to send information about the RB of the MCG to the MN-DU through an F1 interface, so that the MN-DU determines whether to activate the duplication operation of the RB of the MCG.

The case b is described below.

The PDCP anchor is different from the MAC CE sending device. In this case, after the PDCP anchor determines to activate/deactivate the duplication operation of the RB, that is, after the PDCP anchor determines status information of the duplication operation of the RB, the PDCP anchor sends the status information of the duplication operation of the RB to the MAC CE sending device, so that the MAC CE sending device generates an activation indication (for example, a MAC CE) corresponding to the status information of the duplication operation of the RB, and sends the activation indication to the terminal.

For the ENDC communications system/NG-ENDC communications system, the MAC CE sending device is an SN, and the PDCP anchor is different from the MAC CE sending device. In this case, the PDCP anchor is an MN. Therefore, the PDCP anchor determines to activate/deactivate a duplication operation of an RB of an MCG. Herein, the SN is a gNB.

After the MN determines to activate/deactivate the duplication operation of the RB of the MCG, that is, after the PDCP anchor determines status information of the duplication operation of the RB of the MCG, the MN sends the status information of the duplication operation of the RB to the SN. In a scenario in which the SN includes a CU and a DU, an SN-CU receives, through an interface (for example, an X2/Xn interface) between the SN and the MN, the status information, sent by the MN, of the duplication operation of the RB of the MCG. The SN-CU sends the status information of the duplication operation of the RB of the MCG to the SN-DU through an F1 interface. The SN-DU generates a corresponding activation indication (for example, a MAC CE) based on the status information of the duplication operation of the RB of the MCG, and sends the activation indication to the terminal.

For the NEDC communications system, the MAC CE sending device is an MN, and the PDCP anchor is different from the MAC CE sending device. In this case, the PDCP anchor is an SN. Therefore, the PDCP anchor determines to activate/deactivate a duplication operation of an RB of an SCG. Herein, the MN is a gNB.

In a scenario in which the MN includes an MN-CU and an MN-DU, the MN-CU receives, through an interface (for example, an X2/Xn interface) between an SN and the MN, status information, sent by the SN, of the duplication operation of the RB of the SCG. The MN-CU sends the status information of the duplication operation of the RB of the SCG to the MN-DU through an F1 interface. The MN-DU generates a corresponding activation indication (for example, a MAC CE) based on the status information of the duplication operation of the RB of the SCG, and sends the activation indication to the terminal.

A case in which the second base station is a MAC CE sending device in step A is described below.

The MAC CE sending device determines whether to activate/deactivate a duplication operation of an RB. Specifically, the MAC CE sending device may determine, specially for uplink, whether to activate/deactivate the duplication operation of the RB. After determining a status (active/inactivate) of a duplication operation of an RB, the MAC CE sending device sends a corresponding MAC CE to the terminal, so that the terminal learns of RBs whose duplication operations are activated/deactivated, that is, step B is performed.

According to the communication method provided in this embodiment of this application, there are the following two cases in a scenario in which the MAC CE sending device determines to activate/deactivate a duplication operation of an RB:

Case c: The PDCP anchor is the same as the MAC CE sending device.

Case d: The PDCP anchor is different from the MAC CE sending device.

The case c is the same as the case a. Directly refer to the description of the case a. Details are not described herein again.

The case d is described below.

The PDCP anchor is different from the MAC CE sending device. In this case, the PDCP anchor needs to learn of information about an RB, determined by the MAC CE sending device, for which a duplication operation has been configured, so that the MAC CE sending device determines a status information of the duplication operation of the RB based on the information about the RB, and further generates a corresponding MAC CE. Optionally, the information about the RB for which the duplication operation has been configured may be determined by the MAC CE sending device or determined by the PDCP anchor. When the PDCP anchor determines the information about the RB for which the duplication operation has been configured, the PDCP anchor needs to send, to the MAC CE sending device, the information about the RB for which the duplication operation has been configured.

For the ENDC communications system/NG-ENDC communications system, the MAC CE sending device is an SN, and the PDCP anchor is different from the MAC CE sending device. In this case, the PDCP anchor is an MN. Therefore, the MAC CE sending device determines to activate/deactivate a duplication operation of an RB of an MCG. Herein, the SN is a gNB.

In a scenario in which the SN includes a CU and a DU, there are two implementable manners: determining, by an SN-CU, to activate/deactivate a duplication operation of an RB of an MCG, and determining, by an SN-DU, to activate/deactivate a duplication operation of an RB of an MCG.

After the SN-CU determines to activate/deactivate a duplication operation of an RB of an MCG, the SN-CU sends status information of the duplication operation of the RB of the MCG to the SN-DU, so that the SN-DU generates an activation indication (for example, a MAC CE) corresponding to the status information of the duplication operation of the RB of the MCG, and then the SN-DU sends the activation indication to the terminal.

After the SN-DU determines to activate/deactivate a duplication operation of an RB of an MCG, the SN-DU generates an activation indication corresponding to the duplication operation of the RB of the MCG, and sends the activation indication to the terminal. Before this, the SN-CU obtains, through an interface (for example, an X2/Xn interface) between the SN and the MN, information about the RB, of the MCG, for which the duplication operation has been configured, and sends the information about the RB to the SN-DU.

Optionally, after the SN-DU determines to activate/deactivate the duplication operation of the RB of the MCG, the SN-DU may further send status information of the duplication operation of the RB of the MCG to the SN-CU through an F1 interface, so that the SN-CU determines, based on the status information of the duplication operation of the RB of the MCG, whether to enable a duplicate data packet detection function.

For the NEDC communications system, the MAC CE sending device is an MN, and the PDCP anchor is different from the MAC CE sending device. In this case, the PDCP anchor is an SN. Therefore, the MAC CE sending device determines to activate/deactivate a duplication operation of an RB of an SCG. Herein, the MN is a gNB.

In a scenario in which the MN includes a CU and a DU, there are two implementable manners: determining, by an MN-CU, to activate/deactivate a duplication operation of an RB of an SCG, and determining, by an MN-DU, to activate/deactivate a duplication operation of an RB of an SCG.

After the MN-CU determines to activate/deactivate a duplication operation of an RB of an SCG, the MN-CU sends status information of the duplication operation of the RB of the SCG to the MN-DU, so that the MN-DU generates an activation indication (for example, a MAC CE) corresponding to the status information of the duplication operation of the RB of the SCG, and then the MN-DU sends the activation indication to the terminal.

After the MN-DU determines to activate/deactivate a duplication operation of an RB of an SCG, the MN-DU generates an activation indication corresponding to the duplication operation of the RB of the SCG, and sends the activation indication to the terminal. Before this, the MN-CU obtains information about the RB, of the SCG, for which the duplication operation has been configured, and sends the information about the RB to the MN-DU. Optionally, the information about the RB for which the duplication operation has been configured may be determined by the SN or determined by the MN. When the SN determines the information about the RB for which the duplication operation has been configured, the MN-CU obtains, through an interface (for example, an X2/Xn interface) between the MN and the SN, the information about the RB, of the SCG, for which the duplication operation has been configured, and sends the information about the RB to the MN-DU.

Optionally, after the MN-DU determines to activate/deactivate the duplication operation of the RB of the SCG, the MN-DU may further send the status information of the duplication operation of the RB of the SCG to the MN-CU through an F1 interface, so that the MN-CU determines, based on the status information of the duplication operation of the RB of the SCG, whether to enable a duplicate data packet detection function.

A case in which the second base station is an MN in step A is described below.

The MN determines whether to activate/deactivate a duplication operation of an RB. Specifically, the MN may determine, specially for an uplink direction, whether to activate/deactivate the duplication operation of the RB. After the MN determines a status (active/inactive) of a duplication operation of an RB, the MAC CE sending device (namely, the gNB) sends a corresponding MAC CE to the terminal, so that the terminal learns of RBs whose duplication operations are activated/deactivated, that is, step B is performed.

According to the communication method provided in this embodiment of this application, there are following two cases in a scenario in which the MN determines to activate/deactivate a duplication operation of an RB:

Case e: The MN is the same as the MAC CE sending device.

Case f: The MN is different from the MAC CE sending device.

The case e is described below.

The MN is the same as the MAC CE sending device. In this case, after the MN determines to activate/deactivate the duplication operation of the RB, the MN generates an activation indication (for example, a MAC CE) corresponding to status information of the duplication operation of the RB, and sends the activation indication to the terminal.

For the ENDC communications system-NG-ENDC communications system, the MAC CE sending device is an SN, and the case e is not applicable.

For the NEDC communications system, the MAC CE sending device is an MN, that is, the MN is the same as the MAC CE sending device.

In a scenario in which the MN includes a CU and a DU, there are two implementable manners: determining, by an MN-CU, to activate/deactivate a duplication operation of an RB of an MCG/SCG, and determining, by an MN-DU, to activate/deactivate a duplication operation of an RB of an MCG.

After the MN-CU determines to activate/deactivate a duplication operation of an RB of an MCG/SCG, the MN-CU sends status information of the duplication operation of the RB of the MCG/SCG to the MN-DU, so that the MN-DU generates an activation indication (for example, a MAC CE) corresponding to the status information of the duplication operation of the RB of the MCG/SCG, and then the MN-DU sends the activation indication to the terminal.

After the MN-DU determines to activate/deactivate a duplication operation of an RB of an MCG/SCG, the MN-DU generates an activation indication corresponding to the duplication operation of the RB of the MCG/SCG, and sends the activation indication to the terminal.

Optionally, after the MN-DU determines to activate/deactivate a duplication operation of an RB of an MCG, the MN-DU may further send status information of the duplication operation of the RB of the MCG to the MN-CU through an F1 interface, so that the MN-CU determines, based on the status information of the duplication operation of the RB of the MCG, whether to enable a duplicate data packet detection function. After the MN-DU determines to activate/deactivate a duplication operation of an RB of an SCG, the MN-DU may further send status information of the duplication operation of the RB of the SCG to the MN-CU through the F1 interface, or enable the MN-CU to forward status information of the duplication operation of the RB of the SCG to the SN, so that the SN determines whether to enable a duplicate data packet detection function.

It should be noted that, if the MN-CU determines to configure a duplication operation for an RB of an MCG/SCG, and the MN-DU determines to activate/deactivate the duplication operation of the RB of the MCG/SCG, after determining to configure the duplication operation for the RB of the MCG/SCG, the MN-CU needs to send information about the RB of the MCG/SCG to the MN-DU through the F1 interface, so that the MN-DU determines whether to activate the duplication operation of the RB of the MCG/SCG.

The case f is described below.

The MN is different from the MAC CE sending device. In this case, after determining to activate/deactivate the duplication operation of the RB, the MN sends status information of the duplication operation of the RB to the MAC CE sending device, so that the MAC CE sending device generates an activation indication (for example, a MAC CE) corresponding to the status information of the duplication operation of the RB, and sends the activation indication to the terminal.

For the ENDC communications system/NG-ENDC communications system, the MAC CE sending device is an SN. In this case, the case f means that the MN determines to activate/deactivate a duplication operation of an RB of an MCG/SCG. Herein, the SN is a gNB.

After determining to activate/deactivate the duplication operation of the RB of the MCG/SCG, the MN sends status information of the duplication operation of the RB to the SN. In a scenario in which the SN includes a CU and a DU, an SN-CU receives, through an interface (for example, an X2/Xn interface) between the SN and the MN, the status information, sent by the MN, of the duplication operation of the RB of the MCG/SCG. The SN-CU sends the status information of the duplication operation of the RB of the MCG/SCG to the SN-DU through an F1 interface. The SN-DU generates a corresponding activation indication (for example, a MAC CE) based on the status information of the duplication operation of the RB of the MCG/SCG, and sends the activation indication to the terminal.

For the NEDC communications system, the MAC CE sending device is an MN, and the case f is not applicable.

It should be noted that the second base station in step A may be further configured to determine an initial active/inactive state of a duplication operation of an RB. Optionally, when the second base station is not a PDCP anchor, the second base station notifies the PDCP anchor after determining the initial active/inactive state of the duplication operation of the RB. Therefore, when the PDCP anchor generates configuration information of the RB, the configuration information of the RB includes the initial active/inactive state of the duplication operation of the RB. Further, optionally, when the PDCP anchor is not a master node, the PDCP anchor sends the configuration information that includes the initial active/inactive state of the duplication operation of the RB to the master node, so that the master node sends the configuration information to the terminal.

The communication method provided in this embodiment of this application is described in detail with reference to FIG. 1 to FIG. 3 below.

Figure 11A:
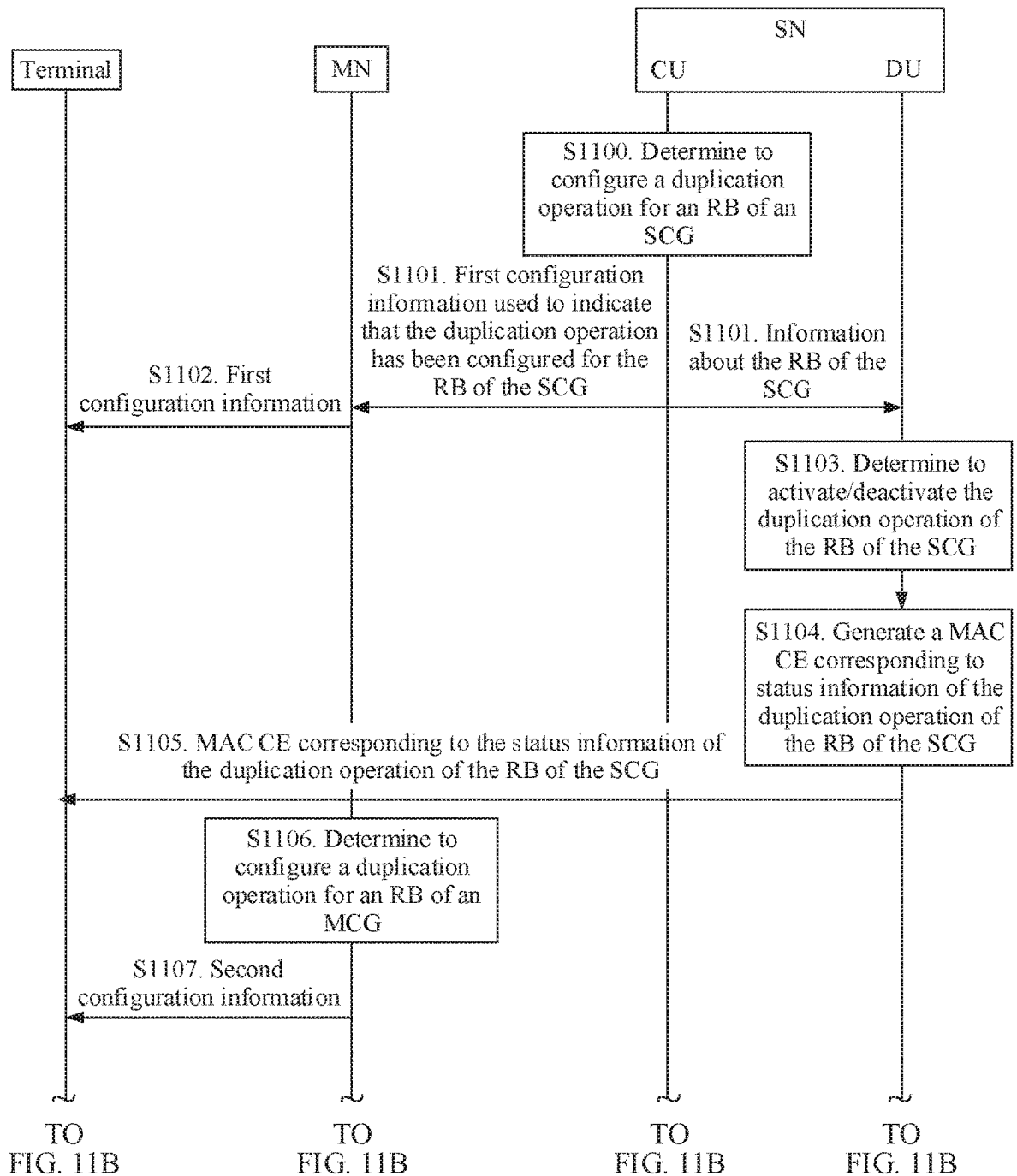
FIG. 11A and FIG. 11B are a fifth schematic flowchart of a communication method according to an embodiment of this application.
Figure 11B:
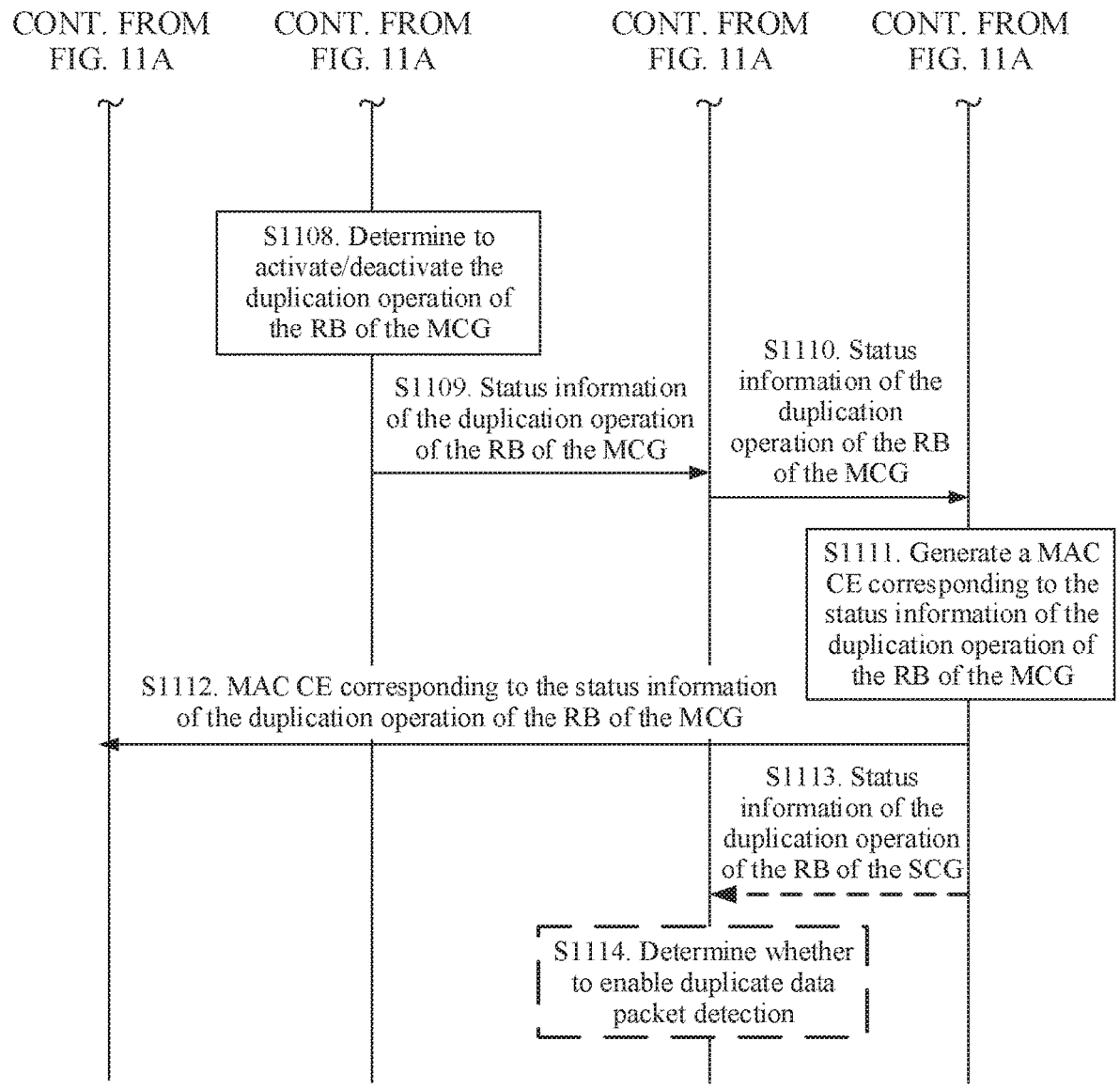

In the communications systems shown in FIG. 1 and FIG. 3, the MN is an LTE base station, the SN is a gNB, and the SN includes an SN-DU and an SN-CU. As shown in FIG. 11A and FIG. 11B, in the communications systems shown in FIG. 1 and FIG. 3, when the PDCP anchor is an SN, the SN-CU determines to configure a duplication operation for an RB of an SCG, and the SN-DU determines whether to activate/deactivate the duplication operation of the RB of the SCG. In this case, a communication method provided in an embodiment of this application includes steps S1100 to S1105. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S1106 to S1112. In the foregoing steps, S1100 to S1105 and S1106 to S1112 may be used separately or together. This is not limited in this application.

Specifically, as shown in FIG. 11A and FIG. 11B, the communication method provided in this embodiment of this application includes the following steps.

S1100. The SN-CU determines to configure a duplication operation for an RB of an SCG.

S1101. The SN-CU sends the first configuration information to the MN.

In this case, the SN-CU further sends information about the RB of the SCG to the SN-DU, and generates the first configuration information used to indicate that the duplication operation has been configured for the RB of the SCG. The information that is about the RB of the SCG and that is sent by the SN-CU to the SN-DU may be sent through an F1 interface. The information about the RB of the SCG is included in a UE context setup request (UE Context Setup Request) message or a UE context modification request (UE Context Modification Request) message.

Optionally, the UE context setup request (UE Context Setup Request) message or the UE context modification request (UE Context Modification Request) includes an RB list. The RB list includes an RB ID, and indication information indicating that the duplication operation has been configured for the RB.

S1102. The MN forwards the first configuration information to a terminal.

S1103. The SN-DU determines to activate/deactivate the duplication operation of the RB of the SCG.

S1104. The SN-DU generates a MAC CE corresponding to status information of the duplication operation of the RB of the SCG.

S1105. The SN-DU sends, to the terminal, the MAC CE corresponding to the status information of the duplication operation of the RB of the SCG.

S1106. The MN determines to configure a duplication operation for an RB of an MCG.

S1107. The MN generates second configuration information used to indicate that the duplication operation has been configured for the RB of the MCG, and sends the second configuration information to the terminal.

S1108. The MN determines to activate/deactivate the duplication operation of the RB of the MCG.

S1109. The MN sends status information of the duplication operation of the RB of the MCG to the SN-CU.

S1110. The SN-CU forwards the status information of the duplication operation of the RB of the MCG to the SN-DU.

The status information, of the duplication operation of the RB of the MCG, sent by the SN-CU to the SN-DU may be sent through the F1 interface. Optionally, the status information of the duplication operation of the RB of the MCG is included in a UE context setup request (UE Context Setup Request) message or a UE context modification request (UE Context Modification Request) message.

Optionally, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the SN-DU may send a response message to the SN-CU through the F1 interface. The response message carries information used to indicate that the foregoing configuration is acknowledged or rejected. Optionally, when the response message carries information indicating the rejection, the response message may further carry a cause value for the rejection.

S1111. The SN-DU generates a MAC CE corresponding to the status information of the duplication operation of the RB of the MCG.

S1112. The SN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S1105 and S1112 may alternatively be both performed.

Optionally, as shown in FIG. 11A and FIG. 11B, a procedure of the communication method shown in FIG. 11A and FIG. 11B may further include S1113 and S1114 after S1103.

S1113. The SN-DU sends the status information of the duplication operation of the RB of the SCG to the SN-CU.

The status information, of the duplication operation of the RB of the SCG, sent by the SN-DU to the SN-CU may be sent through the F1 interface. Optionally, the status information of the duplication operation of the RB of the SCG is included in a UE context modification required (UE Context Modification Required) message.

Optionally, the UE context modification required (UE Context Modification Required) message includes an RB list. The RB list includes either of or a combination of the following: an RB ID, and indication information of an active/inactive state of a duplication operation of an RB.

Optionally, the SN-CU may send a response message to the SN-DU through the F1 interface. The response message carries information used to indicate that the foregoing configuration is acknowledged or rejected. Optionally, when the response message carries information indicating the rejection, the response message may further carry a cause value for the rejection.

S1114. The SN-CU determines, based on the status information of the duplication operation of the RB of the SCG, whether to enable duplicate data packet detection.

S1113 and S1114 are optional, and therefore are represented by using dashed lines in FIG. 11A and FIG. 11B.

Figure 12A:
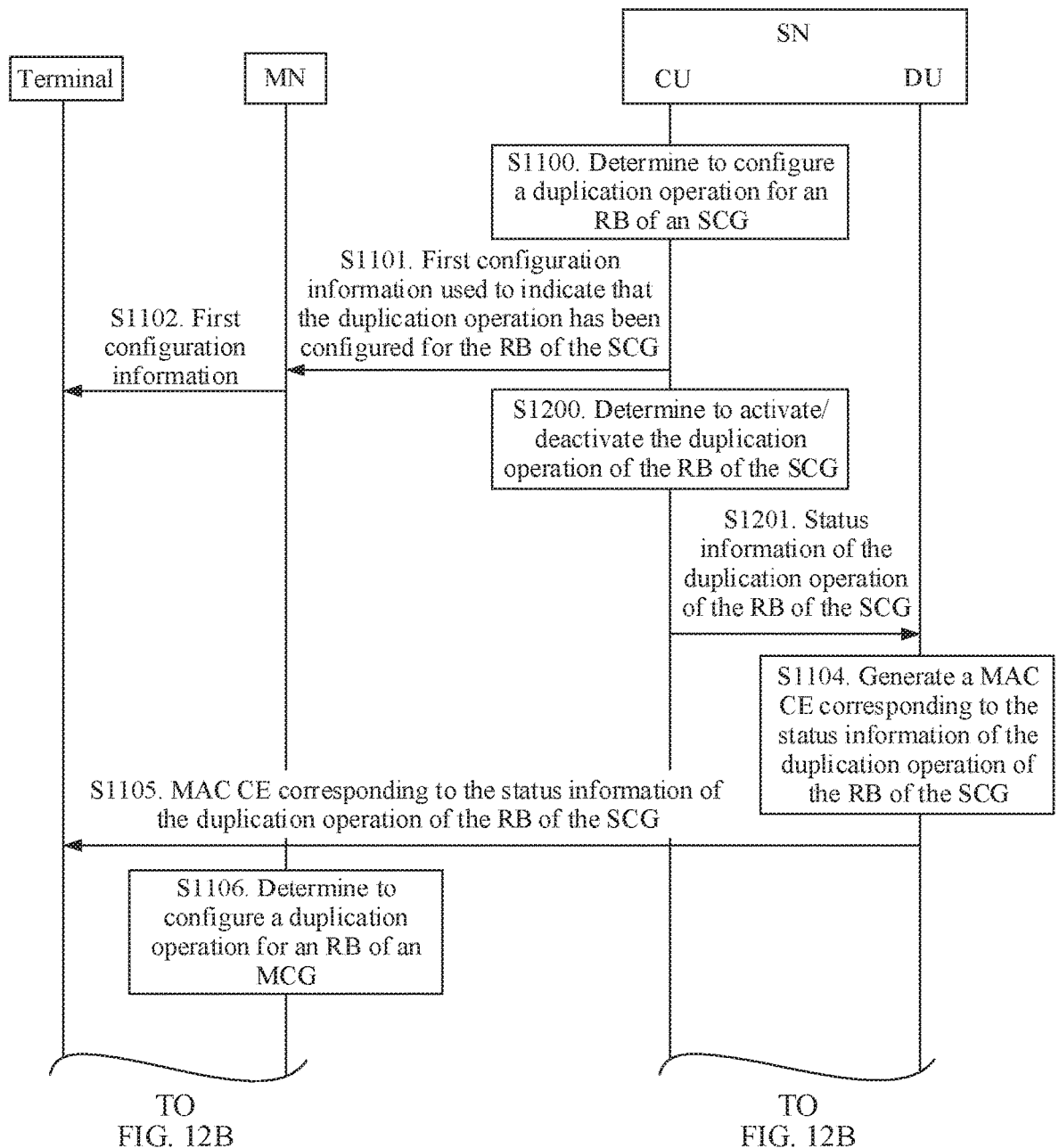
FIG. 12A and FIG. 12B are a sixth schematic flowchart of a communication method according to an embodiment of this application.
Figure 12B:
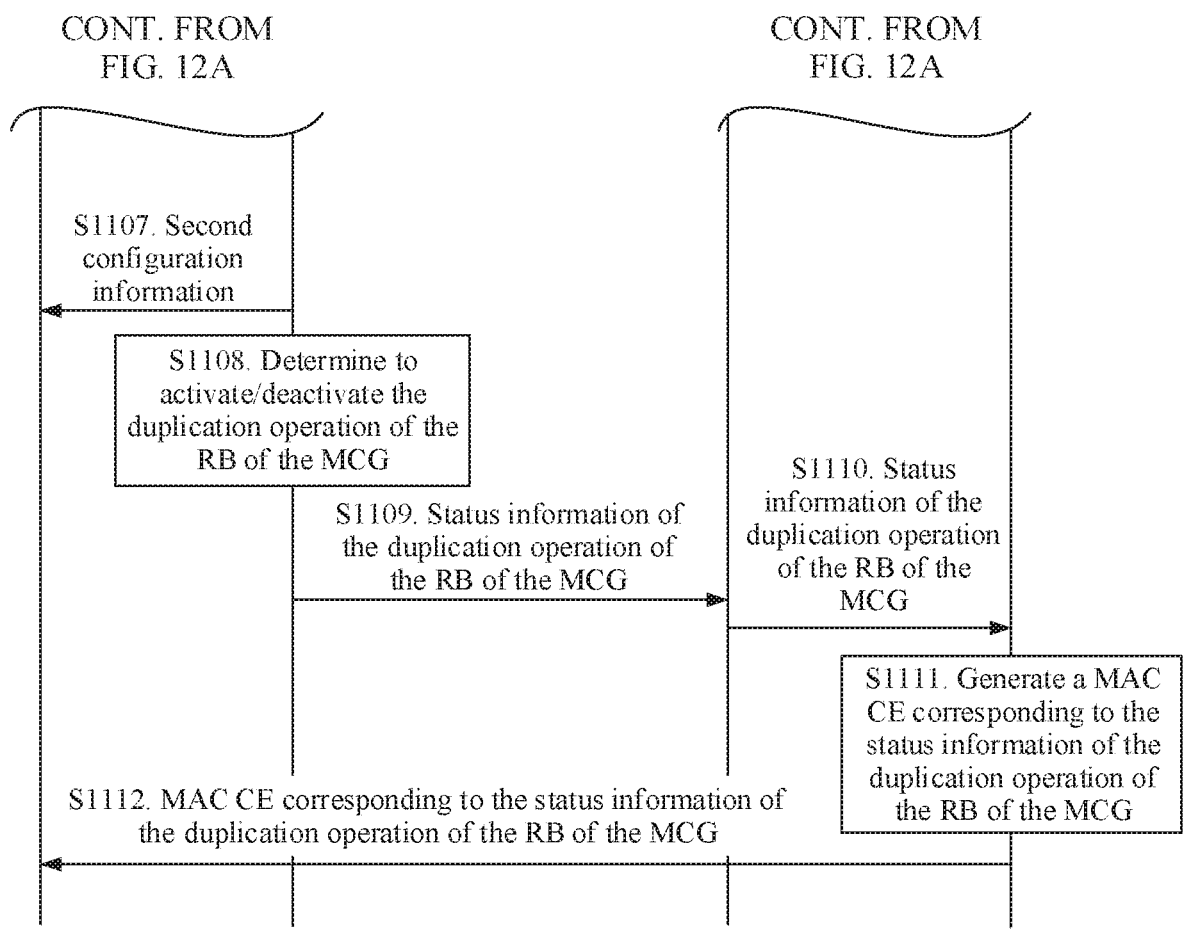

In the communications systems shown in FIG. 1 and FIG. 3, the MN is an LTE base station, the SN is a gNB, and the SN includes an SN-DU and an SN-CU. With reference to FIG. 11A and FIG. 11B, as shown in FIG. 12A and FIG. 12B, in the communications systems shown in FIG. 1 and FIG. 3, when the PDCP anchor is an SN, the SN-CU determines to configure a duplication operation for an RB of an SCG, and determines whether to activate/deactivate the duplication operation of the RB of the SCG. In this case, a communication method provided in an embodiment of this application includes steps S1100 to S1102, S1200 and S1201 are performed after S1102, and S1104 and S1105 are performed after S1201. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S1106 to S1112.

Specifically, with reference to FIG. 1A and FIG. 11B, as shown in FIG. 12A and FIG. 12B, the communication method provided in this embodiment of this application includes S1100 to S1102, S1200 and S1201, and S1104 to S1112. S1200 and S1201 are as follows:

S1200. The SN-CU determines to activate/deactivate the duplication operation of the RB of the SCG.

S1201. The SN-CU sends status information of the duplication operation of the RB of the SCG to the SN-DU.

The status information, of the duplication operation of the RB of the SCG, sent by the SN-CU to the SN-DU may be sent through the F1 interface. Optionally, the status information of the duplication operation of the RB of the SCG is included in a UE context setup request (UE Context Setup Request) message or a UE context modification request (UE Context Modification Request) message.

Optionally, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the SN-DU may send a response message to the SN-CU through the F1 interface. The response message carries information used to indicate that the foregoing configuration is acknowledged or rejected. Optionally, when the response message carries information indicating the rejection, the response message may further carry a cause value for the rejection.

Figure 13A:
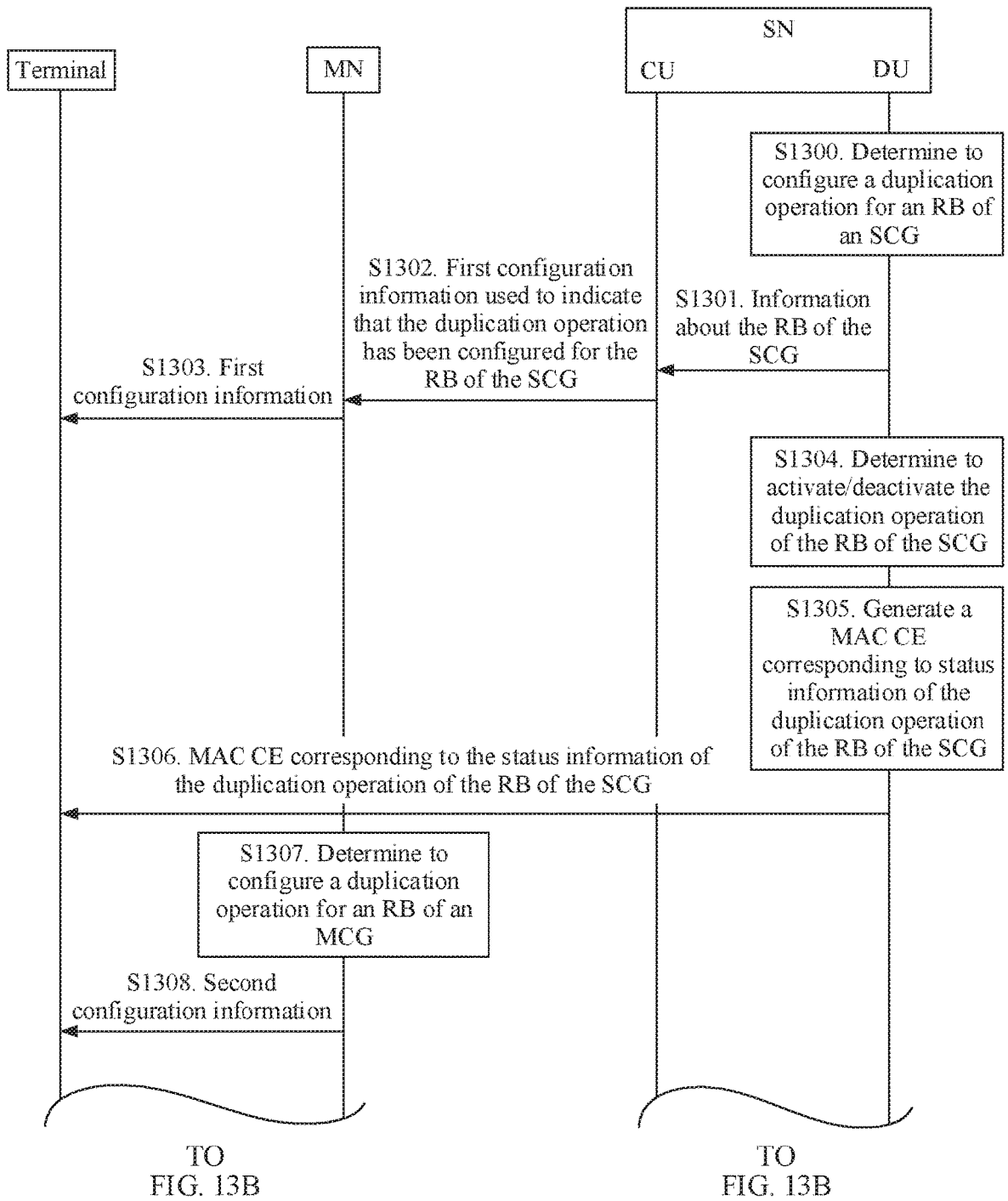
FIG. 13A and FIG. 13B are a seventh schematic flowchart of a communication method according to an embodiment of this application.
Figure 13B:
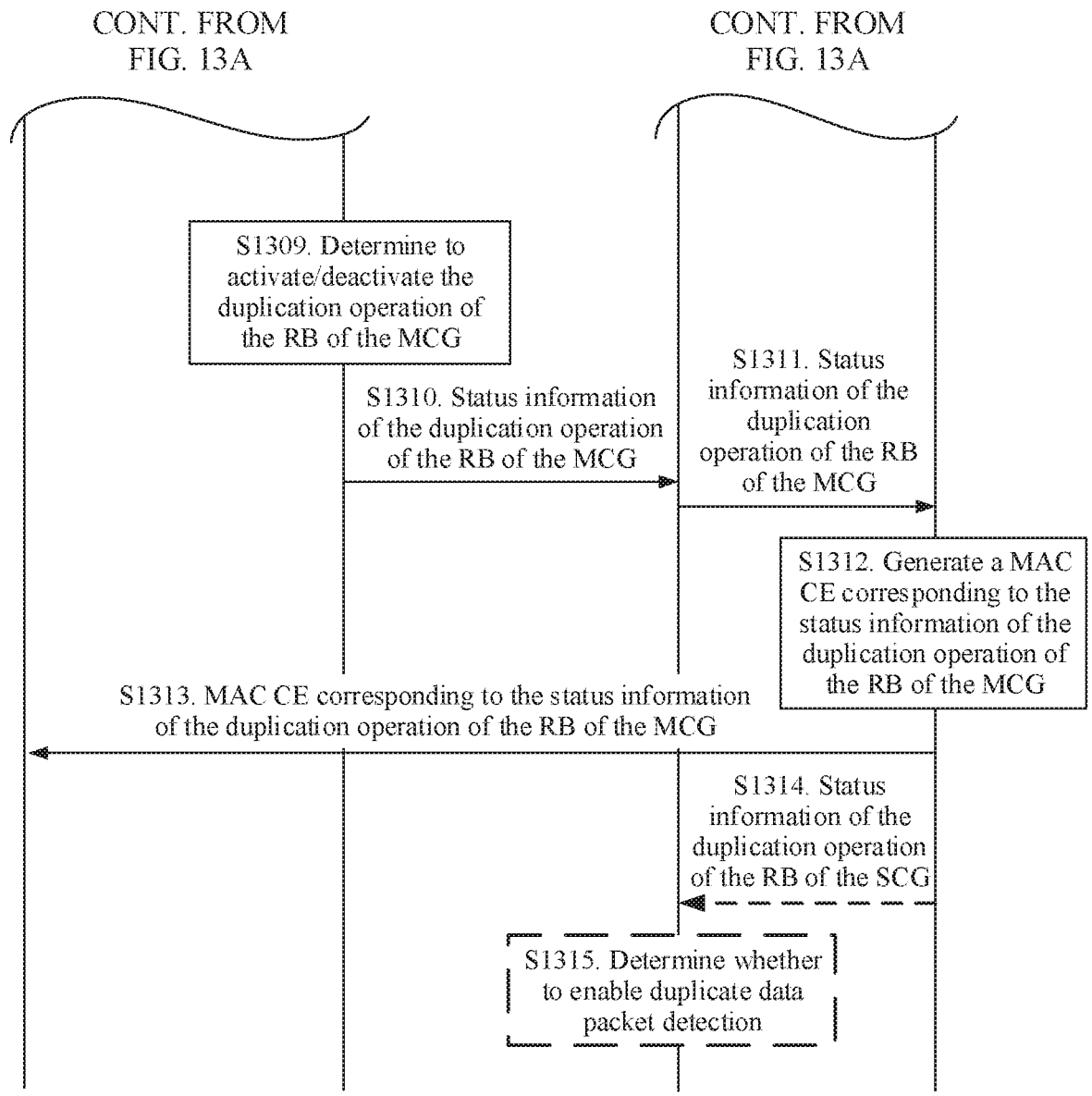

In the communications systems shown in FIG. 1 and FIG. 3, the MN is an LTE base station, the SN is a gNB, and the SN includes an SN-DU and an SN-CU. As shown in FIG. 13A and FIG. 13B, in the communications systems shown in FIG. 1 and FIG. 3, when the PDCP anchor is an SN, the SN-DU determines to configure a duplication operation for an RB of an SCG, and determines whether to activate/deactivate the duplication operation of the RB of the SCG. In this case, a communication method provided in an embodiment of this application includes steps S1300 to S1306. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S1307 to S1313.

Specifically, as shown in FIG. 13A and FIG. 13B, the communication method provided in this embodiment of this application includes the following steps.

S1300. The SN-DU determines to configure a duplication operation for an RB of an SCG.

S1301. The SN-DU sends, to the SN-CU, information about the RB, of the SCG, for which the duplication operation has been configured.

The information that is about the RB of the SCG and that is sent by the SN-DU to the SN-CU may be sent through an F1 interface. Optionally, the information about the RB of the SCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the SN-CU may send a response message to the SN-DU through the F1 interface. The response message carries information used to indicate that the foregoing configuration is acknowledged or rejected. Optionally, when the response message carries information indicating the rejection, the response message may further carry a cause value for the rejection.

S1302. The SN-CU generates first configuration information used to indicate that the duplication operation has been configured for the RB of the SCG, and sends the first configuration information to the MN.

S1303. The MN forwards the first configuration information to a terminal.

S1304. The SN-DU determines to activate/deactivate the duplication operation of the RB of the SCG.

S1305. The SN-DU generates a MAC CE corresponding to status information of the duplication operation of the RB of the SCG.

S1306. The SN-DU sends, to the terminal, the MAC CE corresponding to the status information of the duplication operation of the RB of the SCG.

S1307. The MN determines to configure a duplication operation for an RB of an MCG.

S1308. The MN generates second configuration information used to indicate that the duplication operation has been configured for the RB of the MCG, and sends the second configuration information to the terminal.

S1309. The MN determines to activate/deactivate the duplication operation of the RB of the MCG.

S1310. The MN sends status information of the duplication operation of the RB of the MCG to the SN-CU.

S1311. The SN-CU forwards the status information of the duplication operation of the RB of the MCG to the SN-DU.

The status information, of the duplication operation of the RB of the MCG, sent by the SN-CU to the SN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

S1312, the SN-DU generates a MAC CE corresponding to the status information of the duplication operation of the RB of the MCG.

S1313. The SN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S1306 and S1313 may alternatively be both performed.

Optionally, as shown in FIG. 13A and FIG. 13B, a procedure of the communication method shown in FIG. 13A and FIG. 13B may further include S1314 and S1315 after S1304.

S1314. The SN-DU sends the status information of the duplication operation of the RB of the SCG to the SN-CU.

S1315. The SN-CU determines, based on the status information of the duplication operation of the RB of the SCG, whether to enable duplicate data packet detection.

S1314 and S1315 are optional, and therefore are represented by using dashed lines in FIG. 13A and FIG. 13B.

Figure 14A:
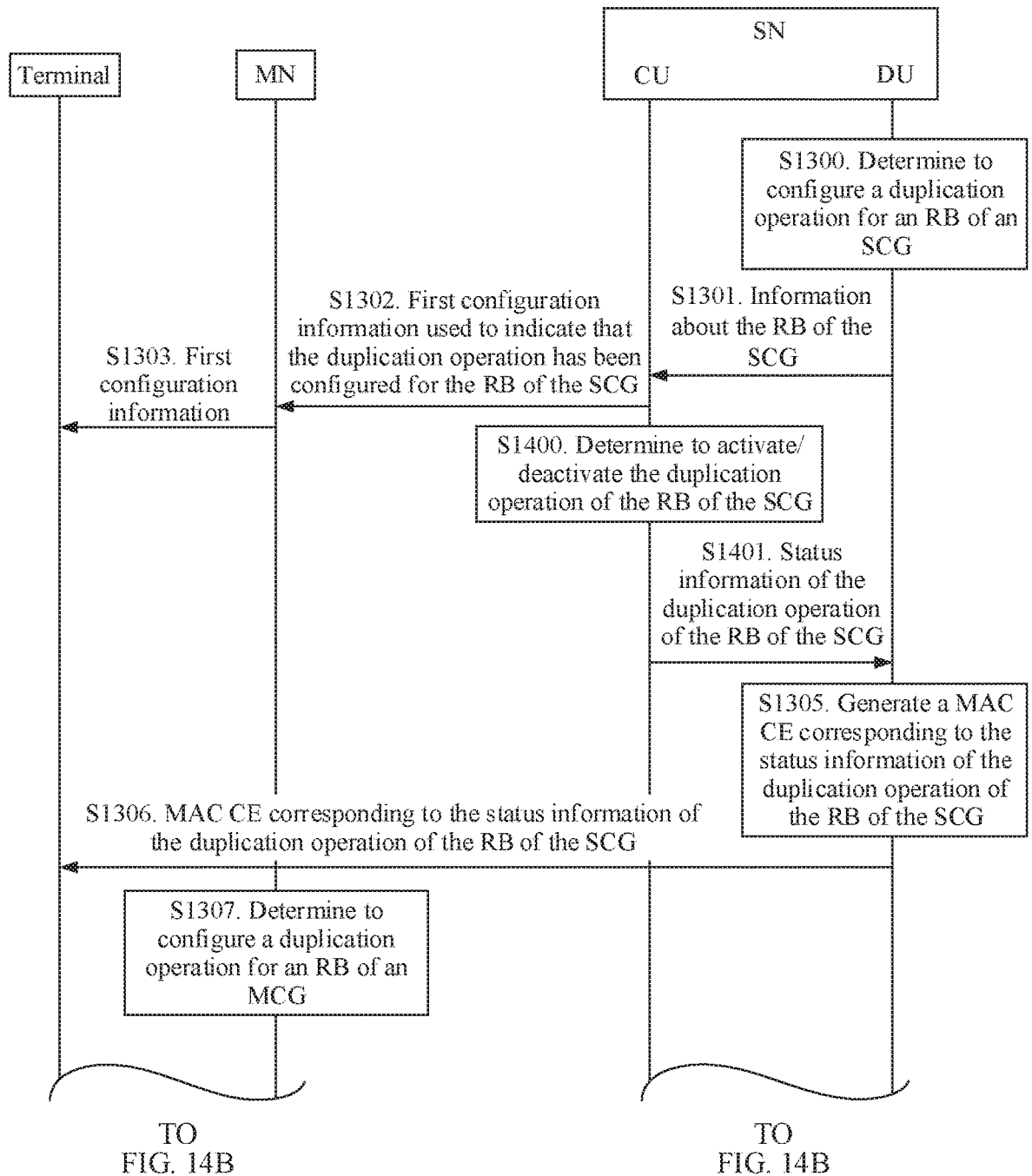
FIG. 14A and FIG. 14B are an eighth schematic flowchart of a communication method according to an embodiment of this application.
Figure 14B:
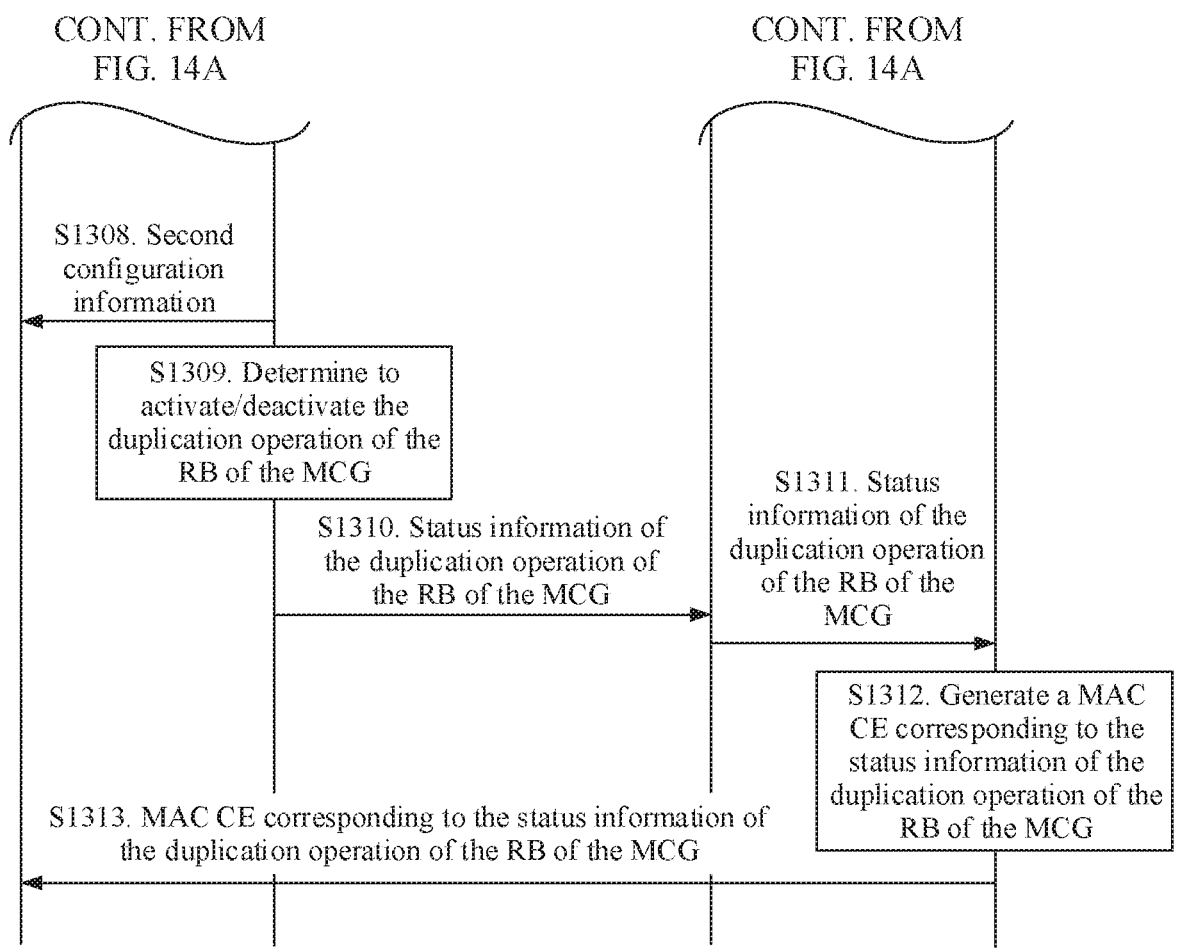

In the communications systems shown in FIG. 1 and FIG. 3, the MN is an LTE base station, the SN is a gNB, and the SN includes an SN-DU and an SN-CU. With reference to FIG. 13A and FIG. 13B, as shown in FIG. 14A and FIG. 14B, in the communications systems shown in FIG. 1 and FIG. 3, when the PDCP anchor is an SN, the SN-DU determines to configure a duplication operation for an RB of an SCG, and the SN-CU determines whether to activate/deactivate the duplication operation of the RB of the SCG. In this case, the communication method provided in this embodiment of this application includes steps S1300 to S1303, S1400 and S1401 are performed after S1303, and S1305 and S1306 are performed after S1401. When the PDCP anchor is an MN, the MN determines to configure a duplication operation for an RB of an MCG, and determines whether to activate/deactivate the duplication operation of the RB of the MCG. In this case, the communication method provided in this embodiment of this application includes steps S1307 to S1313.

Specifically, with reference to FIG. 13A and FIG. 13B, as shown in FIG. 14A and FIG. 14B, the communication method provided in this embodiment of this application includes S1300 to S1303, S1400 and S1401, and S1305 to S1313. S1400 and S1401 are as follows:

S1400. The SN-CU determines to activate/deactivate the duplication operation of the RB of the SCG.

S1401. The SN-CU sends the status information of the duplication operation of the RB of the SCG to the SN-DU.

The status information, of the duplication operation of the RB of the SCG, sent by the SN-CU to the SN-DU may be sent through the F1 interface. Optionally, the status information of the duplication operation of the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the SN-DU may send a response message to the SN-CU through the F1 interface. The response message carries information used to indicate that the foregoing configuration is acknowledged or rejected. Optionally, when the response message carries information indicating the rejection, the response message may further carry a cause value for the rejection.

Figure 15A:
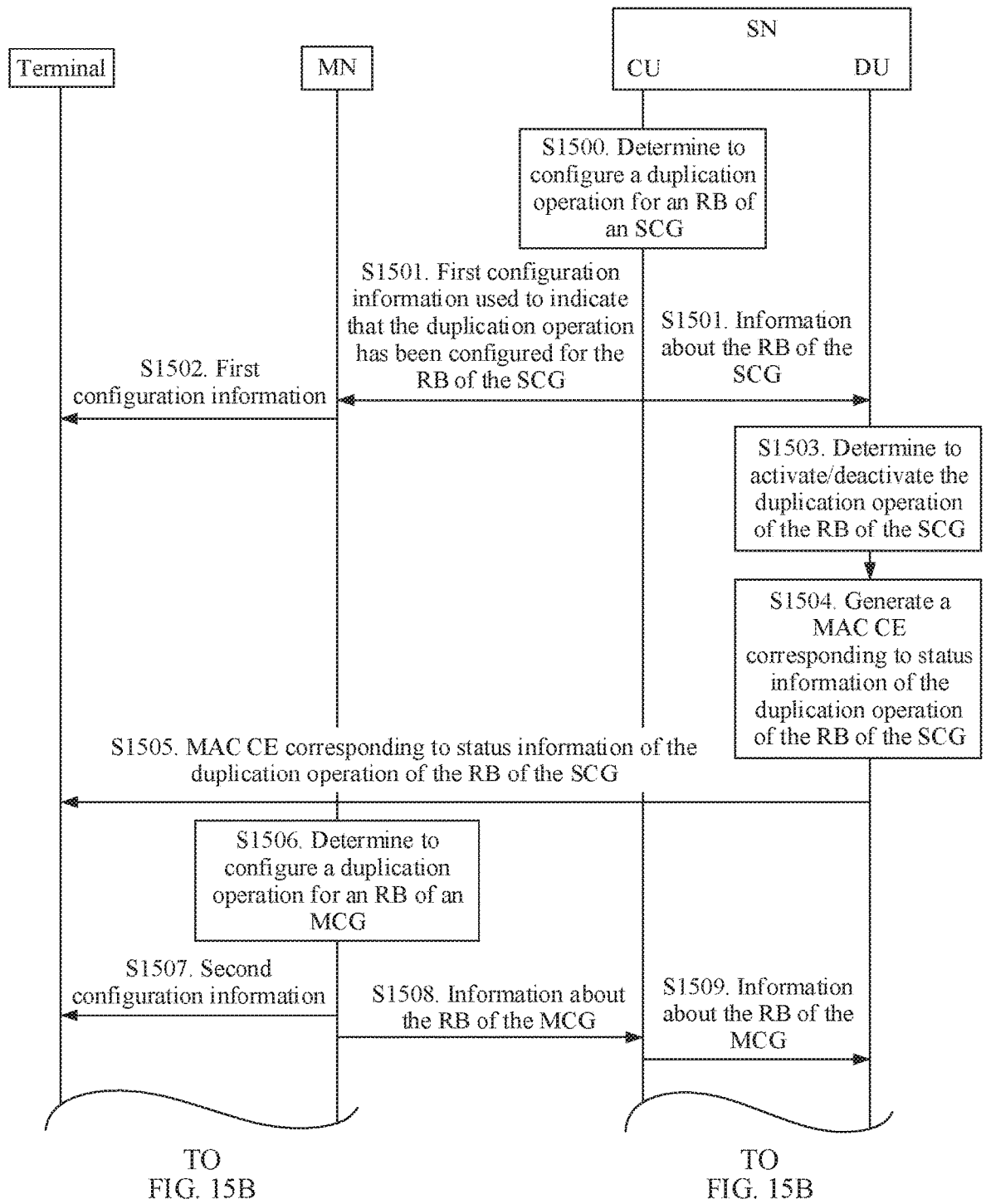
FIG. 15A and FIG. 15B are a ninth schematic flowchart of a communication method according to an embodiment of this application.
Figure 15B:
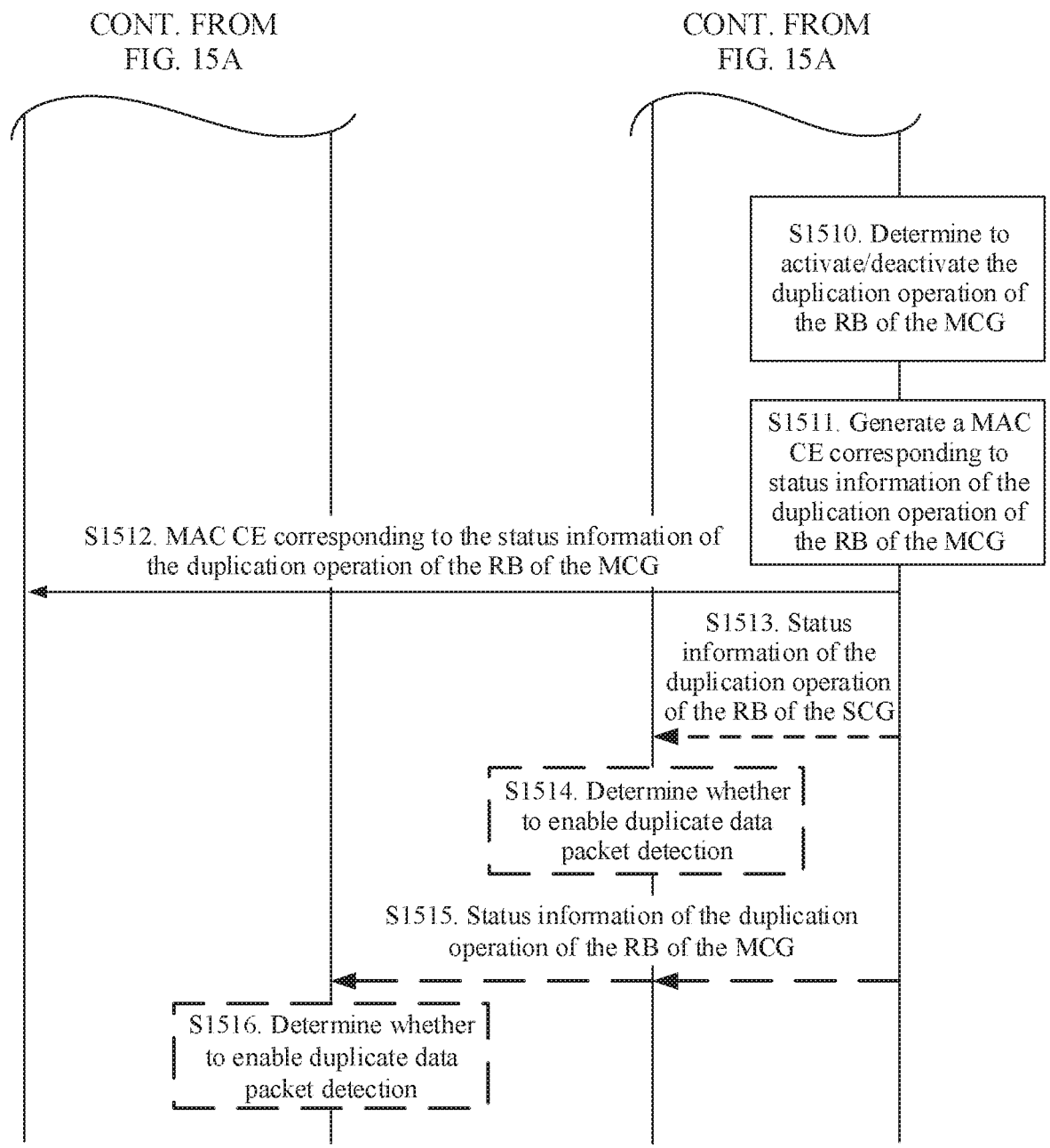

In the communications systems shown in FIG. 1 and FIG. 3, the MN is an LTE base station, the SN is a gNB, and the SN includes an SN-DU and an SN-CU. As shown in FIG. 15A and FIG. 15B, in the communications systems shown in FIG. 1 and FIG. 3, when the PDCP anchor is an SN, the SN-CU determines to configure a duplication operation for an RB of an SCG, and the SN-DU determines whether to activate/deactivate the duplication operation of the RB of the SCG. In this case, a communication method provided in an embodiment of this application includes steps S1500 to S1505. When the PDCP anchor is an MN, the MN determines to configure a duplication operation for an RB of an MCG, and the SN determines whether to activate/deactivate the duplication operation of the RB of the MCG. In this case, the communication method provided in this embodiment of this application includes steps S1506 to S1512.

Specifically, as shown in FIG. 15A and FIG. 15B, the communication method provided in this embodiment of this application includes the following steps.

S1500. The SN-CU determines to configure a duplication operation for an RB of an SCG.

S1501. The SN-CU generates first configuration information used to indicate that the duplication operation has been configured for the RB of the SCG, and sends the first configuration information to the MN.

Optionally, the SN-CU further sends information about the RB of the SCG to the SN-DU. Specifically, the information that is about the RB of the SCG and that is sent by the SN-CU to the SN-DU may be sent through an F1 interface. Optionally, the information about the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes an RB ID, and indication information indicating that the duplication operation has been configured for the RB.

S1502. The MN forwards the first configuration information to a terminal.

S1503. The SN-DU determines to activate/deactivate the duplication operation of the RB of the SCG.

S1504. The SN-DU generates a MAC CE corresponding to status information of the duplication operation of the RB of the SCG.

S1505. The SN-DU sends, to the terminal, the MAC CE corresponding to the status information of the duplication operation of the RB of the SCG.

S1506. The MN determines to configure a duplication operation for an RB of an MCG.

S1507. The MN generates second configuration information used to indicate that the duplication operation has been configured for the RB of the MCG, and sends the second configuration information to the terminal.

S1508. The MN sends information about the RB of the MCG to the SN-CU.

S1509. The SN-CU sends, to the SN-DU, the information about the RB, of the MCG, for which the duplication operation has been configured.

The information that is about the RB of the MCG and that is sent by the SN-CU to the SN-DU may be sent through the F1 interface. Optionally, the information about the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information indicating that the duplication operation has been configured for the RB.

S1510. The SN-DU determines to activate/deactivate the duplication operation of the RB of the MCG.

S1511. The SN-DU generates a MAC CE corresponding to status information of the duplication operation of the RB of the MCG.

S1512. The SN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S1505 and S1512 may alternatively be both performed.

Optionally, as shown in FIG. 15A and FIG. 15B, a procedure of the communication method shown in FIG. 15A and FIG. 15B may further include S1513 and S1514 after S1503.

S1513. The SN-DU sends the status information of the duplication operation of the RB of the SCG to the SN-CU.

The status information, of the duplication operation of the RB of the SCG, sent by the SN-DU to the SN-CU may be sent through the F1 interface. Optionally, the status information of the duplication operation of the RB of the SCG is included in a UE context modification required (UE Context Modification Required) message. Specifically, the UE context modification required (UE Context Modification Required) message includes an RB list. The RB list includes either of or a combination of the following: an RB ID, and indication information of an active/inactive state of a duplication operation of an RB.

Optionally, the SN-CU may send a response message to the SN-DU through the F1 interface. The response message carries information used to indicate that the foregoing configuration is acknowledged or rejected. Optionally, when the response message carries information indicating the rejection, the response message may further carry a cause value for the rejection.

S1514. The SN-CU determines, based on the status information of the duplication operation of the RB of the SCG, whether to enable duplicate data packet detection.

S1513 and S1514 are optional, and therefore are represented by using dashed lines in FIG. 15A and FIG. 15B.

Optionally, as shown in FIG. 15A and FIG. 15B, a procedure of the communication method shown in FIG. 15A and FIG. 15B may further include S1515 and S1516 after S1510.

S1515. The SN-DU sends the status information of the duplication operation of the RB of the MCG to the MN by using the SN-CU.

S1516. The MN determines, based on the status information of the duplication operation of the RB of the MCG, whether to enable duplicate data packet detection.

S1515 and S1516 are optional, and therefore are represented by using dashed lines in FIG. 15A and FIG. 15B.

Figure 16A:
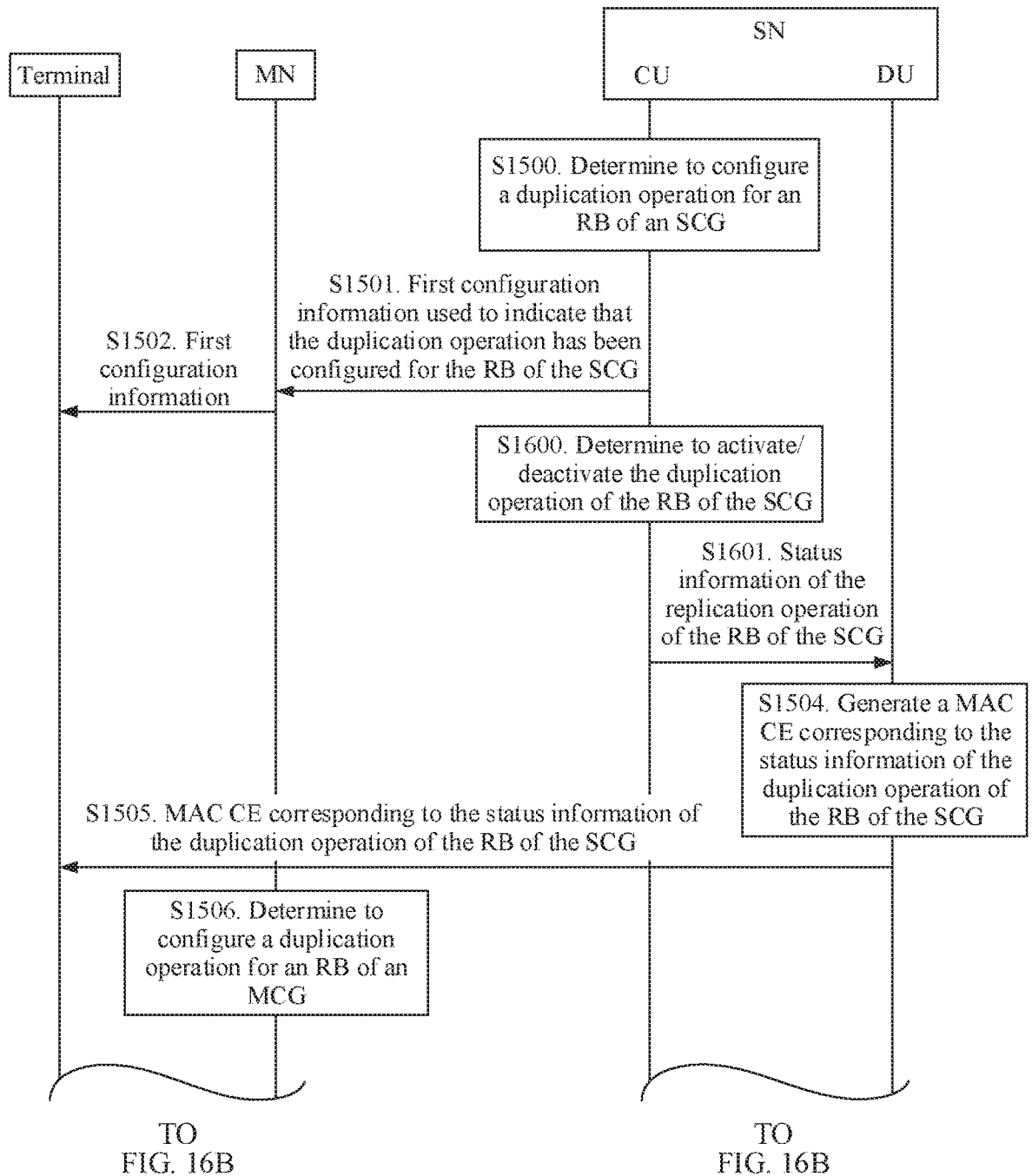
FIG. 16A and FIG. 16B are a tenth schematic flowchart of a communication method according to an embodiment of this application.
Figure 16B:
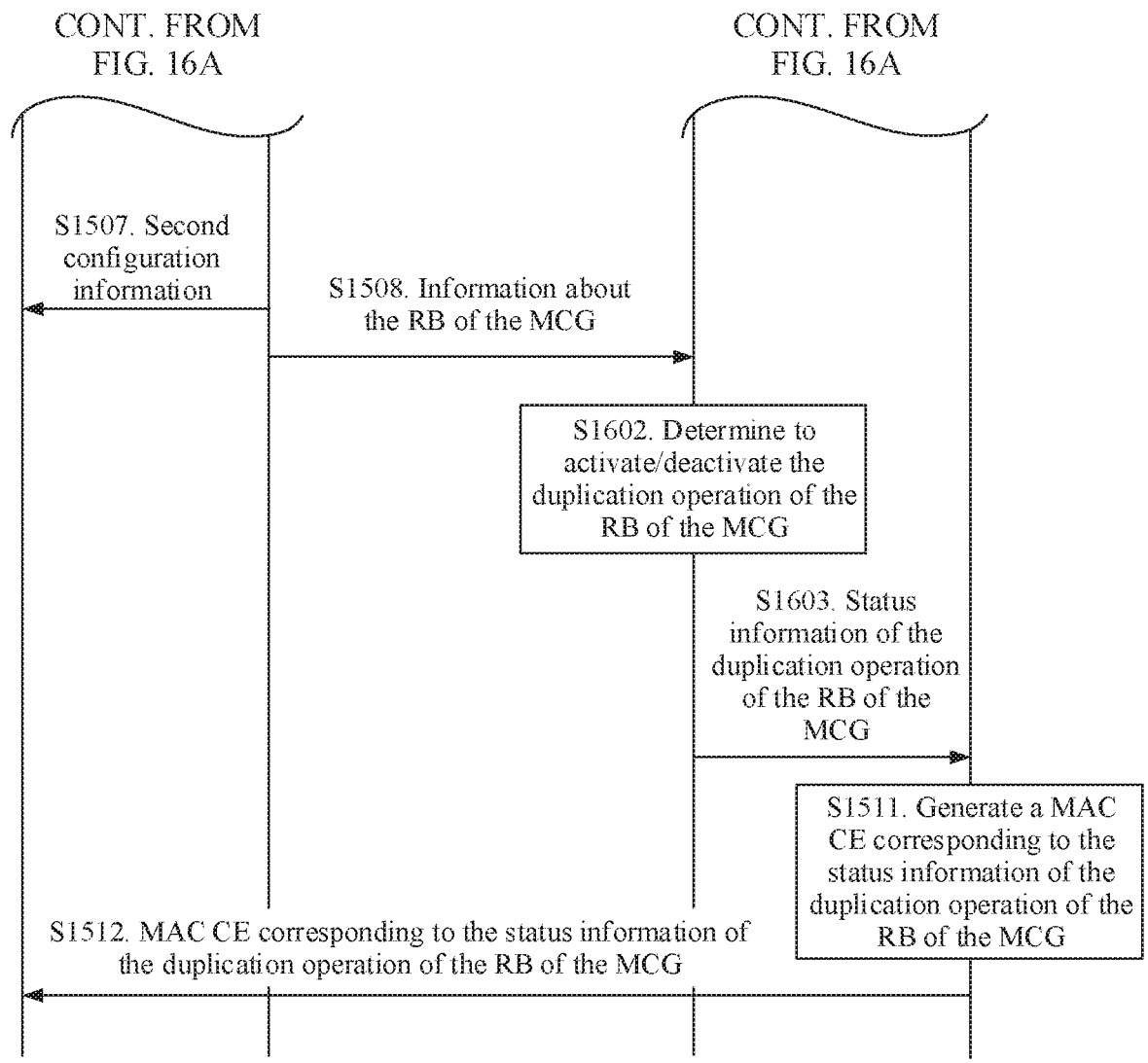

In the communications systems shown in FIG. 1 and FIG. 3, the MN is an LTE base station, the SN is a gNB, and the SN includes an SN-DU and an SN-CU. With reference to FIG. 15A and FIG. 15B, as shown in FIG. 16A and FIG. 16B, in the communications systems shown in FIG. 1 and FIG. 3, when the PDCP anchor is an SN, the SN-CU determines to configure a duplication operation for an RB of an SCG, and determines whether to activate/deactivate the duplication operation of the RB of the SCG. In this case, S1503 is replaced with S1600 and S1601. When the PDCP anchor is an MN, the MN determines to configure a duplication operation for an RB of an MCG, and the SN determines whether to activate/deactivate the duplication operation of the RB of the MCG. In this case, S1509 is replaced with S1602, and S1510 is replaced with S1603.

Specifically, with reference to FIG. 15A and FIG. 15B, as shown in FIG. 16A and FIG. 16B, a communication method provided in an embodiment of this application includes S1500 to S1502, S1600 and S1601, S1504 to S1508, S1602 and S1603, and S1511 and S1512. S1600 and S1601, and S1602 and S1603 are as follows:

S1600. The SN-CU determines to activate/deactivate the duplication operation of the RB of the SCG.

S1601. The SN-CU sends status information of the duplication operation of the RB of the SCG to the SN-DU.

The status information, of the duplication operation of the RB of the SCG, sent by the SN-CU to the SN-DU may be sent through the F1 interface. Optionally, the status information of the duplication operation of the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

S1602. The SN-CU determines to activate/deactivate the duplication operation of the RB of the MCG.

S1603. The SN-CU sends status information of the duplication operation of the RB of the MCG to the SN-DU.

The status information, of the duplication operation of the RB of the MCG, sent by the SN-CU to the SN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Figure 17A:
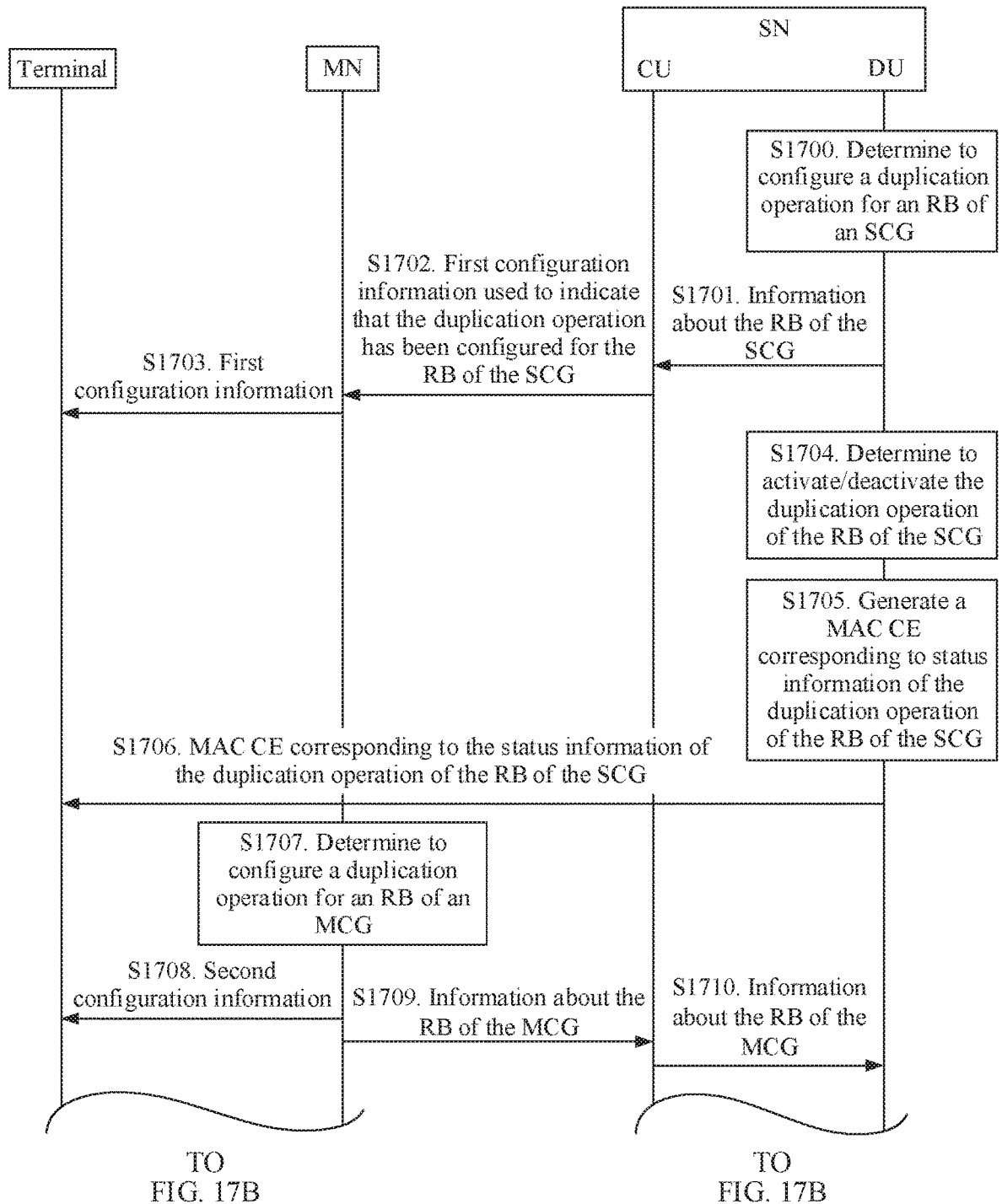
FIG. 17A and FIG. 17B are an eleventh schematic flowchart of a communication method according to an embodiment of this application.
Figure 17B:
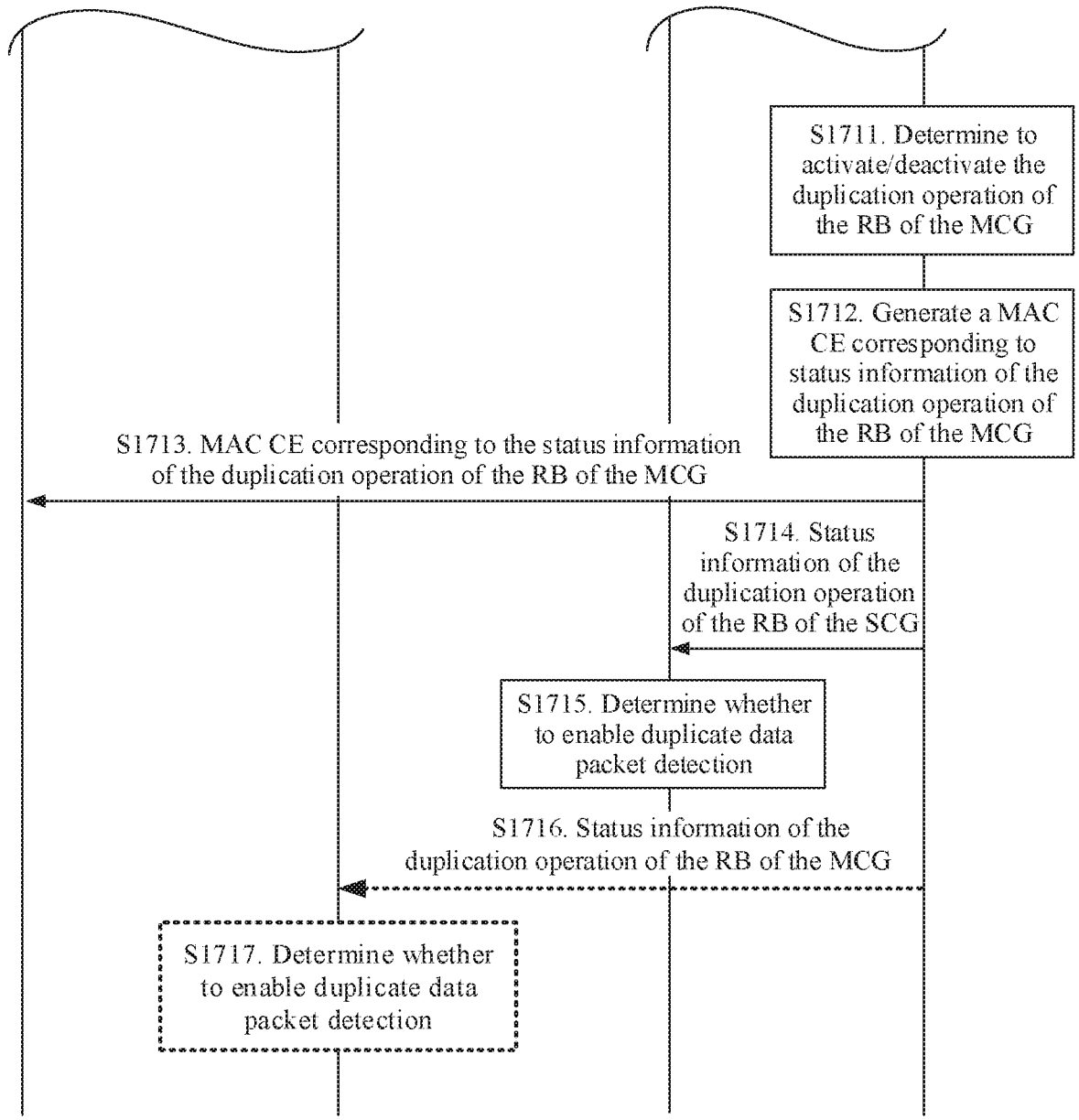

In the communications systems shown in FIG. 1 and FIG. 3, the MN is an LTE base station, the SN is a gNB, and the SN includes an SN-DU and an SN-CU. As shown in FIG. 17A and FIG. 17B, in the communications systems shown in FIG. 1 and FIG. 3, when the PDCP anchor is an SN, the SN-DU determines to configure a duplication operation for an RB of an SCG, and determines whether to activate/deactivate the duplication operation of the RB of the SCG. In this case, a communication method provided in an embodiment of this application includes steps S1700 to S1706. When the PDCP anchor is an MN, the MN determines to configure a duplication operation for an RB of an MCG, and the SN determines whether to activate/deactivate the duplication operation of the RB of the MCG. In this case, the communication method provided in this embodiment of this application includes steps S1707 to S1713.

Specifically, as shown in FIG. 17A and FIG. 17B, the communication method provided in this embodiment of this application includes the following steps.

S1700. The SN-DU determines to configure a duplication operation for an RB of an SCG.

S1701. The SN-DU sends, to the SN-CU, information about the RB, of the SCG, for which the duplication operation has been configured.

The information that is about the RB of the SCG and that is sent by the SN-DU to the SN-CU may be sent through an F1 interface. Optionally, the information about the RB of the SCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the SN-CU may send a response message to the SN-DU through the F1 interface. The response message carries information used to indicate that the foregoing configuration is acknowledged or rejected. Optionally, when the response message carries information indicating the rejection, the response message may further carry a cause value for the rejection.

S1702. The SN-CU generates first configuration information used to indicate that the duplication operation has been configured for the RB of the SCG, and sends the first configuration information to the MN.

S1703. The MN forwards the first configuration information to a terminal.

S1704. The SN-DU determines to activate/deactivate the duplication operation of the RB of the SCG.

S1705. The SN-DU generates a MAC CE corresponding to status information of the duplication operation of the RB of the SCG.

S1706. The SN-DU sends, to the terminal, the MAC CE corresponding to the status information of the duplication operation of the RB of the SCG.

S1707. The MN determines to configure a duplication operation for an RB of an MCG.

S1708. The MN generates second configuration information used to indicate that the duplication operation has been configured for the RB of the MCG, and sends the second configuration information to the terminal.

S1709. The MN sends, to the SN-CU, information about the RB, of the MCG, for which the duplication operation has been configured.

S1710. The SN-CU sends, to the SN-DU, the information about the RB, of the MCG, for which the duplication operation has been configured.

The information that is about the RB of the MCG and that is sent by the SN-CU to the SN-DU may be sent through the F1 interface. Optionally, the information about the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes an RB ID, and indication information indicating that the duplication operation has been configured for the RB.

S1711. The SN-DU determines to activate/deactivate the duplication operation of the RB of the MCG.

S1712. The SN-DU generates a MAC CE corresponding to status information of the duplication operation of the RB of the MCG.

S1713. The SN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S1706 and S1713 may alternatively be both performed.

Optionally, as shown in FIG. 17A and FIG. 17B, a procedure of the communication method shown in FIG. 17A and FIG. 17B may further include S1714 and S1715 after S1704.

S1714. The SN-DU sends the status information of the duplication operation of the RB of the SCG to the SN-CU.

The status information, of the duplication operation of the RB of the SCG, sent by the SN-DU to the SN-CU may be sent through the F1 interface. Optionally, the status information of the duplication operation of the RB of the SCG is included in a UE context modification required (UE Context Modification Required) message. Specifically, the UE context modification required (UE Context Modification Required) message includes an RB list. The RB list includes either of or a combination of the following: an RB ID, and indication information of an active/inactive state of a duplication operation of an RB.

Optionally, the SN-CU may send a response message to the SN-DU through the F1 interface. The response message carries information used to indicate that the foregoing configuration is acknowledged or rejected. Optionally, when the response message carries information indicating the rejection, the response message may further carry a cause value for the rejection.

S1715. The SN-CU determines, based on the status information of the duplication operation of the RB of the SCG, whether to enable duplicate data packet detection.

S1714 and S1715 are optional, and therefore are represented by using dashed lines in FIG. 17A and FIG. 17B.

Optionally, as shown in FIG. 17A and FIG. 17B, a procedure of the communication method shown in FIG. 17A and FIG. 17B may further include S1716 and S1717 after S1711.

S1716. The SN-DU sends the status information of the duplication operation of the RB of the MCG to the MN by using the SN-CU.

The status information, of the duplication operation of the RB of the MCG, sent by the SN-DU to the SN-CU may be sent through the F1 interface. Optionally, the status information of the duplication operation of the RB of the MCG is included in a UE context modification required (UE Context Modification Required) message. Specifically, the UE context modification required (UE Context Modification Required) message includes an RB list. The RB list includes either of or a combination of the following: an RB ID, and indication information of an active/inactive state of a duplication operation of an RB.

S1717. The MN determines, based on the status information of the duplication operation of the RB of the MCG, whether to enable duplicate data packet detection.

S1716 and S1717 are optional, and therefore are represented by using dashed lines in FIG. 17A and FIG. 17B.

Figure 18A:
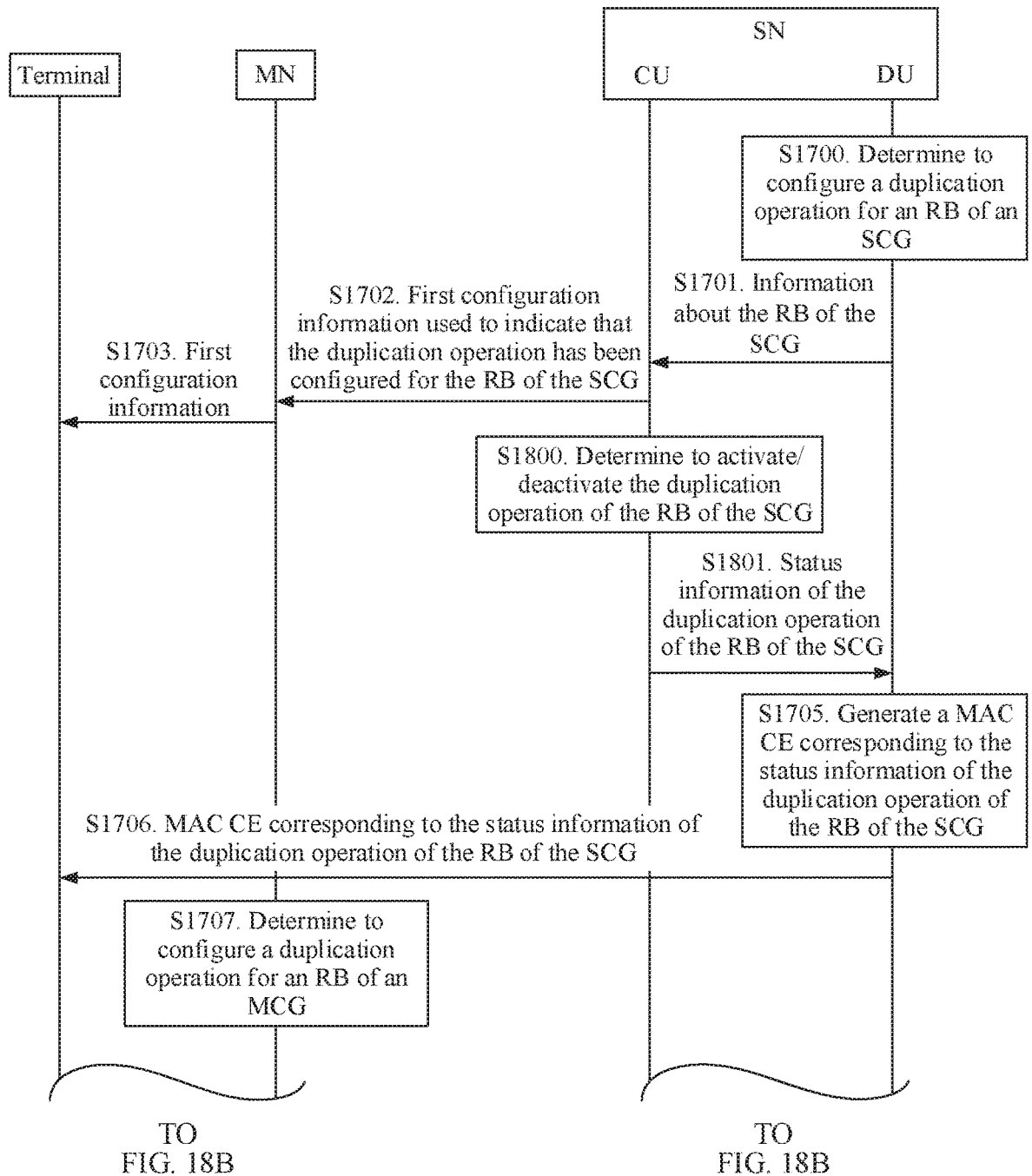
FIG. 18A and FIG. 18B are a twelfth schematic flowchart of a communication method according to an embodiment of this application.
Figure 18B:
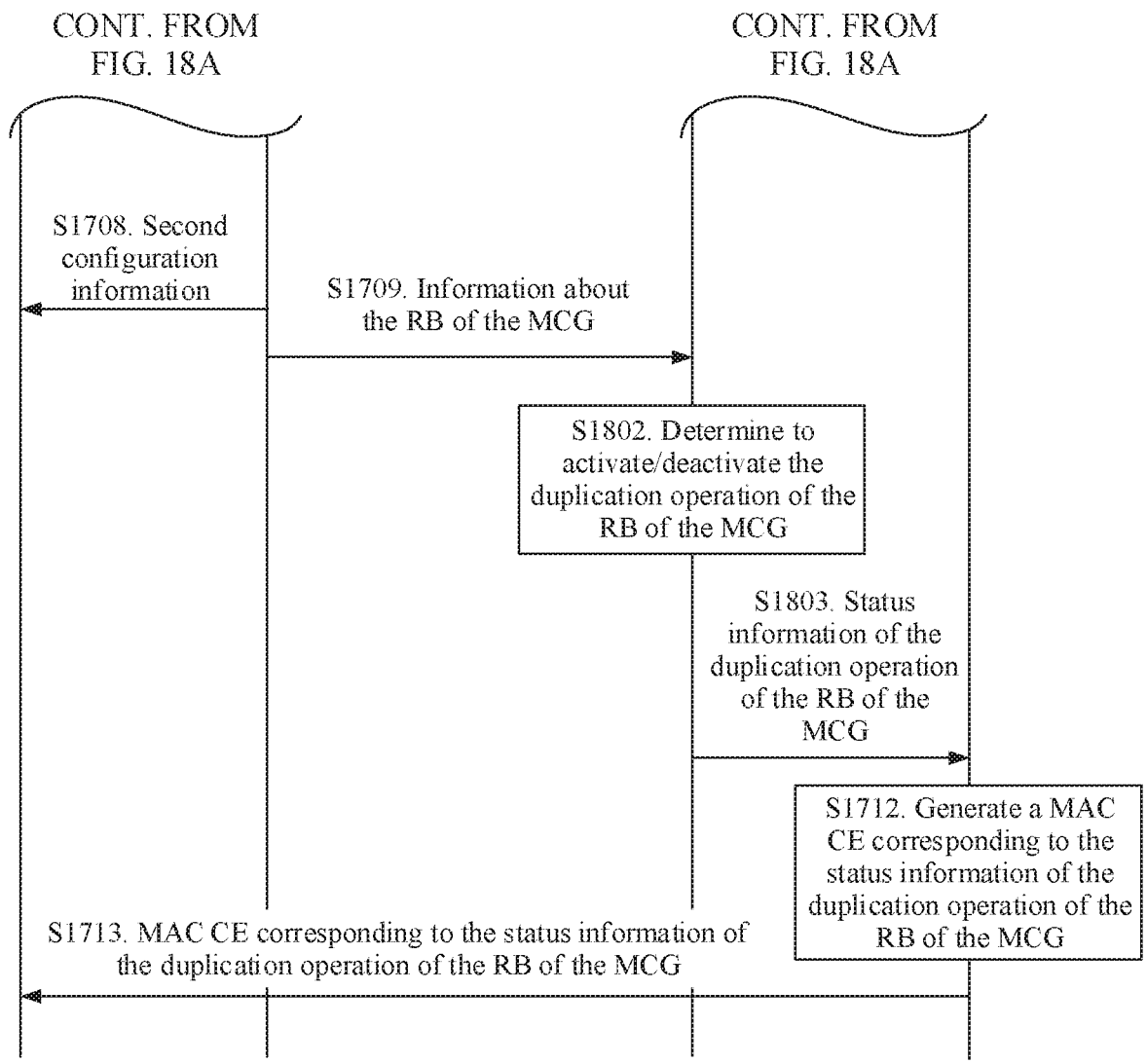

In the communications systems shown in FIG. 1 and FIG. 3, the MN is an LTE base station, the SN is a gNB, and the SN includes an SN-DU and an SN-CU. With reference to FIG. 17A and FIG. 17B, as shown in FIG. 18A and FIG. 18B, in the communications systems shown in FIG. 1 and FIG. 3, when the PDCP anchor is an SN, the SN-DU determines to configure a duplication operation for an RB of an SCG, and the SN-CU determines whether to activate/deactivate the duplication operation of the RB of the SCG. In this case, S1704 is replaced with S1800 and S1801. When the PDCP anchor is an MN, the MN determines to configure a duplication operation for an RB of an MCG, and the SN determines whether to activate/deactivate the duplication operation of the RB of the MCG. In this case, S1710 is replaced with S1802, and S1711 is replaced with S1803.

Specifically, with reference to FIG. 17A and FIG. 17B, as shown in FIG. 18A and FIG. 18B, a communication method provided in an embodiment of this application includes S1700 to S1703, S180 and S1801, S1705 to S1709, S1802 and S1803, and S1712 and S1713. S1800 and S1801, and S1802 and S1803 are respectively as follows:

S1800. The SN-CU determines to activate/deactivate the duplication operation of the RB of the SCG.

S1801. The SN-CU sends status information of the duplication operation of the RB of the SCG to the SN-DU.

The status information, of the duplication operation of the RB of the SCG, sent by the SN-CU to the SN-DU may be sent through the F1 interface. Optionally, the status information of the duplication operation of the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the SN-DU may send a response message to the SN-CU through the F1 interface. The response message carries information used to indicate that the foregoing configuration is acknowledged or rejected. Optionally, when the response message carries information indicating the rejection, the response message may further carry a cause value for the rejection.

S1802. The SN-CU determines to activate/deactivate the duplication operation of the RB of the MCG.

S1803. The SN-CU sends status information of the duplication operation of the RB of the MCG to the SN-DU.

The status information, of the duplication operation of the RB of the MCG, sent by the SN-CU to the SN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the SN-DU may send a response message to the SN-CU through the F1 interface. The response message carries information used to indicate that the foregoing configuration is acknowledged or rejected. Optionally, when the response message carries information indicating the rejection, the response message may further carry a cause value for the rejection.

Figure 19A:
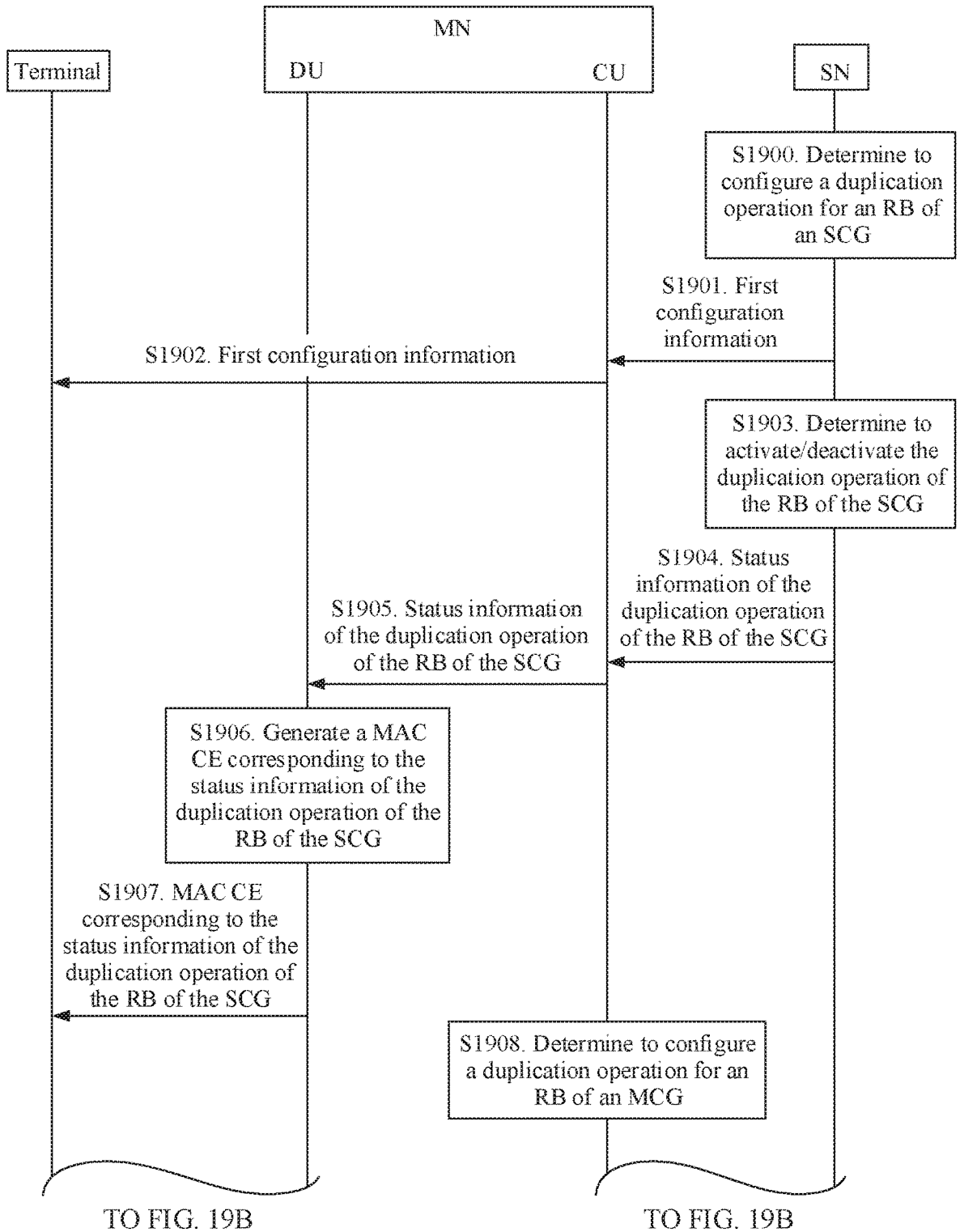
FIG. 19A and FIG. 19B are a thirteenth schematic flowchart of a communication method according to an embodiment of this application.
Figure 19B:
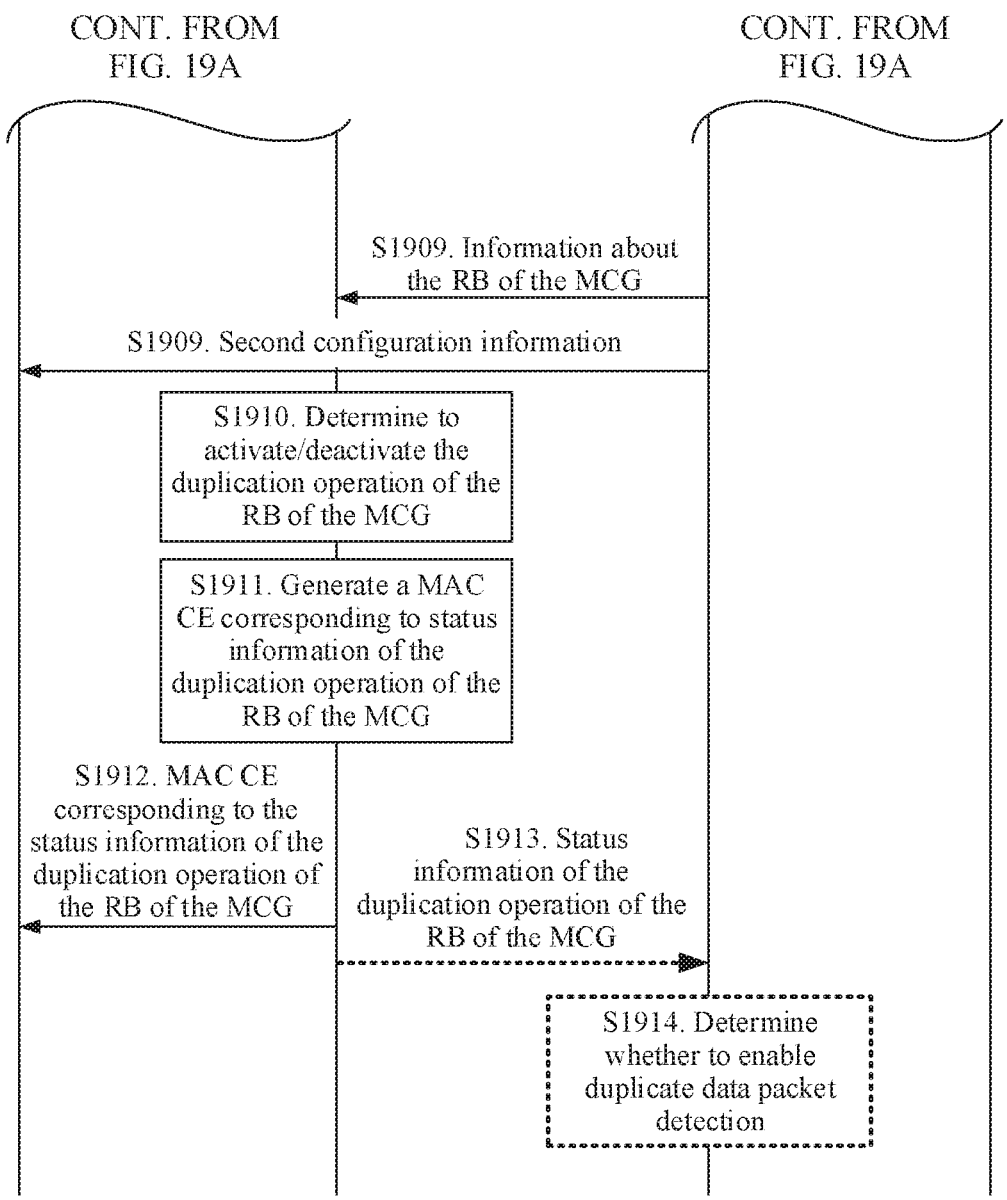

In the communications system shown in FIG. 2, the MN is a gNB, the SN is an LTE base station, and the MN includes an MN-DU and an MN-CU. As shown in FIG. 19A and FIG. 19B, in the communications system shown in FIG. 2, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S1900 to S1907. When the PDCP anchor is an MN, the MN-CU determines to configure a duplication operation for an RB of an MCG, and the MN-DU determines whether to activate/deactivate the duplication operation of the RB of the MCG. In this case, the communication method provided in this embodiment of this application includes steps S1908 to S1912.

Specifically, as shown in FIG. 19A and FIG. 19B, the communication method provided in this embodiment of this application includes the following steps.

S1900. The SN determines to configure a duplication operation for an RB of an SCG.

S1901. The SN generates first configuration information used to indicate that the duplication operation has been configured for the RB of the SCG, and sends the first configuration information to the MN-CU.

S1902. The MN-CU forwards the first configuration information to a terminal.

Specifically, the MN-CU sends the first configuration information to the MN-DU through an F1 interface, and the MN-DU sends the first configuration information to the terminal through an air interface. Optionally, the first configuration information is included in an F1 interface message: a UE context modification request (UE Context Modification Request) message or a downlink RRC message transfer (DL RRC Message Transfer) message.

S1903. The SN determines to activate/deactivate the duplication operation of the RB of the SCG.

S1904. The SN sends status information of the duplication operation of the RB of the SCG to the MN-CU.

S1905. The MN-CU forwards the status information of the duplication operation of the RB of the SCG to the MN-DU.

The status information, of the duplication operation of the RB of the SCG, sent by the MN-CU to the MN-DU may be sent through the F1 interface. For example, the status information of the duplication operation of the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S1906. The MN-DU generates a MAC CE corresponding to the status information of the duplication operation of the RB of the SCG.

S1907. The MN-DU sends, to the terminal, the MAC CE corresponding to the status information of the duplication operation of the RB of the SCG.

S1908. The MN-CU determines to configure a duplication operation for an RB of an MCG.

S1909. The MN-CU sends, to the MN-DU, information about the RB, of the MCG, for which the duplication operation has been configured, and generates second configuration information used to indicate that the duplication operation has been configured for the RB of the MCG, and the MN-CU sends the second configuration information to the terminal.

The information that is about the RB of the MCG and that is sent by the MN-CU to the MN-DU may be sent through the F1 interface. Optionally, the information about the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes an RB ID, and indication information indicating that the duplication operation has been configured for the RB.

S1910. The MN-DU determines to activate/deactivate the duplication operation of the RB of the MCG.

S1911. The MN-DU generates a MAC CE corresponding to status information of the duplication operation of the RB of the MCG.

S1912. The MN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S1907 and S1912 may alternatively be both performed.

Optionally, as shown in FIG. 19A and FIG. 19B, a procedure of the communication method shown in FIG. 19A and FIG. 19B may further include S1913 and S1914 after S1910.

S1913. The MN-DU sends the status information of the duplication operation of the RB of the MCG to the MN-CU.

The status information, of the duplication operation of the RB of the MCG, sent by the MN-DU to the MN-CU may be sent through the F1 interface. Optionally, the status information of the duplication operation of the RB of the MCG is included in a UE context modification required (UE Context Modification Required) message. Specifically, the UE context modification required (UE Context Modification Required) message includes an RB list. The RB list includes either of or a combination of the following: an RB ID, and indication information of an active/inactive state of a duplication operation of an RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S1914. The MN-CU determines, based on the status information of the duplication operation of the RB of the MCG, whether to enable duplicate data packet detection.

S1913 and S1914 are optional, and therefore are represented by using dashed lines in FIG. 19A and FIG. 19B.

Figure 20A:
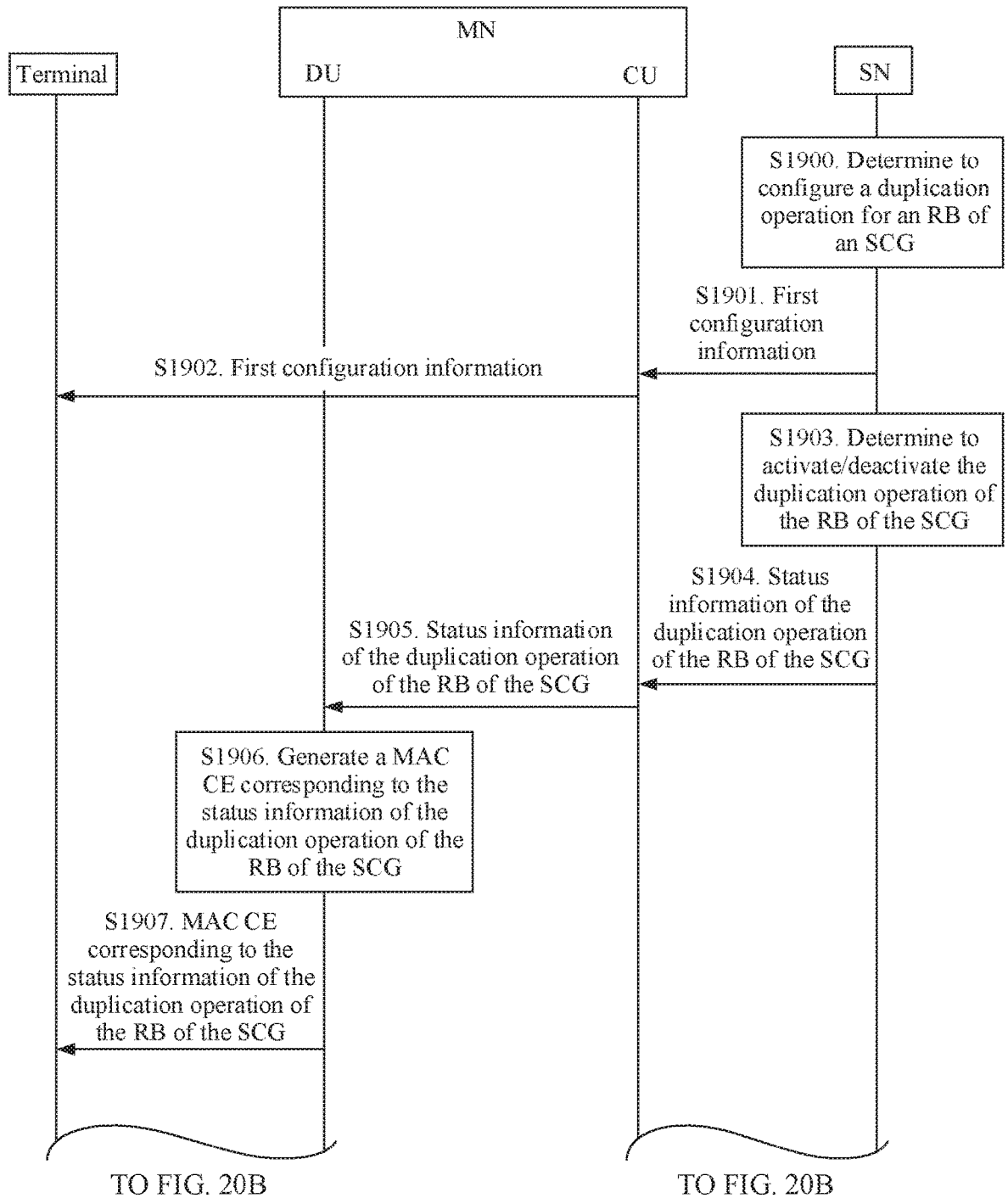
FIG. 20A and FIG. 20B are an fourteenth schematic flowchart of a communication method according to an embodiment of this application.
Figure 20B:
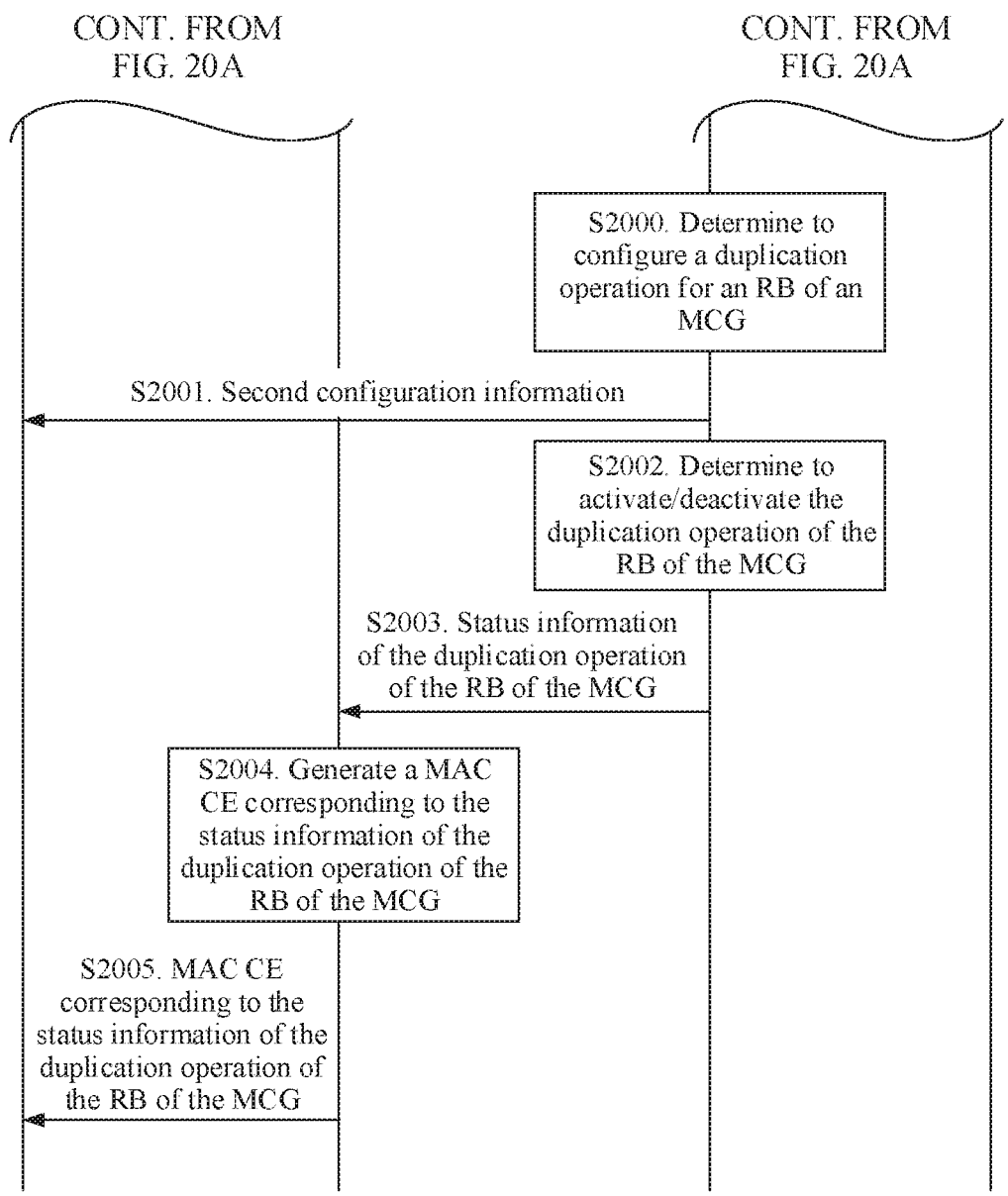

In the communications system shown in FIG. 2, the MN is a gNB, the SN is an LTE base station, and the MN includes an MN-DU and an MN-CU. With reference to FIG. 19A and FIG. 19B, as shown in FIG. 20A and FIG. 20B, in the communications system shown in FIG. 2, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S1900 to S1907. When the PDCP anchor is an MN, the MN-CU determines to configure a duplication operation for an RB of an MCG, and determines whether to activate/deactivate the duplication operation of the RB of the MCG. In this case, the communication method provided in this embodiment of this application includes steps S2000 to S2005.

Specifically, with reference to FIG. 19A and FIG. 19B, as shown in FIG. 20A and FIG. 20B, the communication method provided in this embodiment of this application includes S1900 to S1907, and S2000 to S2005. S2000 to S2005 are as follows:

S2000. The MN-CU determines to configure a duplication operation for an RB of an MCG.

S2001. The MN-CU generates second configuration information used to indicate that the duplication operation has been configured for the RB of the MCG, and the MN-CU sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) message or a downlink RRC message transfer (DL RRC Message Transfer) message.

S2002. The MN-CU determines to activate/deactivate the duplication operation of the RB of the MCG.

S2003. The MN-CU sends status information of the duplication operation of the RB of the MCG to the MN-DU.

The status information, of the duplication operation of the RB of the MCG, sent by the MN-CU to the MN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2004. The MN-DU generates a MAC CE corresponding to the status information of the duplication operation of the RB of the MCG.

S2005. The MN-DU sends, to the terminal, the MAC CE corresponding to the status information of the duplication operation of the RB of the MCG.

Figure 21A:
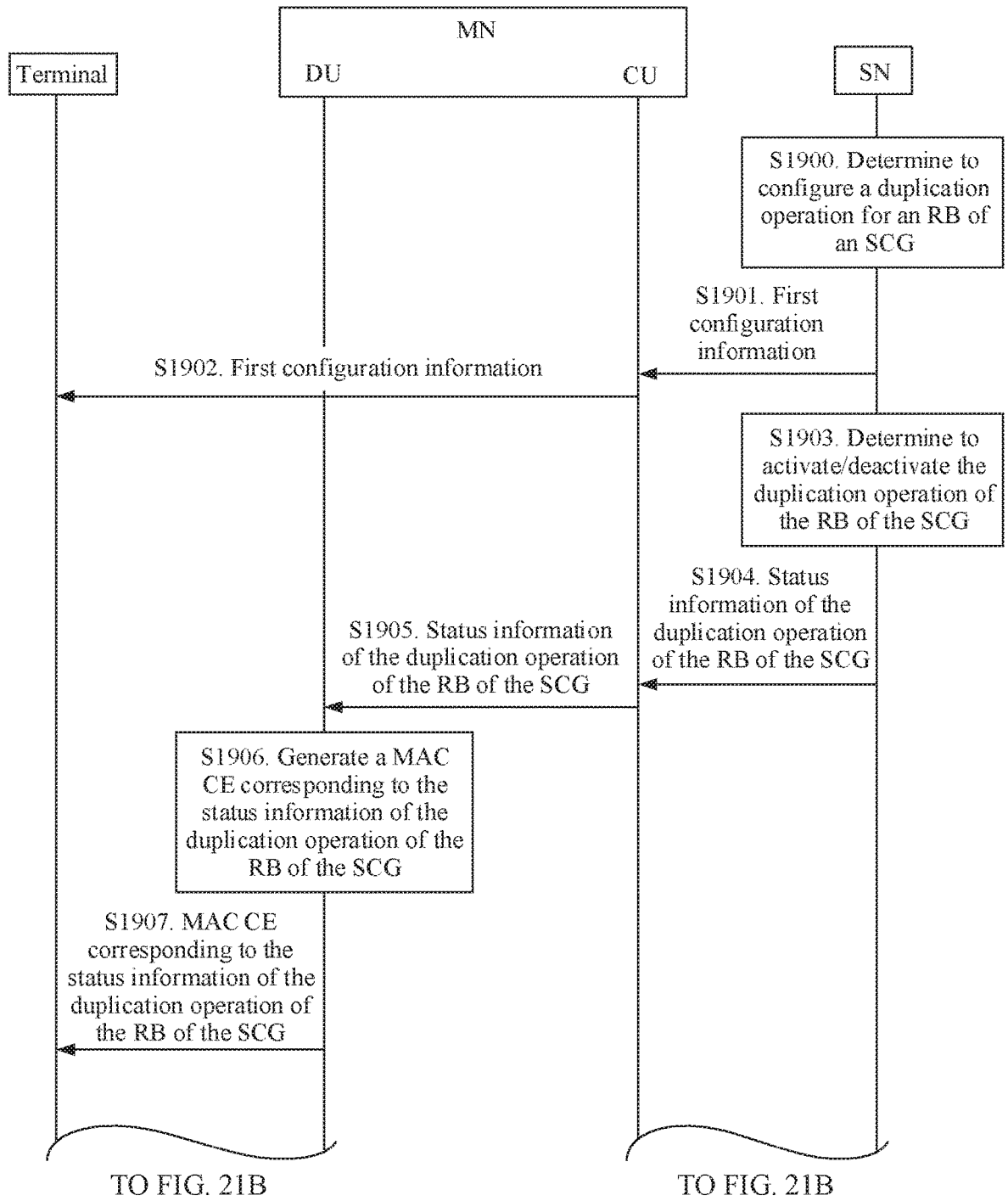
FIG. 21A and FIG. 21B are a fifteenth schematic flowchart of a communication method according to an embodiment of this application.
Figure 21B:
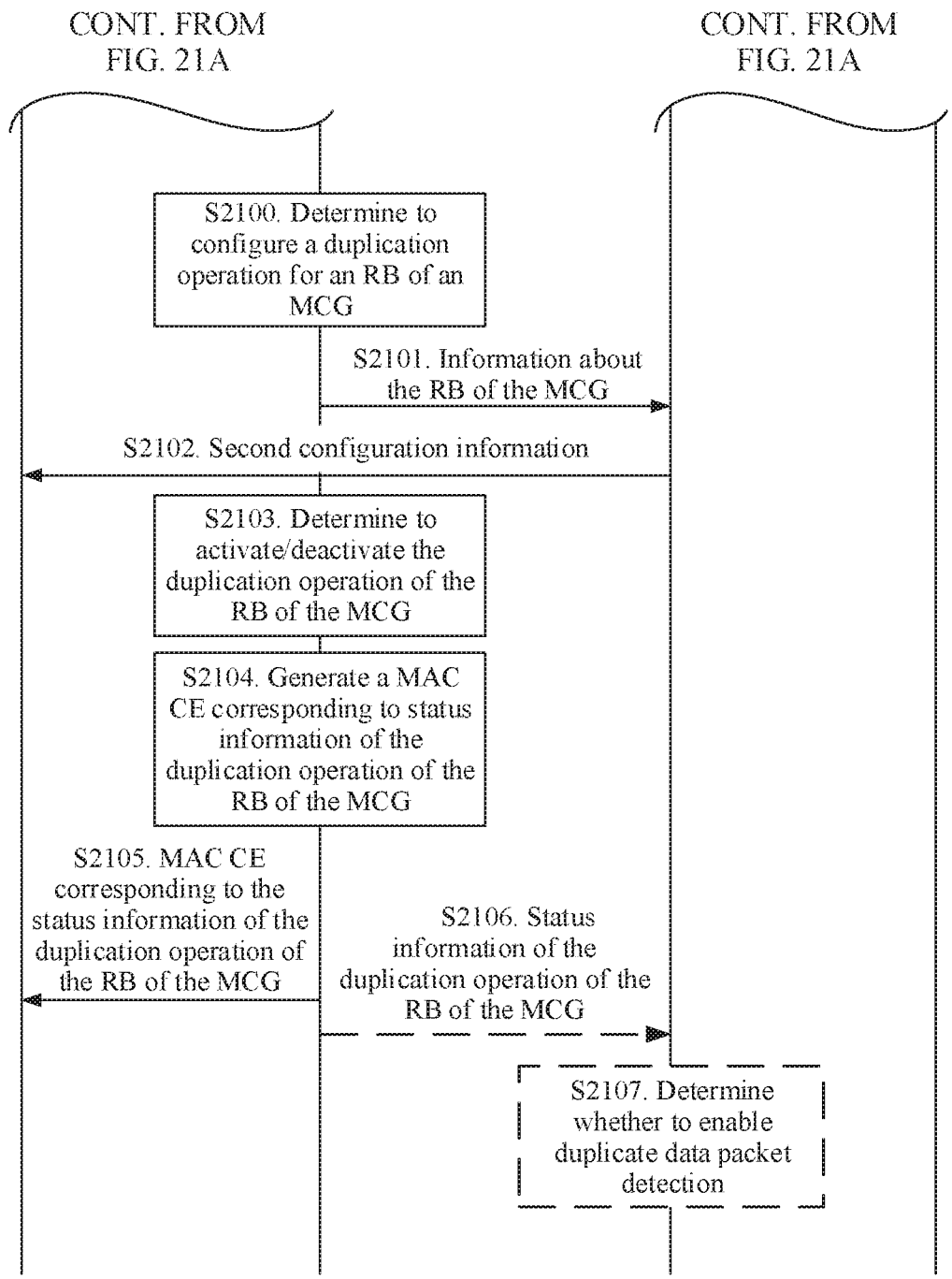

In the communications system shown in FIG. 2, the MN is a gNB, the SN is an LTE base station, and the MN includes an MN-DU and an MN-CU. With reference to FIG. 19A and FIG. 19B, as shown in FIG. 21A and FIG. 21B, in the communications system shown in FIG. 2, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S1900 to S1907. When the PDCP anchor is an MN, the MN-DU determines to configure a duplication operation for an RB of an MCG, and determines whether to activate/deactivate the duplication operation of the RB of the MCG. In this case, the communication method provided in this embodiment of this application includes steps S2100 to S2105.

Specifically, with reference to FIG. 19A and FIG. 19B, as shown in FIG. 21A and FIG. 21B, the communication method provided in this embodiment of this application includes S1900 to S1907, and S2100 to S2105. S2100 to S2105 are as follows:

S2100. The MN-DU determines to configure a duplication operation for an RB of an MCG.

S2101. The MN-DU sends, to the MN-CU, information about the RB, of the MCG, for which the duplication operation has been configured.

The information that is about the RB of the MCG and that is sent by the MN-DU to the MN-CU may be sent through the F1 interface. For example, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2102. The MN-CU generates second configuration information used to indicate that the duplication operation has been configured for the RB of the MCG, and the MN-CU sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) or a downlink RRC message transfer (DL RRC Message Transfer) message.

S2103. The MN-DU determines to activate/deactivate the duplication operation of the RB of the MCG.

S2104. The MN-DU generates a MAC CE corresponding to status information of the duplication operation of the RB of the MCG.

S2105. The MN-DU sends, to the terminal, the MAC CE corresponding to the status information of the duplication operation of the RB of the MCG.

Optionally, as shown in FIG. 21A and FIG. 21B, a procedure of the communication method shown in FIG. 21A and FIG. 21B may further include S2106 and S2107 after S2103.

S2106. The MN-DU sends the status information of the duplication operation of the RB of the MCG to the MN-CU.

Optionally, the status information, of the duplication operation of the RB of the MCG, sent by the MN-DU to the MN-CU may be sent through the F1 interface. For example, the status information of the duplication operation of the RB of the MCG is included in a UE context modification required (UE Context Modification Required) message. Specifically, the UE context modification required (UE Context Modification Required) message includes an RB list. The RB list includes either of or a combination of the following: an RB ID, and indication information of an active/inactive state of a duplication operation of an RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2107. The MN-CU determines, based on the status information of the duplication operation of the RB of the MCG, whether to enable duplicate data packet detection.

S2106 and S2107 are optional, and therefore are represented by using dashed lines in FIG. 21A and FIG. 21B.

Figure 22A:
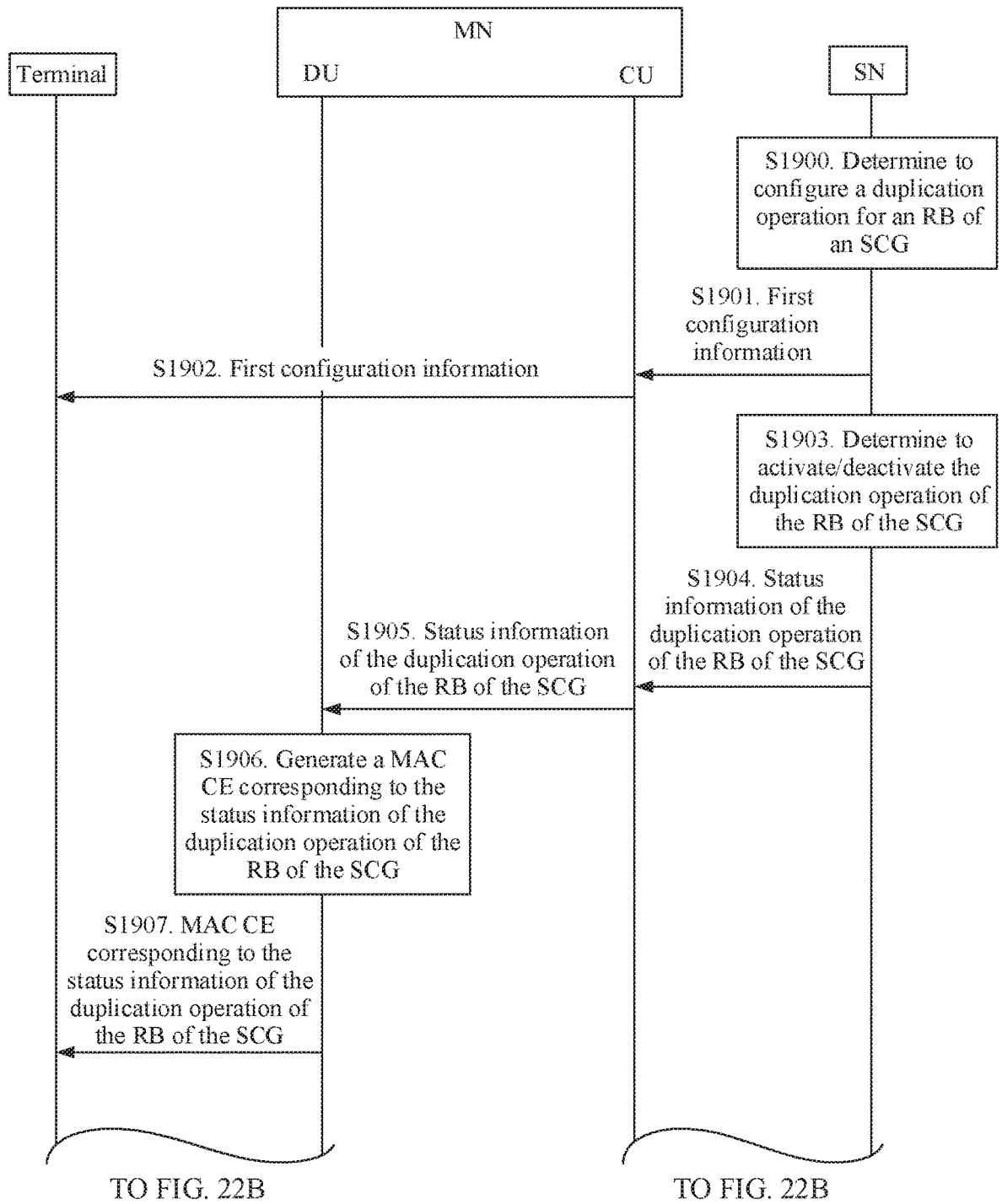
FIG. 22A and FIG. 22B are a sixteenth schematic flowchart of a communication method according to an embodiment of this application.
Figure 22B:
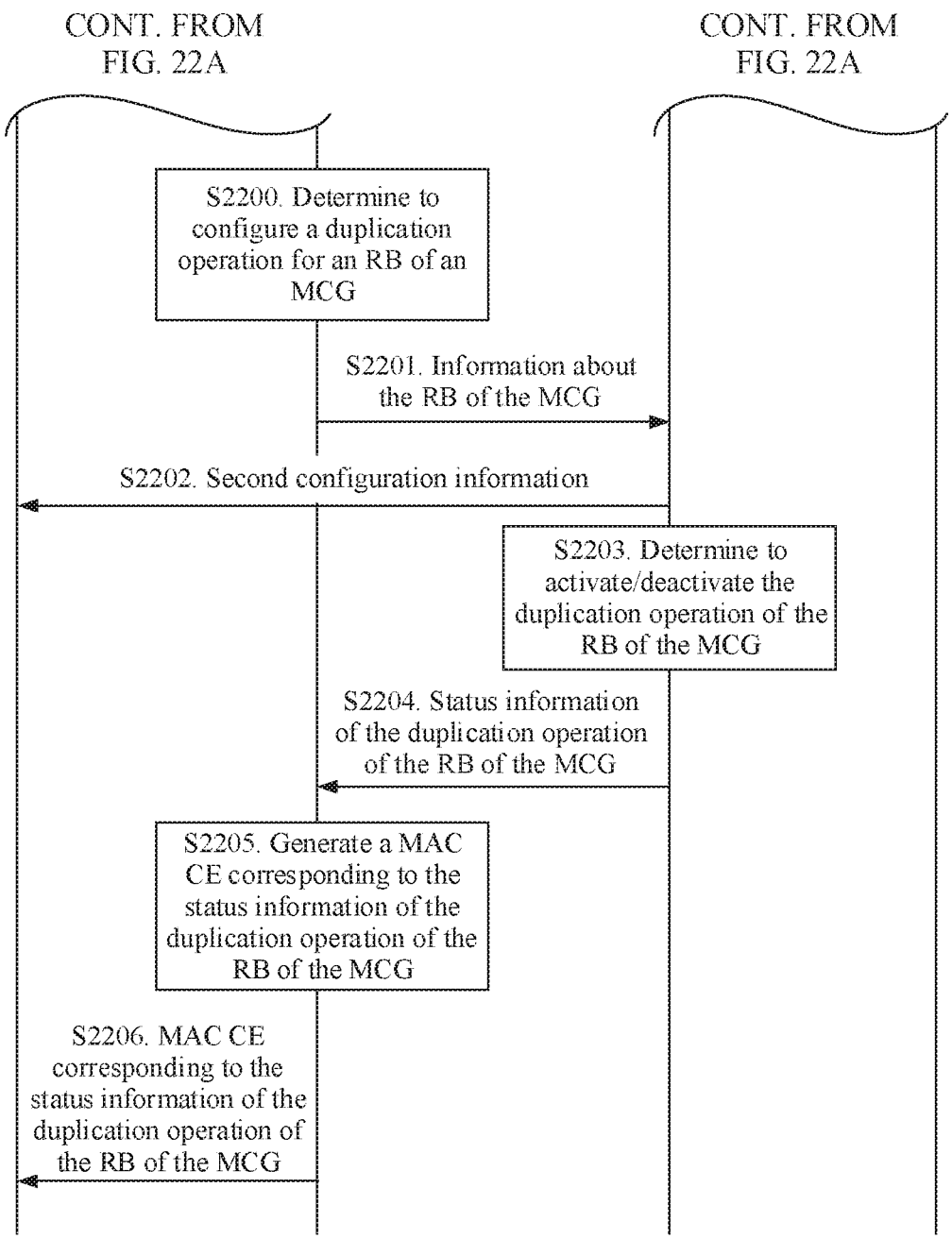

In the communications system shown in FIG. 2, the MN is a gNB, the SN is an LTE base station, and the MN includes an MN-DU and an MN-CU. With reference to FIG. 19A and FIG. 19B, as shown in FIG. 22A and FIG. 22B, in the communications system shown in FIG. 2, when the PDCP anchor is an SN, the SN determines to configure a duplication operation for an RB of an SCG, and determines whether to activate/deactivate the duplication operation of the RB of the SCG. In this case, a communication method provided in an embodiment of this application includes steps S1900 to S1907. When the PDCP anchor is an MN, the MN-DU determines to configure a duplication operation for an RB of an MCG, and determines whether to activate/deactivate the duplication operation of the RB of the MCG. In this case, the communication method provided in this embodiment of this application includes steps S2200 to S2206.

Specifically, with reference to FIG. 19A and FIG. 19B, as shown in FIG. 22A and FIG. 22B, the communication method provided in this embodiment of this application includes S1900 to S1907, and S2200 to S2206. S220 to S2206 are as follows:

S2200. The MN-DU determines to configure a duplication operation for an RB of an MCG.

S2201. The MN-DU sends, to the MN-CU, information about the RB, of the MCG, for which the duplication operation has been configured.

The information that is about the RB of the MCG and that is sent by the MN-DU to the MN-CU may be sent through the F1 interface. For example, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2202. The MN-CU generates second configuration information used to indicate that the duplication operation has been configured for the RB of the MCG, and the MN-CU sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) or a downlink RRC message transfer (DL RRC Message Transfer) message.

S2203. The MN-CU determines to activate/deactivate the duplication operation of the RB of the MCG.

S2204. The MN-CU sends status information of the duplication operation of the RB of the MCG to the MN-DU.

The status information, of the duplication operation of the RB of the MCG, sent by the MN-CU to the MN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2205. The MN-DU generates a MAC CE corresponding to the status information of the duplication operation of the RB of the MCG.

S2206. The MN-DU sends, to the terminal, the MAC CE corresponding to the status information of the duplication operation of the RB of the MCG.

Figure 23A:
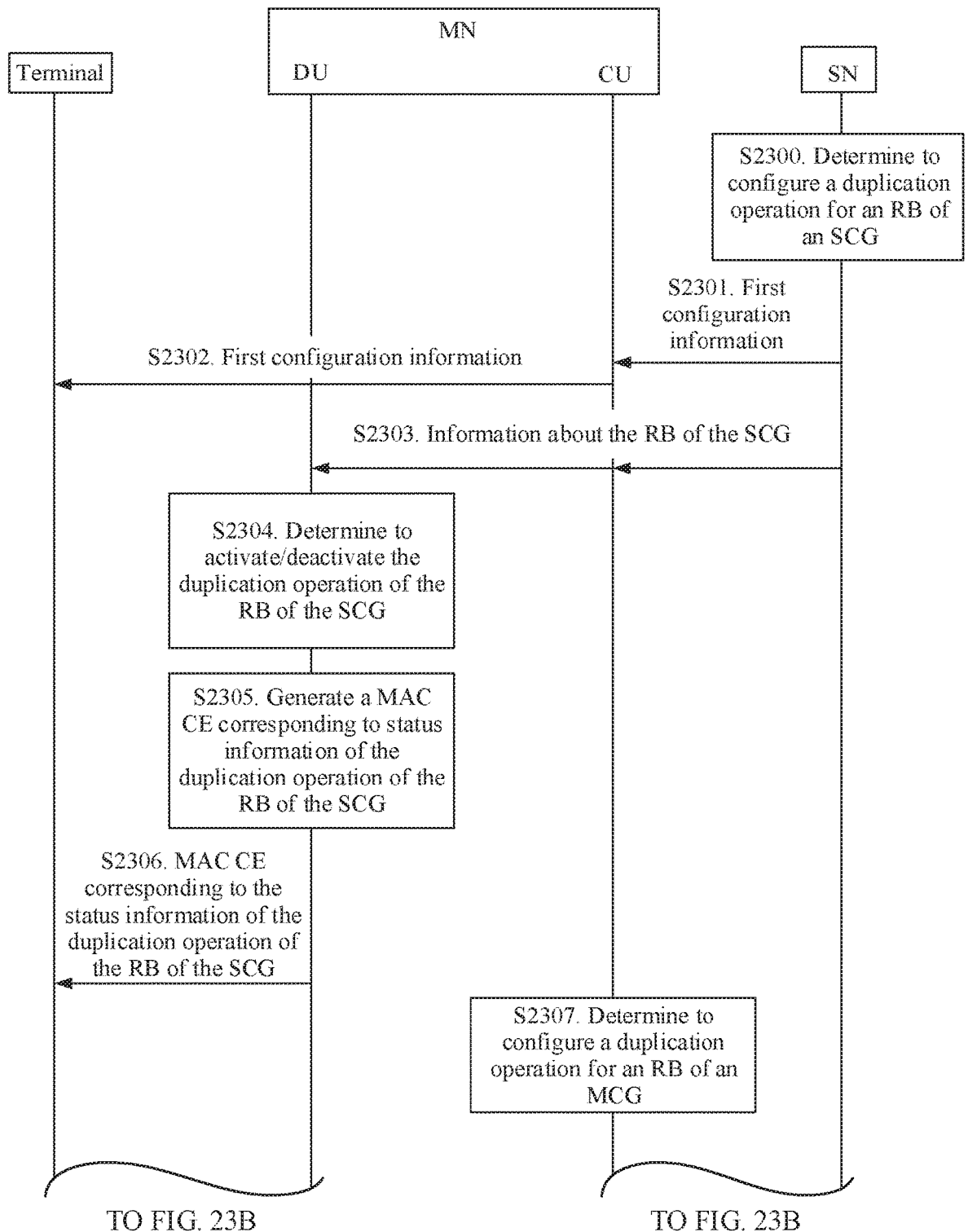
FIG. 23A and FIG. 23B are a seventeenth schematic flowchart of a communication method according to an embodiment of this application.
Figure 23B:
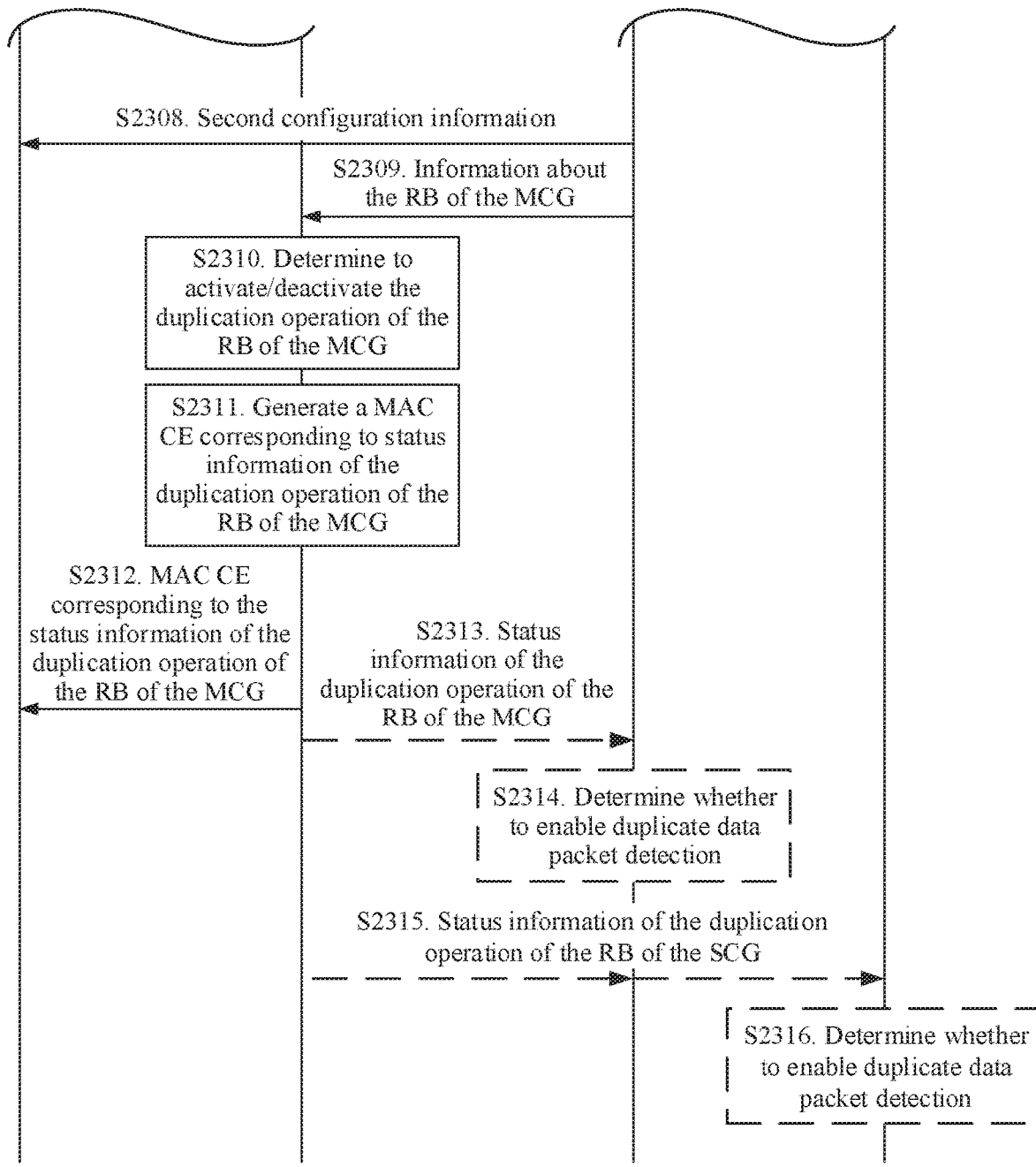

In the communications system shown in FIG. 2, the MN is a gNB, the SN is an LTE base station, and the MN includes an MN-DU and an MN-CU. As shown in FIG. 23A and FIG. 23B, in the communications system shown in FIG. 2, when the PDCP anchor is an SN, the SN determines to configure a duplication operation for an RB of an SCG, and the MN-DU determines whether to activate/deactivate the duplication operation of the RB of the SCG. In this case, a communication method provided in an embodiment of this application includes steps S2300 to S2306. When the PDCP anchor is an MN, the MN-CU determines to configure a duplication operation for an RB of an MCG, and the MN-DU determines whether to activate/deactivate the duplication operation of the RB of the MCG. In this case, the communication method provided in this embodiment of this application includes steps S2307 to S2312.

Specifically, as shown in FIG. 23A and FIG. 23B, the communication method provided in this embodiment of this application includes the following steps.

S2300. The SN determines to configure a duplication operation for an RB of an SCG.

S2301. The SN generates first configuration information used to indicate that the duplication operation has been configured for the RB of the SCG, and sends the first configuration information to the MN-CU.

S2302. The MN-CU forwards the first configuration information to a terminal.

Specifically, the MN-CU sends the first configuration information to the MN-DU through an F1 interface, and the MN-DU sends the first configuration information to the terminal through an air interface. Optionally, the first configuration information is included in an F1 interface message: a UE context modification request (UE Context Modification Request) or a downlink RRC message transfer (DL RRC Message Transfer) message.

S2303. The SN sends, to the MN-DU by using the MN-CU, information about the RB, of the SCG, for which the duplication operation has been configured.

The information that is about the RB of the SCG and that is sent by the MN-CU to the MN-DU may be sent through the F1 interface. Optionally, the information about the RB of the SCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes an RB ID, and indication information indicating that the duplication operation has been configured for the RB.

S2304. The MN-DU determines to activate/deactivate the duplication operation of the RB of the SCG.

S2305. The MN-DU generates a MAC CE corresponding to status information of the duplication operation of the RB of the SCG.

S2306. The MN-DU sends, to the terminal, the MAC CE corresponding to the status information of the duplication operation of the RB of the SCG.

S2307. The MN-CU determines to configure a duplication operation for an RB of an MCG.

S2308. The MN-CU generates second configuration information used to indicate that the duplication operation has been configured for the RB of the MCG, and sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) message or a downlink RRC message transfer (DL RRC Message Transfer) message.

S2309. The MN-CU sends information about the RB of the MCG to the MN-DU.

Status information, of the duplication operation of the RB of the MCG, sent by the MN-CU to the MN-DU may be sent through the F1 interface. Optionally, the status information of the duplication operation of the RB of the MCG is included in a UE context setup request (UE Context Setup Request) message or a UE context modification request (UE Context Modification Request) message. Specifically, the UE context setup request (UE Context Setup Request) message or the UE context modification request (UE Context Modification Request) message includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2310. The MN-DU determines to activate/deactivate the duplication operation of the RB of the MCG.

S2311. The MN-DU generates a MAC CE corresponding to the status information of the duplication operation of the RB of the MCG.

S2312. The MN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S2306 and S2312 may alternatively be both performed.

Optionally, as shown in FIG. 23A and FIG. 23B, a procedure of the communication method shown in FIG. 23A and FIG. 23B may further include S2313 and S2314 after S2310.

S2313. The MN-DU sends the status information of the duplication operation of the RB of the MCG to the MN-CU.

The information that is about the RB of the MCG and that is sent by the MN-DU to the MN-CU may be sent through the F1 interface. Optionally, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2314. The MN-CU determines, based on the status information of the duplication operation of the RB of the MCG, whether to enable duplicate data packet detection.

S2313 and S2314 are optional, and therefore are represented by using dashed lines in FIG. 23A and FIG. 23B.

Optionally, as shown in FIG. 23A and FIG. 23B, a procedure of the communication method shown in FIG. 23A and FIG. 23B may further include S2315 and S2316 after S2304.

S2315. The MN-DU sends the status information of the duplication operation of the RB of the SCG to the SN by using the MN-CU.

The information that is about the RB of the SCG and that is sent by the MN-DU to the MN-CU may be sent through the F1 interface. For example, the information about the RB of the SCG is included in the UE Context Modification Required. Specifically, the UE context modification required (UE Context Modification Required) message includes an RB list. The RB list includes an RB 1D, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2316. The SN determines, based on the status information of the duplication operation of the RB of the SCG, whether to enable duplicate data packet detection.

S2315 and S2316 are optional, and therefore are represented by using dashed lines in FIG. 23A and FIG. 23B.

Figure 24A:
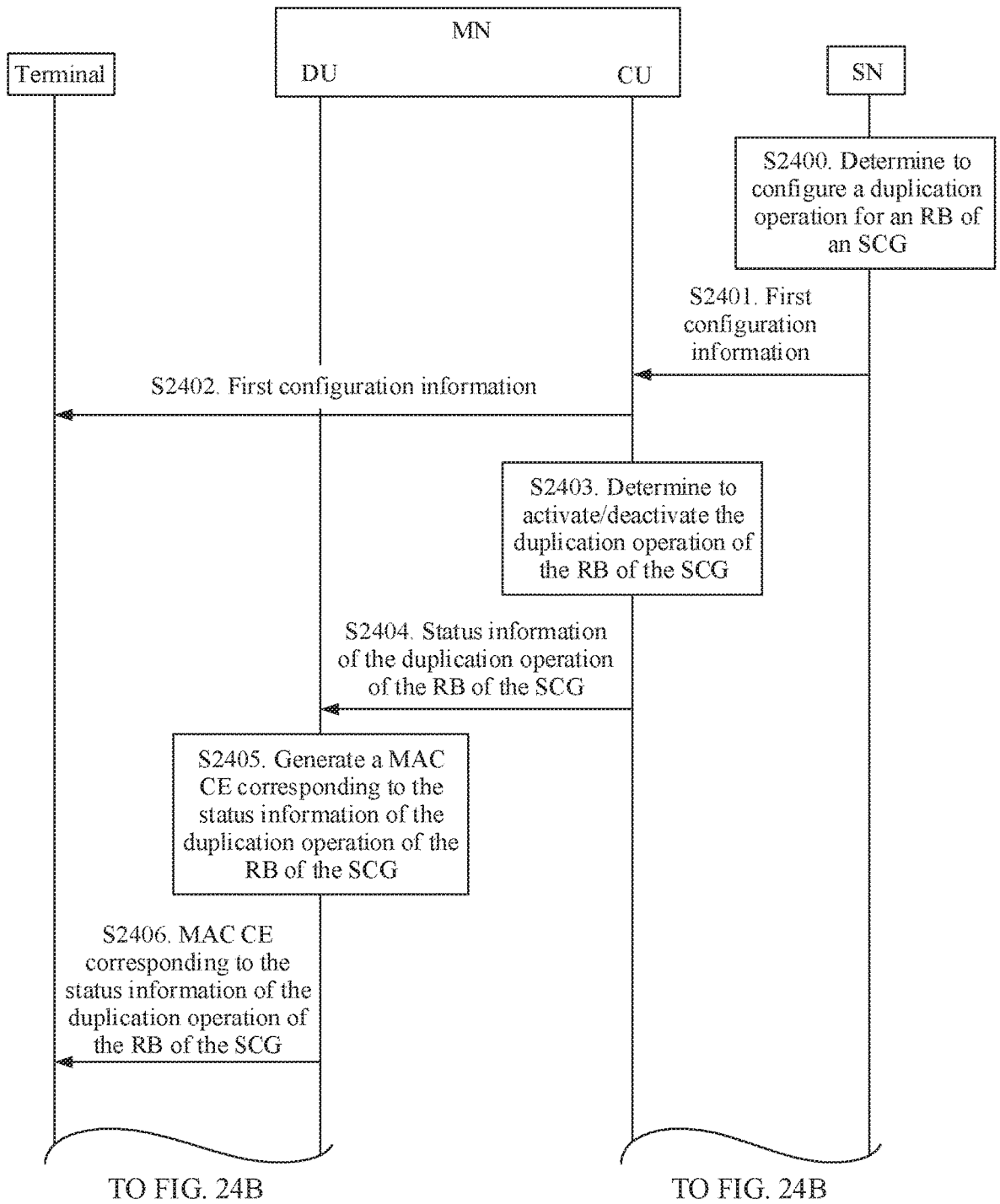
FIG. 24A and FIG. 24B are an eighteenth schematic flowchart of a communication method according to an embodiment of this application.
Figure 24B:
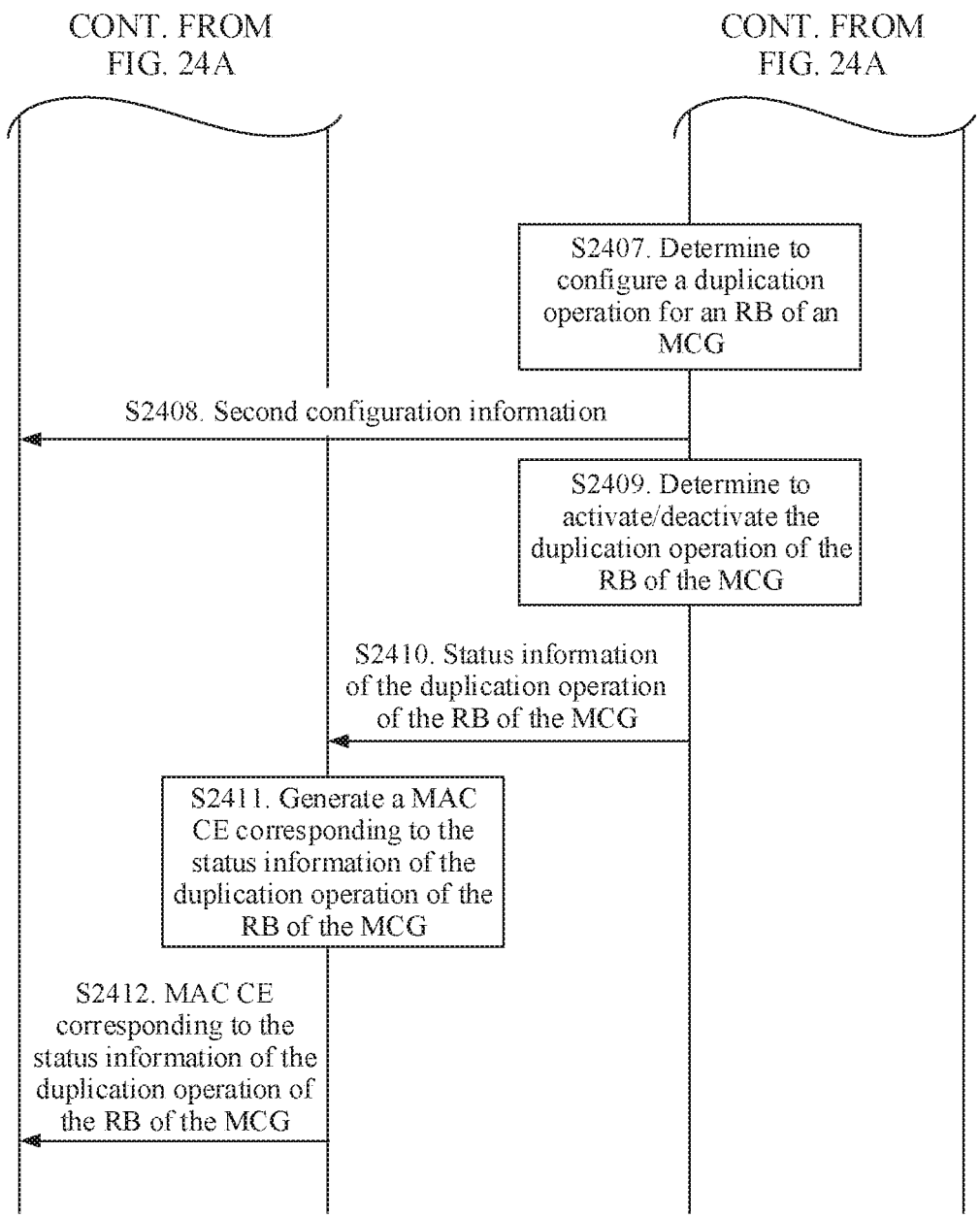

In the communications system shown in FIG. 2, the MN is a gNB, the SN is an LTE base station, and the MN includes an MN-DU and an MN-CU. As shown in FIG. 24A and FIG. 24B, in the communications system shown in FIG. 2, when the PDCP anchor is an SN, the SN determines to configure a duplication operation for an RB of an SCG, and the MN-CU determines whether to activate/deactivate the duplication operation of the RB of the SCG. In this case, a communication method provided in an embodiment of this application includes steps S2400 to S2406. When the PDCP anchor is an MN, the MN-CU determines to configure a duplication operation for an RB of an MCG, and determines whether to activate/deactivate the duplication operation of the RB of the MCG. In this case, the communication method provided in this embodiment of this application includes steps S2407 to S2412.

Specifically, as shown in FIG. 24A and FIG. 24B, the communication method provided in this embodiment of this application includes the following steps.

S2400. The SN determines to configure a duplication operation for an RB of an SCG.

S2401. The SN generates first configuration information used to indicate that the duplication operation has been configured for the RB of the SCG, and sends the first configuration information to the MN-CU.

S2402. The MN-CU forwards the first configuration information to a terminal.

Specifically, the MN-CU sends the first configuration information to the MN-DU through an F1 interface, and the MN-DU sends the first configuration information to the terminal through an air interface. Optionally, the first configuration information is included in an F1 interface message: a UE context modification request (UE Context Modification Request) message or a downlink RRC message transfer (DL RRC Message Transfer) message.

S2403. The MN-CU determines to activate/deactivate the duplication operation of the RB of the SCG.

S2404. The MN-CU sends status information of the duplication operation of the RB of the SCG to the MN-DU.

The status information, of the duplication operation of the RB of the SCG, sent by the MN-CU to the MN-DU may be sent through the F1 interface. Optionally, the status information of the duplication operation of the RB of the SCG is included in a UE context setup request (UE Context Setup Request) message or a UE context modification request (UE Context Modification Request). Specifically, the UE context setup request (UE Context Setup Request) message or the UE context modification request (UE Context Modification Request) includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2405. The MN-DU generates a MAC CE corresponding to the status information of the duplication operation of the RB of the SCG.

S2406. The MN-DU sends, to the terminal, the MAC CE corresponding to the status information of the duplication operation of the RB of the SCG.

S2407. The MN-CU determines to configure a duplication operation for an RB of an MCG.

S2408. The MN-CU generates second configuration information used to indicate that the duplication operation has been configured for the RB of the MCG, and sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) message or a downlink RRC message transfer (DL RRC Message Transfer) message.

S2409. The MN-CU determines to activate/deactivate the duplication operation of the RB of the MCG.

S2410. The MN-CU sends status information of the duplication operation of the RB of the MCG to the MN-DU.

Optionally, the status information, of the duplication operation of the RB of the MCG, sent by the MN-CU to the MN-DU may be sent through the F1 interface. For example, the status information of the duplication operation of the RB of the MCG is included in a UE context setup request (UE Context Setup Request) message or a UE context modification request (UE Context Modification Request). Specifically, the UE context setup request (UE Context Setup Request) message or the UE context modification request (UE Context Modification Request) includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2411. The MN-DU generates a MAC CE corresponding to the status information of the duplication operation of the RB of the MCG.

S2412. The MN-DU sends, to the terminal, the MAC CE corresponding to the status information of the duplication operation of the RB of the MCG.

Figure 25A:
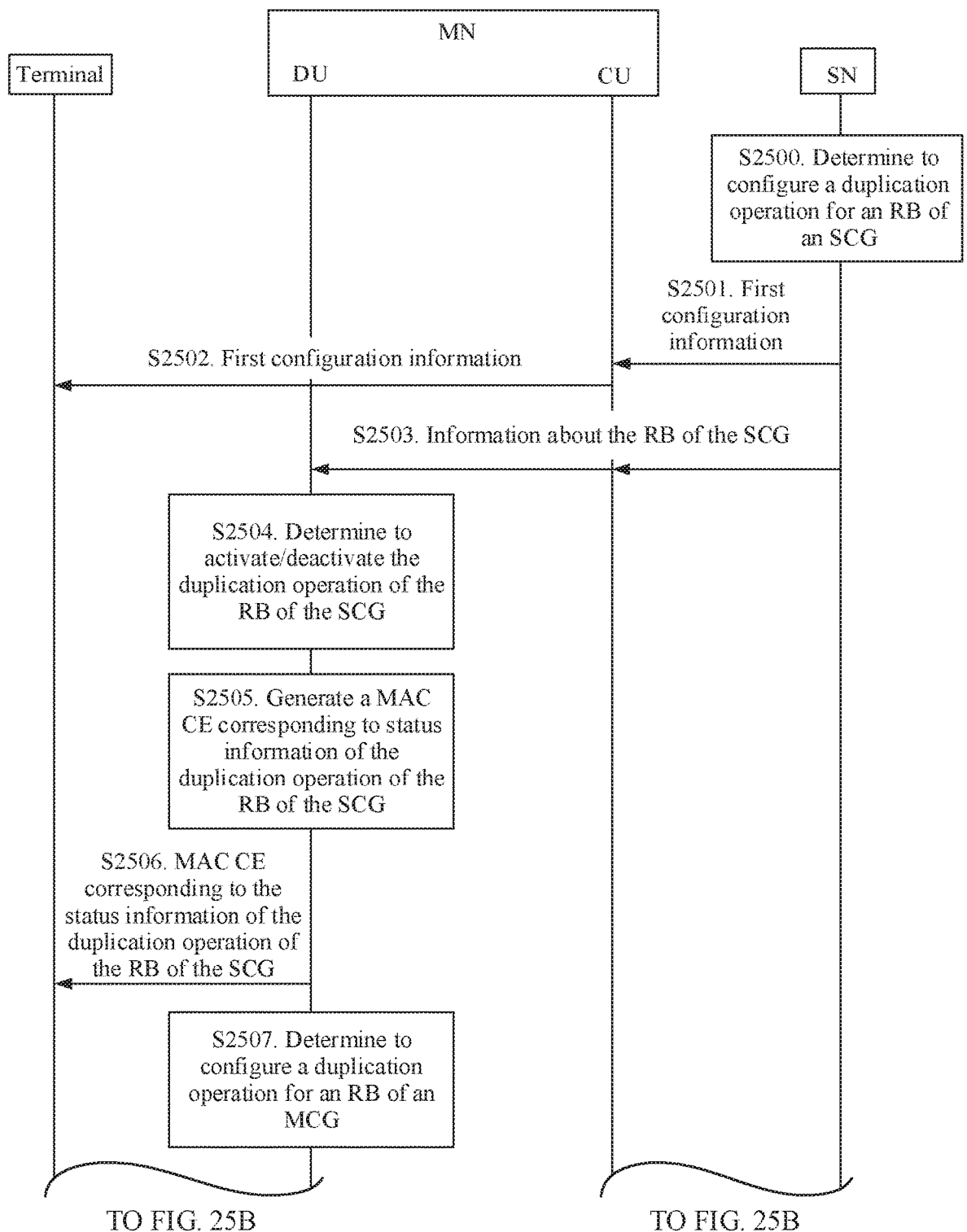
FIG. 25A and FIG. 25B are a nineteenth schematic flowchart of a communication method according to an embodiment of this application.
Figure 25B:
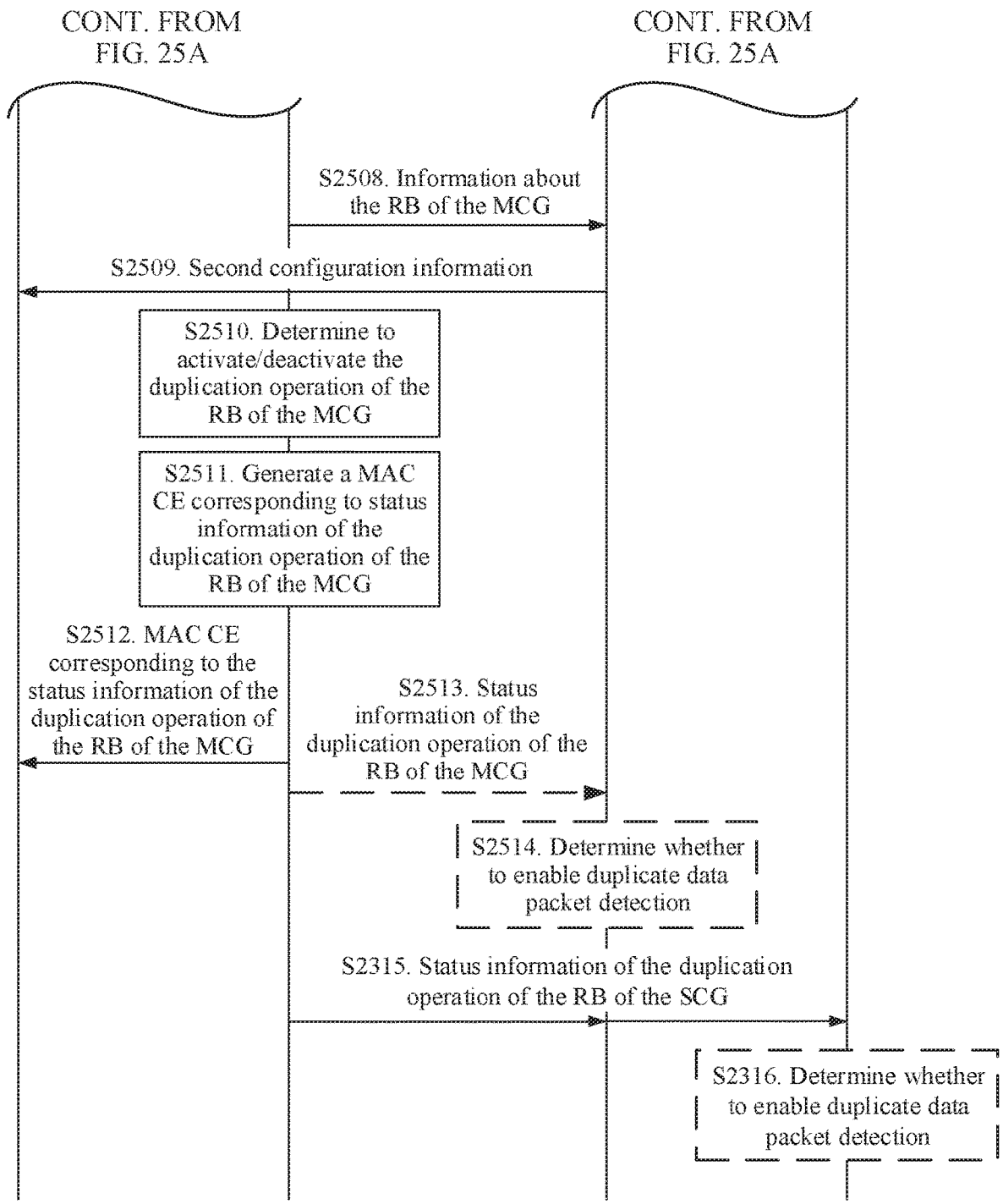

In the communications system shown in FIG. 2, the MN is a gNB, the SN is an LTE base station, and the MN includes an MN-DU and an MN-CU. As shown in FIG. 25A and FIG. 25B, in the communications system shown in FIG. 2, when the PDCP anchor is an SN, the SN determines to configure a duplication operation for an RB of an SCG, and the MN-DU determines whether to activate/deactivate the duplication operation of the RB of the SCG. In this case, a communication method provided in an embodiment of this application includes steps S2500 to S2506. When the PDCP anchor is an MN, the MN-DU determines to configure a duplication operation for an RB of an MCG, and determines whether to activate/deactivate the duplication operation of the RB of the MCG. In this case, the communication method provided in this embodiment of this application includes steps S2507 to S2512.

In a scenario shown in FIG. 2, as shown in FIG. 25A and FIG. 25B, the communication method provided in this embodiment of this application includes the following steps.

S2500. The SN determines to configure a duplication operation for an RB of an SCG.

S2501. The SN generates first configuration information used to indicate that the duplication operation has been configured for the RB of the SCG, and sends the first configuration information to the MN-CU.

S2502. The MN-CU forwards the first configuration information to a terminal.

Specifically, the MN-CU sends the first configuration information to the MN-DU through an F1 interface, and the MN-DU sends the first configuration information to the terminal through an air interface. Optionally, the first configuration information is included in an F1 interface message: a UE context modification request (UE Context Modification Request) message or a downlink RRC message transfer (DL RRC Message Transfer) message.

S2503. The SN sends information about the RB of the SCG to the MN-DU by using the MN-CU.

Optionally, the information that is about the RB of the SCG and that is sent by the MN-CU to the MN-DU may be sent through the F1 interface. For example, the information about the RB of the SCG is included in a UE context setup request (UE Context Setup Request) message or a UE context modification request (UE Context Modification Request). Specifically, the UE context setup request (UE Context Setup Request) message or the UE context modification request (UE Context Modification Request) includes an RB list. The RB list includes an RB ID, and indication information indicating that the duplication operation has been configured for the RB.

S2504. The MN-DU determines to activate/deactivate the duplication operation of the RB of the SCG.

S2505. The MN-DU generates a MAC CE corresponding to status information of the duplication operation of the RB of the SCG.

S2506. The MN-DU sends, to the terminal, the MAC CE corresponding to the status information of the duplication operation of the RB of the SCG.

S2507. The MN-DU determines to configure a duplication operation for an RB of an MCG.

S2508. The MN-DU sends information about the RB of the MCG to the MN-CU.

Optionally, the information that is about the RB of the MCG and that is sent by the MN-DU to the MN-CU may be sent through the F1 interface. For example, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2509. The MN-CU generates second configuration information used to indicate that the duplication operation has been configured for the RB of the MCG, and sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification request (UE Context Modification Request) message or a downlink RRC message transfer (DL RRC Message Transfer) message.

S2510. The MN-DU determines to activate/deactivate the duplication operation of the RB of the MCG.

S2511. The MN-DU generates a MAC CE corresponding to status information of the duplication operation of the RB of the MCG.

S2512. The MN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S2506 and S2512 may alternatively be both performed.

Optionally, as shown in FIG. 25A and FIG. 25B, a procedure of the communication method shown in FIG. 25A and FIG. 25B may further include S2513 and S2514 after S2510.

S2513. The MN-DU sends the status information of the duplication operation of the RB of the MCG to the MN-CU.

The information that is about the RB of the MCG and that is sent by the MN-DU to the MN-CU may be sent through the F1 interface. Optionally, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2514. The MN-CU determines, based on the status information of the duplication operation of the RB of the MCG, whether to enable duplicate data packet detection.

S2513 and S2514 are optional, and therefore are represented by using dashed lines in FIG. 25A and FIG. 25B.

Optionally, as shown in FIG. 25A and FIG. 25B, a procedure of the communication method shown in FIG. 25A and FIG. 25B may further include S2515 and S2516 after S2504.

S2515. The MN-DU sends the status information of the duplication operation of the RB of the SCG to the SN by using the MN-CU.

The information that is about the RB of the SCG and that is sent by the MN-DU to the MN-CU may be sent through the F1 interface. Optionally, the information about the RB of the SCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2516. The SN determines, based on the status information of the duplication operation of the RB of the MCG, whether to enable duplicate data packet detection.

S2515 and S2516 are optional, and therefore are represented by using dashed lines in FIG. 25A and FIG. 25B.

Figure 26A:
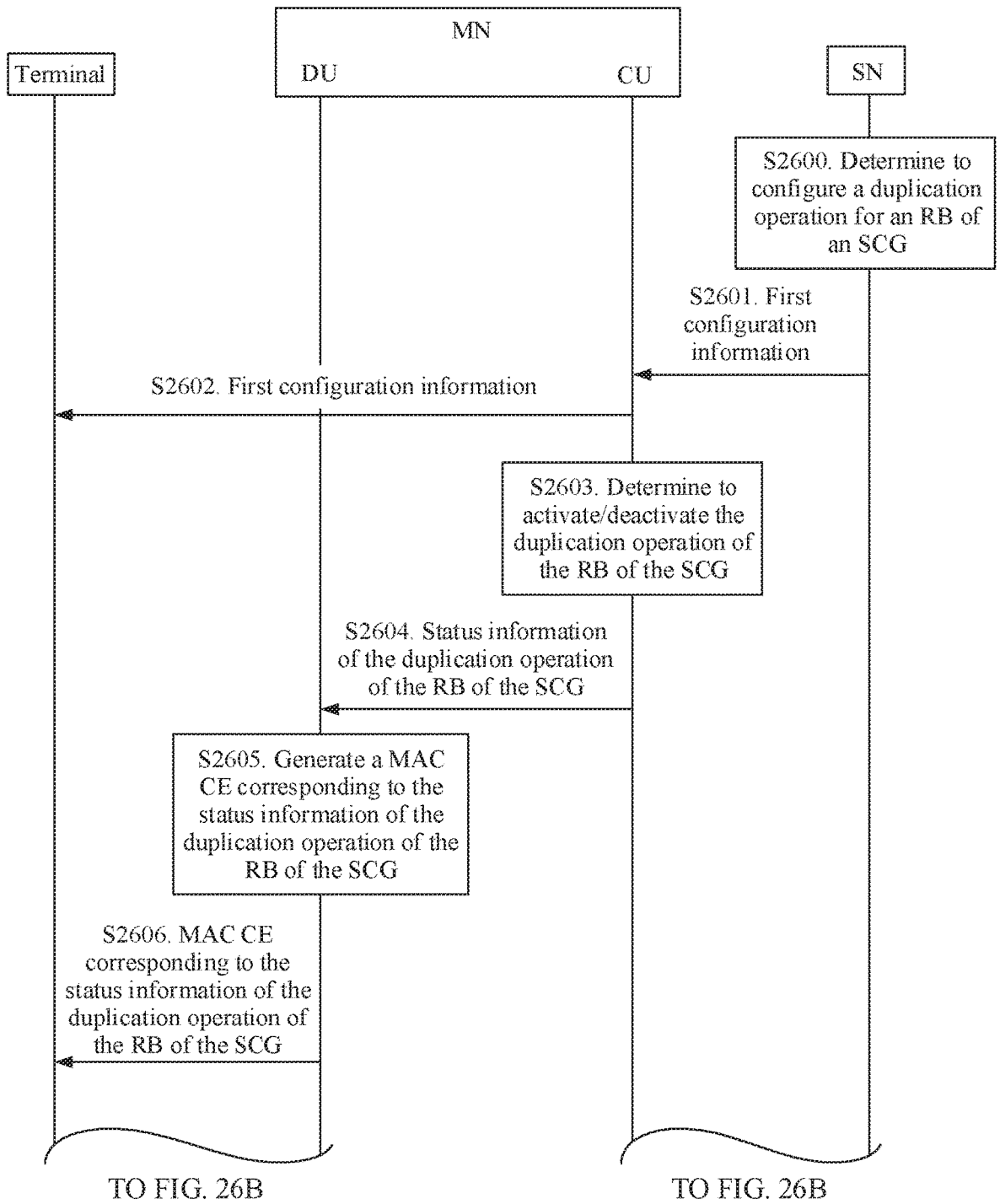
FIG. 26A and FIG. 26B are a twentieth schematic flowchart of a communication method according to an embodiment of this application.
Figure 26B:
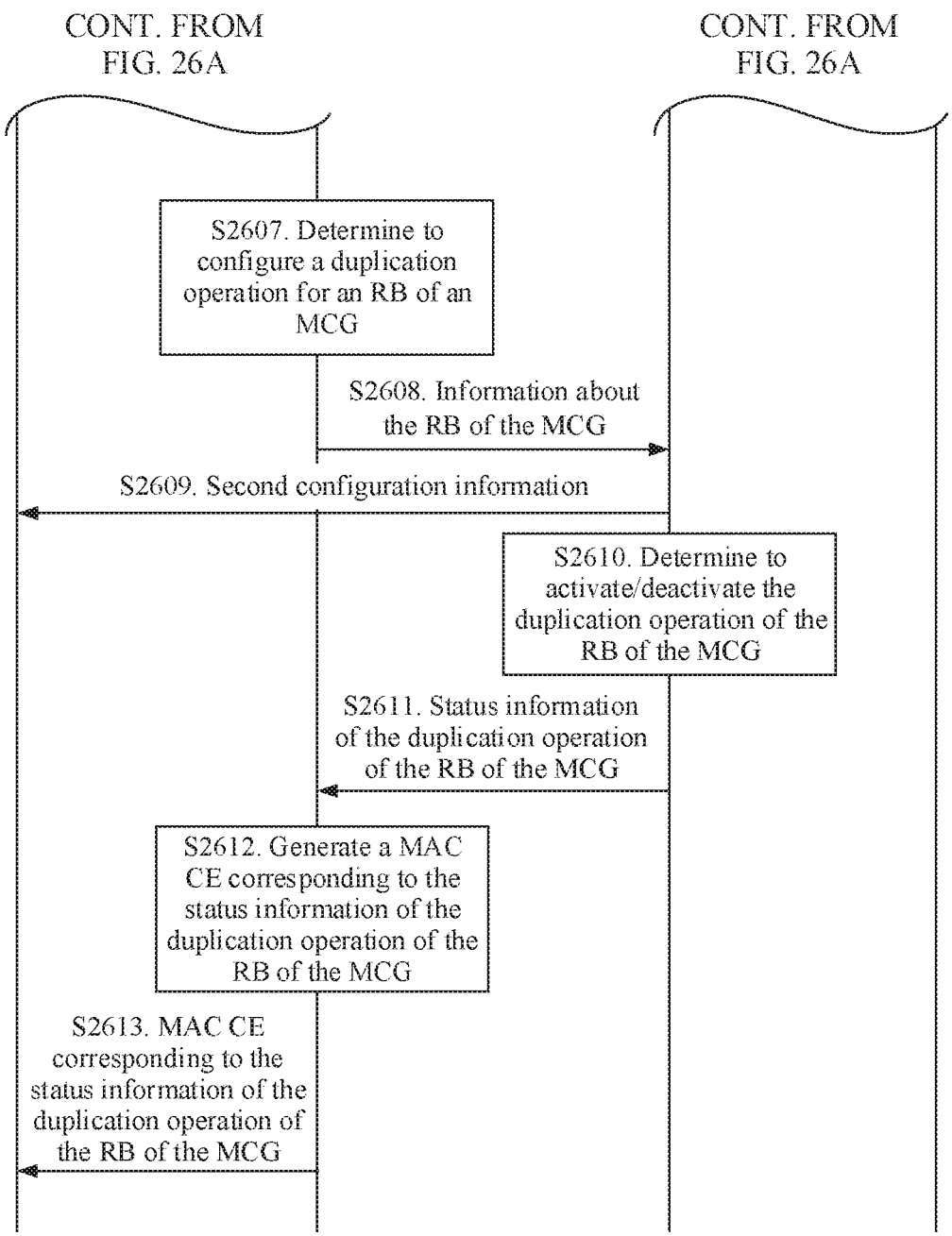

In the communications system shown in FIG. 2, the MN is a gNB, the SN is an LTE base station, and the MN includes an MN-DU and an MN-CU. As shown in FIG. 26A and FIG. 26B, in the communications system shown in FIG. 2, when the PDCP anchor is an SN, the SN determines to configure a duplication operation for an RB of an SCG, and the MN-CU determines whether to activate/deactivate the duplication operation of the RB of the SCG. In this case, a communication method provided in an embodiment of this application includes steps S2600 to S2606. When the PDCP anchor is an MN, the MN-DU determines to configure a duplication operation for an RB of an MCG, and the MN-CU determines whether to activate/deactivate the duplication operation of the RB of the MCG. In this case, the communication method provided in this embodiment of this application includes steps S2607 to S2613.

In a scenario shown in FIG. 2, as shown in FIG. 26A and FIG. 26B, the communication method provided in this embodiment of this application includes the following steps.

S2600. The SN determines to configure a duplication operation for an RB of an SCG.

S2601. The SN generates first configuration information used to indicate that the duplication operation has been configured for the RB of the SCG, and sends the first configuration information to the MN-CU.

S2602. The MN-CU forwards the first configuration information to a terminal.

Specifically, the MN-CU sends the first configuration information to the MN-DU through an F1 interface, and the MN-DU sends the first configuration information to the terminal through an air interface. Optionally, the first configuration information is included in an F1 interface message: a UE context modification request (UE Context Modification Request) message or a downlink RRC message transfer (DL RRC Message Transfer) message.

S2603. The MN-CU determines to activate/deactivate the duplication operation of the RB of the SCG.

S2604. The MN-CU sends status information of the duplication operation of the RB of the SCG to the MN-DU.

The status information, of the duplication operation of the RB of the SCG, sent by the MN-CU to the MN-DU may be sent through the F1 interface. Optionally, the status information of the duplication operation of the RB of the SCG is included in a UE context setup request (UE Context Setup Request) message or a UE context modification request (UE Context Modification Request). Specifically, the UE context setup request (UE Context Setup Request) message or the UE context modification request (UE Context Modification Request) includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2605. The MN-DU generates a MAC CE corresponding to the status information of the duplication operation of the RB of the SCG.

S2606. The MN-DU sends, to the terminal, the MAC CE corresponding to the status information of the duplication operation of the RB of the SCG.

S2607. The MN-DU determines to configure a duplication operation for an RB of an MCG.

S2608. The MN-DU sends information about the RB of the MCG to the MN-CU.

Optionally, the information that is about the RB of the MCG and that is sent by the MN-DU to the MN-CU may be sent through the F1 interface. For example, the information about the RB of the MCG is included in a UE context modification required (UE Context Modification Required) message. Specifically, the UE context modification required (UE Context Modification Required) message includes an RB list. The RB list includes an RB ID, and indication information indicating that the duplication operation has been configured for the RB.

Optionally, the MN-CU may send a response message to the MN-DU through the F1 interface. The response message carries information used to indicate that the foregoing configuration is acknowledged or rejected. Optionally, when the response message carries information indicating the rejection, the response message may further carry a cause value for the rejection.

S2609. The MN-CU generates second configuration information used to indicate that the duplication operation has been configured for the RB of the MCG, and sends the second configuration information to the terminal.

Specifically, the MN-CU sends the second configuration information to the MN-DU through the F1 interface, and the MN-DU sends the second configuration information to the terminal through an air interface. Optionally, the second configuration information is included in an F1 interface message: a UE context modification required (UE Context Modification Required) message or a downlink RRC message transfer (DL RRC Message Transfer) message.

S2610. The MN-CU determines to activate/deactivate the duplication operation of the RB of the MCG.

S2611. The MN-CU sends status information of the duplication operation of the RB of the MCG to the MN-DU.

Optionally, the status information, of the duplication operation of the RB of the MCG, sent by the MN-CU to the MN-DU may be sent through the F1 interface. For example, the status information of the duplication operation of the RB of the MCG is included in a UE context setup request (UE Context Setup Request) message or a UE context modification request (UE Context Modification Request). Specifically, the UE context setup request (UE Context Setup Request) message or the UE context modification request (UE Context Modification Request) includes an RB list. The RB list includes either of or a combination of the following: an RB ID, and indication information of an active/inactive state of a duplication operation of an RB.

Optionally, the MN-DU may send a response message to the MN-CU through the F1 interface. The response message carries information used to indicate that the foregoing configuration is acknowledged or rejected. Optionally, when the response message carries information indicating the rejection, the response message may further carry a cause value for the rejection.

S2612. The MN-DU generates a MAC CE corresponding to the status information of the duplication operation of the RB of the MCG.

S2613. The MN-DU sends, to the terminal, the MAC CE corresponding to the status information of the duplication operation of the RB of the MCG.

Optionally, the first configuration information and the second configuration information may be carried in a same message, or may be carried in different messages. Similarly, based on an actual requirement, S2606 and S2613 may alternatively be both performed.

The foregoing content is all described from a perspective of a base station in a heterogeneous communications system, and a process of configuring and activating a duplication operation is described from a perspective of a terminal below.

For a terminal, a process in which the terminal configures and activates a duplication operation includes the following steps.

Step 1: The terminal receives third configuration information sent by an MN.

The third configuration information includes any one of or any combination of the following information: an identifier of an RB, a first PDCP configuration of the RB, a configuration of a master cell group, a configuration of a secondary cell group, and the like. The first PDCP configuration of the RB is used to indicate that a type (Bearer Type) of the RB is a split bearer.

Step 2: The terminal transmits data based on the third configuration information by using the MCG and the SCG.

Step 3: The terminal receives fourth configuration information sent by the MN.

The fourth configuration information includes any one of or any combination of the following information: the identifier of the RB, a second PDCP configuration of the RB, the configuration of the master cell group, the configuration of the secondary cell group, an initial active/inactive state of the duplication operation, and the like. The second PDCP configuration of the RB is used to indicate that an uplink duplication operation has been configured for the RB.

Step 4: The terminal transmits data based on the fourth configuration information by using the MCG and the SCG.

If the initial active/inactive state, of the duplication operation of the RB, included in the fourth configuration information is an active state, a MAC layer of the terminal sends a duplication operation activation indication to a PDCP entity corresponding to the RB. The duplication operation activation indication is used to indicate the PDCP entity to start to generate a duplicated data packet, and send the same data packet to an RLC entity of the MCG and an RLC entity of the SCG.

It should be noted that the RB may be an RB of the MCG or an RB of the SCG. In a possible case, the RB of the MCG and the RB of the SCG are not distinguished from each other from the perspective of the terminal, that is, second configuration information generated by the MN and first configuration information generated by an SN are not distinguished from each other.

Step 5: The terminal receives a MAC CE sent by an SgNB.

The MAC CE is used to indicate that a status information of the duplication operation of the RB included in the fourth configuration information is set to active/inactive.

Optionally, when the status indicated by the MAC CE is the same as a current status information of the RB of the terminal, no additional action is performed; when the status indicated by the MAC CE is different from a current status information of the RB of the terminal, the MAC layer of the terminal sends indication information to the PDCP entity corresponding the RB. For example, when the current status is inactive and the MAC CE indicates active, the indication information is used to indicate the PDCP entity to start to generate a duplicated data packet. If the current status is active, and the MAC CE indicates inactive, the indication information is used to indicate the PDCP entity to stop generating a duplicated data packet. Further, optionally, the type of the RB falls back to the split bearer, to be specific, the PDCP entity performs data transmission by using the master cell group and/or the secondary cell group based on a specific configuration of the split bearer.

The third configuration information and the fourth configuration information may be sent in a same message. In this case, it may be considered that the duplication operation has been configured for the split bearer at the same time when the split bearer is configured, and the initial active/inactive state may be assigned to the duplication operation.

In conclusion, according to the communication methods provided in the embodiments of this application, the problem that the LTE base station cannot send the activation/deactivation indication to the terminal when the anchor is the LTE base station is resolved in all the different heterogeneous communications systems. In addition, the configuration and the activation of the duplication operation are further implemented in the scenario in which the gNB includes the CU and the DU.

An embodiment of this application provides a communications device 270. The communications device 270 may be a CU in a gNB, or may be an LTE base station. The communications device 270 is configured to perform the steps performed by the CU in the gNB or the LTE base station in the foregoing communication methods. The communications device 270 provided in this embodiment of this application may include a module corresponding to a corresponding step.

In this embodiment of this application, function modules in the communications device 270 may be obtained through division based on the foregoing method examples. For example, each function module corresponding to each function may be obtained through division, or two or more functions may be integrated into one processing module. The integrated module may be implemented in a form of hardware, or may be implemented in a form of a software function module. In this embodiment of this application, division into the module is an example, and is merely a logical function division. In actual implementation, another division manner may be used.

Figure 27:
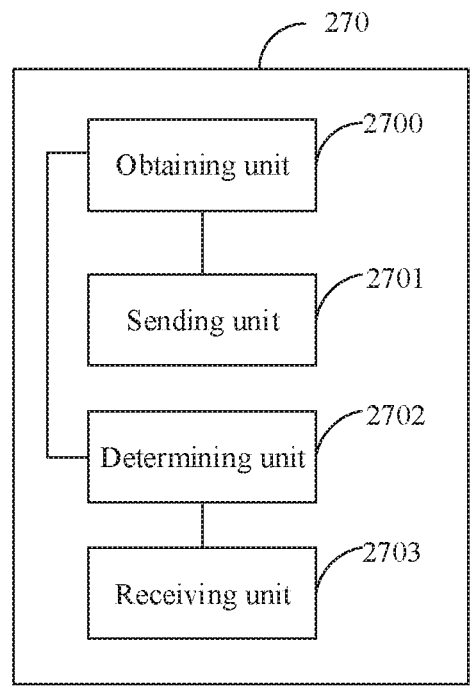
FIG. 27 is a first schematic structural diagram of a communications device according to an embodiment of this application.

When each function module corresponding to each function is obtained through division, FIG. 27 is a possible schematic structural diagram of the communications device 270. As shown in FIG. 27, the communications device 270 includes an obtaining unit 2700, a sending unit 2701, a determining unit 2702, and a receiving unit 2703. The obtaining unit 2700 is configured to support the communications device 270 in performing the obtaining operations shown in FIG. 7 to FIG. 26A and FIG. 26B, such as S708, S903, S1200, S1400, S1600, S1602, and/or another process used for the technologies described in this specification. The sending unit 2701 is configured to support the communications device 270 in performing the sending operations shown in FIG. 7 to FIG. 26A and FIG. 26B, such as S804, S904, S1110, S1201, S1311, and S1401, and/or another process used for the technologies described in this specification. The determining unit 2702 is configured to support the communications device 270 in performing the determining operations shown in FIG. 7 to FIG. 26A and FIG. 26B, such as S706. S708, S805, S900, S903, S1005, S1100, and S1200, and/or another process used for the technologies described in this specification. The receiving unit 2703 is configured to support the communications device 270 in performing the receiving operations shown in FIG. 7 to FIG. 26A and FIG. 26B, such as S804, S1004, S1109, S1113, S1301, S1310, and S1314, and/or another process used for the technologies described in this specification. Certainly, the communications device 270 provided in this embodiment of this application includes but is not limited to the foregoing modules. For example, the communications device 270 may further include a storage unit. The storage unit may be configured to store program code of the communications device 270. All related content of steps in the foregoing method embodiments may be cited in function descriptions of corresponding function modules, and details are not described herein again.

When the communications device 270 is an LTE base station, the obtaining unit 2700 and the determining unit 2702 may be the processor 51 in FIG. 5, the sending unit 2701 and the receiving unit 2703 may be the transceiver 53 in FIG. 5, and the storage unit may be the memory 52 in FIG. 5.

When the communications device 270 is a CU in a gNB, a hardware structure of the CU in the gNB is similar to that in FIG. 5. Details are not described herein again.

Another embodiment of this application further provides a computer-readable storage medium. The computer-readable storage medium stores an instruction. When the instruction is run on the communications device 270, the communications device 270 performs the steps of the MN in the communication methods in the embodiments shown in FIG. 7 and FIG. 8A and FIG. 8B, or performs the steps of the SN in the communication methods in the embodiments shown in FIG. 9A and FIG. 9B and FIG. 10A and FIG. 10B, or performs the steps of the CU in the SN in the communication methods in the embodiments shown in FIG. 11A and FIG. 11B to FIG. 19A and FIG. 19B, or performs the steps of the CU in the MN in the communication methods in the embodiments shown in FIG. 20A and FIG. 20B to FIG. 26A and FIG. 26B.

In another embodiment of this application, a computer program product is further provided. The computer program product includes a computer execution instruction, and the computer execution instruction is stored in a computer-readable storage medium. At least one processor of the communications device 270 may read the computer execution instruction from the computer-readable storage medium, and the at least one processor executes the computer execution instruction, so that the communications device 270 performs the steps of the MN in the communication methods in the embodiments shown in FIG. 7 and FIG. 8A and FIG. 8B, or performs the steps of the SN in the communication methods in the embodiments shown in FIG. 9A and FIG. 9B and FIG. 10A and FIG. 10B, or performs the steps of the CU in the SN in the communication methods in the embodiments shown in FIG. 11A and FIG. 11B to FIG. 19A and FIG. 19B, or performs the steps of the CU in the MN in the communication methods in the embodiments shown in FIG. 20A and FIG. 20B to FIG. 26A and FIG. 26B.

An embodiment of this application provides a communications device 280. The communications device 280 may be a gNB, or may be a DU in the gNB. The communications device 280 is configured to perform the steps performed by the gNB or the DU in the gNB in the foregoing communication methods. The communications device 280 provided in this embodiment of this application may include a module corresponding to a corresponding step.

In this embodiment of this application, function modules in the communications device 280 may be obtained through division based on the foregoing method examples. For example, each function module corresponding to each function may be obtained through division, or two or more functions may be integrated into one processing module. The integrated module may be implemented in a form of hardware, or may be implemented in a form of a software function module. In this embodiment of this application, division into the modules is an example, and is merely a logical function division. In actual implementation, another division manner may be used.

Figure 28:
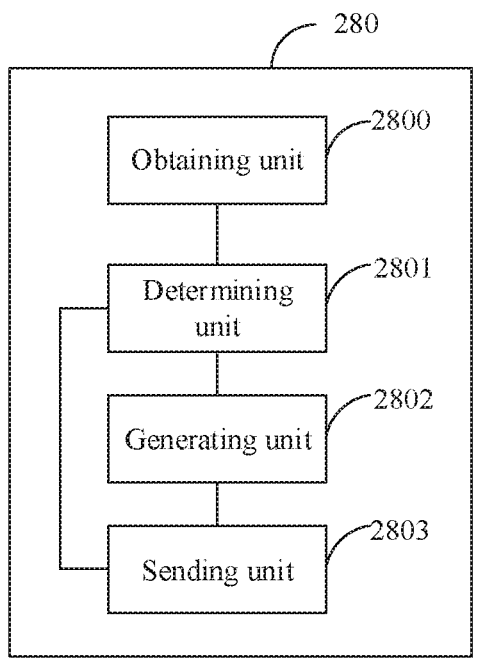
FIG. 28 is a second schematic structural diagram of a communications device according to an embodiment of this application.

When each function module corresponding to each function is obtained through division. FIG. 28 is a possible schematic structural diagram of the communications device 280 in this embodiment. As shown in FIG. 28, the communications device 280 includes an obtaining unit 2800, a determining unit 2801, a generating unit 2802, and a sending unit 2803. The obtaining unit 2800 is configured to support the communications device 280 in performing the obtaining operation shown in FIG. 7 to FIG. 26A and FIG. 26B, such as S1109 and S1113, and/or another process used for the technologies described in this specification. The determining unit 2801 is configured to support the communications device 280 in performing the determining operations shown in FIG. 7 to FIG. 26A and FIG. 26B, for example, performing S706 and S708 in the foregoing embodiments, and/or another process used for the technologies described in this specification. The generating unit 2802 is configured to support the communications device 280 in performing the generation operations shown in FIG. 7 to FIG. 26A and FIG. 26B, such as S701 and S704, and/or another process used for the technologies described in this specification. The sending unit 2803 is configured to support the communications device 280 in performing the sending operations shown in FIG. 7 to FIG. 26A and FIG. 26B, such as S804 and S904, and/or another process used for the technologies described in this specification. All related content of steps in the foregoing method embodiments may be cited in function descriptions of corresponding function modules, and details are not described herein again. Certainly, the communications device 280 provided in this embodiment of this application includes but is not limited to the foregoing modules.

For example, the communications device 280 may further include a storage unit. The storage unit may be configured to store program code and data of the communications device 280.

When the communications device 280 is a gNB, the obtaining unit 2800, the determining unit 2801, and the generating unit 2802 may be the processor 51 in FIG. 5, the sending unit 2803 may be the transceiver 53 in FIG. 5, and the storage unit may be the memory 52 in FIG. 5.

When the communications device 280 is a DU in a gNB, a hardware structure of the DU in the gNB is similar to that in FIG. 5. Details are not described herein again.

Another embodiment of this application further provides a computer-readable storage medium. The computer-readable storage medium stores an instruction. When the instruction is run on the communications device 280, the communications device 280 performs the steps of the SN in the communication methods in the embodiments shown in FIG. 7 and FIG. 8A and FIG. 8B, or performs the steps of the MN in the communication methods in the embodiments shown in FIG. 9A and FIG. 9B and FIG. 10A and FIG. 10B, or performs the steps of the DU in the SN in the communication methods in the embodiments shown in FIG. 11A and FIG. 11B to FIG. 19A and FIG. 19B, or performs the steps of the DU in the MN in the communication methods in the embodiments shown in FIG. 20A and FIG. 20B to FIG. 26A and FIG. 26B.

In another embodiment of this application, a computer program product is further provided. The computer program product includes a computer execution instruction, and the computer execution instruction is stored in a computer-readable storage medium. At least one processor of the communications device 280 may read the computer execution instruction from the computer-readable storage medium, and the at least one processor executes the computer execution instruction, so that the communications device 280 performs the steps of the SN in the communication methods in the embodiments shown in FIG. 7 and FIG. 8A and FIG. 8B, or performs the steps of the MN in the communication methods in the embodiments shown in FIG. 9A and FIG. 9B and FIG. 10A and FIG. 10B, or performs the steps of the DU in the SN in the communication methods in the embodiments shown in FIG. 11A and FIG. 11B to FIG. 19A and FIG. 19B, or performs the steps of the DU in the MN in the communication methods in the embodiments shown in FIG. 20A and FIG. 20B to FIG. 26A and FIG. 26B.

All or some of the foregoing embodiments may be implemented by means of software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like)

manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   receiving, by a first communications device, information about a radio bearer (RB) of a heterogeneous communications system, wherein a duplication operation for the RB is configured by a second communications device, and the first communications device and the second communications device are comprised in a master node in the heterogeneous communications system, wherein the first communications device is configured with a media access control (MAC) layer, a radio link control layer (RLC), and a physical (PHY) layer of the master node, and the second communications device is configured with a radio resource control (RRC) layer and a packet data convergence protocol (PDCP) layer of the master node, or the first communications device and the second communications device are comprised in a secondary node in the heterogeneous communications system, wherein the first communications device is configured with a MAC layer, a RLC, and a PHY layer of the secondary node, and the second communications device is configured with a RRC layer and a PDCP layer of the secondary node, wherein the heterogeneous communications system is an E-UTRA NR dual connectivity (ENDC) system, the first communications device is a distributed unit (DU) comprised in the secondary node, the second communications device is a centralized unit (CU) comprised in the secondary node, and the RB is an RB of a secondary cell group (SCG);
   generating, by using the MAC layer of the first communications device, an activation indication indicating whether to activate or deactivate the duplication operation of the RB, wherein whether to activate or deactivate the duplication operation is determined by the first communications device;
   sending, by the first communications device, the activation indication to a terminal device; and
   sending, by the first communications device, status information of the duplication operation of the RB to the second communications device, wherein the status information indicates activation or deactivation of the duplication operation of the RB, and the status information causes the second communications device to determine whether to enable duplicate data packet detection.

2. The communication method according to claim 1, wherein
   the RB of the SCG is one of: a SCG bearer, a SCG split bearer, or a bearer which a Packet Data Convergence Protocol (PDCP) is terminated on the secondary node.

3. A first communications device, comprising: one or more processors, a memory, and a communications interface, wherein the memory and the communications interface are coupled to the one or more processors, the memory stores programming instructions for execution by the one or more processors, the programming instructions instruct the one or more processors to perform operations comprising:
   receiving information about a radio bearer (RB) of a heterogeneous communications system, wherein a duplication operation for the RB is configured by a second communications device, and the first communications device and the second communications device are comprised in a master node in the heterogeneous communications system, wherein the first communications device is configured with a media access control (MAC) layer, a radio link control layer (RLC), and a physical (PHY) layer of the master node, and the second communications device is configured with a radio resource control (RRC) layer and a packet data convergence protocol (PDCP) layer of the master node, or the first communications device and the second communications device are comprised in a secondary node in the heterogeneous communications system, wherein the first communications device is configured with a MAC layer, a RLC, and a PHY layer of the secondary node, and the second communications device is configured with a RRC layer and a PDCP layer of the secondary node, wherein the heterogeneous communications system is an E-UTRA NR dual connectivity (ENDC) system, the first communications device is a distributed unit (DU) comprised in the secondary node, the second communications device is a centralized unit (CU) comprised in the secondary node, and the RB is an RB of a secondary cell group (SCG);

generating, by using the MAC layer of the first communications device, an activation indication indicating whether to activate or deactivate the duplication operation of the RB, wherein whether to activate or deactivate the duplication operation is determined by the first communications device;

sending the activation indication to a terminal device; and sending status information of the duplication operation of the RB to the second communications device, wherein the status information indicates activation or deactivation of the duplication operation of the RB, and the status information causes the second communications device to determine whether to enable duplicate data packet detection.

4. The first communications device according to claim 3, wherein
the RB of the SCG is one of: a SCG bearer, a SCG split bearer, or a bearer which a Packet Data Convergence Protocol (PDCP) is terminated on the secondary node.

5. A second communications device, comprising: one or more processors, a memory, and a communications interface, wherein the memory and the communications interface are coupled to the one or more processors, the memory stores programming instructions for execution by the one or more processors, the programming instructions instruct the one or more processors to perform operations comprising:

determining information about a radio bearer (RB) of a heterogeneous communications system, wherein a duplication operation for the RB is configured by a first communications device, and the first communications device and the second communications device are comprised in a master node in the heterogeneous communications system, wherein the first communications device is configured with a media access control (MAC) layer, a radio link control layer (RLC), and a physical (PHY) layer of the master node, and the second communications device is configured with a radio resource control (RRC) layer and a packet data convergence protocol (PDCP) layer of the master node, or the first communications device and the second communications device are comprised in a secondary node in the heterogeneous communications system, wherein the first communications device is configured with a MAC layer, a RLC, and a PHY layer of the secondary node, and the second communications device is configured with a RRC layer and a PDCP layer of the secondary node, wherein the heterogeneous communications system is an E-UTRA NR dual connectivity (ENDC) system, the first communications device is a distributed unit (DU) comprised in the secondary node, the second communications device is a centralized unit (CU) comprised in the secondary node, and the RB is an RB of a secondary cell group (SCG);

sending the information about the RB to the first communications device for determining whether to activate the duplication operation of the RB and generating, by using the MAC layer of the first communications device, an activation indication indicating a terminal device whether to activate or deactivate the duplication operation of the RB;

receiving status information of the duplication operation of the RB, wherein the status information indicates activation or deactivation of the duplication operation of the RB; and determining, based on the status information, whether to enable duplicate data packet detection.

6. The second communications device according to claim 5, wherein
the RB of the SCG is one of: a SCG bearer, a SCG split bearer, or a bearer which a Packet Data Convergence Protocol (PDCP) is terminated on the secondary node.

* * * * *